United States Patent
Li

(10) Patent No.: US 12,493,480 B2
(45) Date of Patent: Dec. 9, 2025

(54) INTERFACE DISPLAY METHOD AND ELECTRONIC DEVICE

(71) Applicant: HUAWEI TECHNOLOGIES CO., LTD., Guangdong (CN)

(72) Inventor: Chundong Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/922,243

(22) Filed: Oct. 21, 2024

(65) Prior Publication Data
US 2025/0045076 A1   Feb. 6, 2025

Related U.S. Application Data

(63) Continuation of application No. PCT/CN2023/088457, filed on Apr. 14, 2023.

(30) Foreign Application Priority Data

Apr. 20, 2022   (CN) .................. 202210414619.1

(51) Int. Cl.
| | |
|---|---|
| *G06F 9/451* | (2018.01) |
| *G06F 3/04812* | (2022.01) |
| *G06F 3/0488* | (2022.01) |
| *G06F 3/14* | (2006.01) |
| *H04M 1/02* | (2006.01) |

(52) U.S. Cl.
CPC .......... *G06F 9/451* (2018.02); *G06F 3/04812* (2013.01); *G06F 3/0488* (2013.01); *G06F 3/1423* (2013.01); *H04M 1/0268* (2013.01)

(58) Field of Classification Search
CPC .... G06F 9/451; G06F 3/04812; G06F 3/0488; G06F 3/1423; G06F 1/1616; G06F 1/1647; G06F 1/1652; G06F 1/1677; G06F 2203/04803; G06F 3/0481; H04M 1/0268
See application file for complete search history.

(56) References Cited

U.S. PATENT DOCUMENTS

| | | | |
|---|---|---|---|
| 11,137,894 B1 * | 10/2021 | Chen | G06F 3/04855 |
| 11,244,658 B1 * | 2/2022 | Hong | G06F 3/0483 |
| 12,045,535 B2 * | 7/2024 | Han | G06F 1/1677 |
| 2012/0084681 A1 | 4/2012 | Cassar | |

(Continued)

FOREIGN PATENT DOCUMENTS

| | | |
|---|---|---|
| CN | 109918165 A | 6/2019 |
| CN | 110320976 A | 10/2019 |

(Continued)

*Primary Examiner* — Ibrahim A Khan

(57) ABSTRACT

Disclosed is an interface display method and an electronic device. In the method, a target application in the electronic device may generate a view tree based on a first display window whose width is less than a width of an actual display window. The electronic device may generate, based on a second display window, a user interface corresponding to the view tree. The electronic device may stretch a second view node that may affect aesthetics of the user interface, so that a width of the second view node is adapted to a width of the second display window. For a first view node that does not affect the aesthetics of the user interface, a current state of the first view node in the user interface is maintained.

20 Claims, 59 Drawing Sheets

(56) References Cited

U.S. PATENT DOCUMENTS

| | | | |
|---|---|---|---|
| 2013/0321264 A1* | 12/2013 | Park | G06F 3/0482 |
| | | | 345/156 |
| 2015/0338888 A1* | 11/2015 | Kim | G06F 1/1677 |
| | | | 345/156 |
| 2016/0373654 A1* | 12/2016 | Kwon | G09G 5/373 |
| 2017/0140504 A1* | 5/2017 | Jeong | G06F 3/147 |
| 2017/0212677 A1* | 7/2017 | Lee | G06F 3/04886 |
| 2018/0039408 A1* | 2/2018 | Cheong | G06F 3/0481 |
| 2019/0261519 A1* | 8/2019 | Park | G06F 1/1652 |
| 2020/0027425 A1* | 1/2020 | Lee | G06F 1/1652 |
| 2020/0264826 A1* | 8/2020 | Kwon | G06F 3/0487 |
| 2020/0272286 A1* | 8/2020 | Ko | G06F 9/48 |
| 2020/0365110 A1* | 11/2020 | Iyer | G06F 3/147 |
| 2021/0096738 A1* | 4/2021 | Klein | G06F 1/1643 |
| 2021/0105389 A1* | 4/2021 | Ko | G06F 3/04845 |
| 2021/0174766 A1* | 6/2021 | Chung | G06F 3/0481 |
| 2021/0208638 A1* | 7/2021 | Takeuchi | G06F 1/1643 |
| 2021/0263564 A1* | 8/2021 | Chen | G06F 3/0481 |
| 2021/0333991 A1* | 10/2021 | Kim | G06F 3/04817 |
| 2022/0122514 A1* | 4/2022 | Kwon | G06F 3/1446 |
| 2022/0148476 A1* | 5/2022 | Min | G06F 1/1652 |
| 2022/0148478 A1* | 5/2022 | Lee | G06F 1/16 |
| 2022/0164093 A1* | 5/2022 | Kang | G06F 3/04842 |
| 2022/0187871 A1* | 6/2022 | Yamazaki | G09F 9/00 |
| 2022/0291723 A1* | 9/2022 | Otomasu | G06F 1/1652 |
| 2022/0345638 A1* | 10/2022 | Shin | G06F 1/1686 |
| 2022/0368784 A1* | 11/2022 | Koh | H04M 1/0235 |
| 2022/0383786 A1* | 12/2022 | Kwak | G06F 1/1643 |
| 2022/0407955 A1* | 12/2022 | Kim | G06F 3/0488 |
| 2023/0048429 A1* | 2/2023 | Song | G06F 1/1624 |
| 2023/0050737 A1* | 2/2023 | Lim | H04M 1/72403 |
| 2023/0053032 A1* | 2/2023 | Jeon | G06F 3/0481 |
| 2023/0075430 A1* | 3/2023 | Kim | G06F 1/1677 |
| 2023/0146478 A1* | 5/2023 | You | G09G 5/14 |
| | | | 715/764 |
| 2023/0152862 A1* | 5/2023 | Choi | G06F 1/1616 |
| | | | 361/679.27 |
| 2023/0152966 A1* | 5/2023 | Kim | G06F 3/0483 |
| | | | 345/173 |
| 2023/0267617 A1* | 8/2023 | Kim | G06F 1/1624 |
| | | | 382/173 |
| 2023/0289200 A1* | 9/2023 | Kim | G06F 3/04817 |
| 2023/0308743 A1* | 9/2023 | Ku | H04N 23/64 |
| 2023/0315229 A1* | 10/2023 | Oh | G06F 3/04886 |
| | | | 345/173 |
| 2023/0324955 A1* | 10/2023 | Min | H04M 1/0268 |
| 2023/0325214 A1* | 10/2023 | Bae | G06F 3/04886 |
| 2023/0342002 A1* | 10/2023 | Zhang | G06F 1/1652 |
| 2023/0376184 A1* | 11/2023 | Liu | G06F 3/04842 |
| 2023/0376322 A1* | 11/2023 | Park | G06F 3/0483 |
| 2024/0361967 A1* | 10/2024 | Ko | H04M 1/0235 |
| 2024/0386822 A1* | 11/2024 | Kim | G06F 3/0484 |

FOREIGN PATENT DOCUMENTS

| | | |
|---|---|---|
| CN | 111026301 A | 4/2020 |
| CN | 111367456 A | 7/2020 |
| CN | 111443773 A | 7/2020 |
| CN | 112114912 A | 12/2020 |
| CN | 112269555 A | 1/2021 |
| CN | 113687745 A | 11/2021 |
| CN | 114089932 A | 2/2022 |
| CN | 114115619 A | 3/2022 |
| CN | 114115769 A | 3/2022 |
| CN | 114173005 A | 3/2022 |
| EP | 4471585 A1 | 12/2024 |
| WO | 2022068594 A1 | 4/2022 |

* cited by examiner

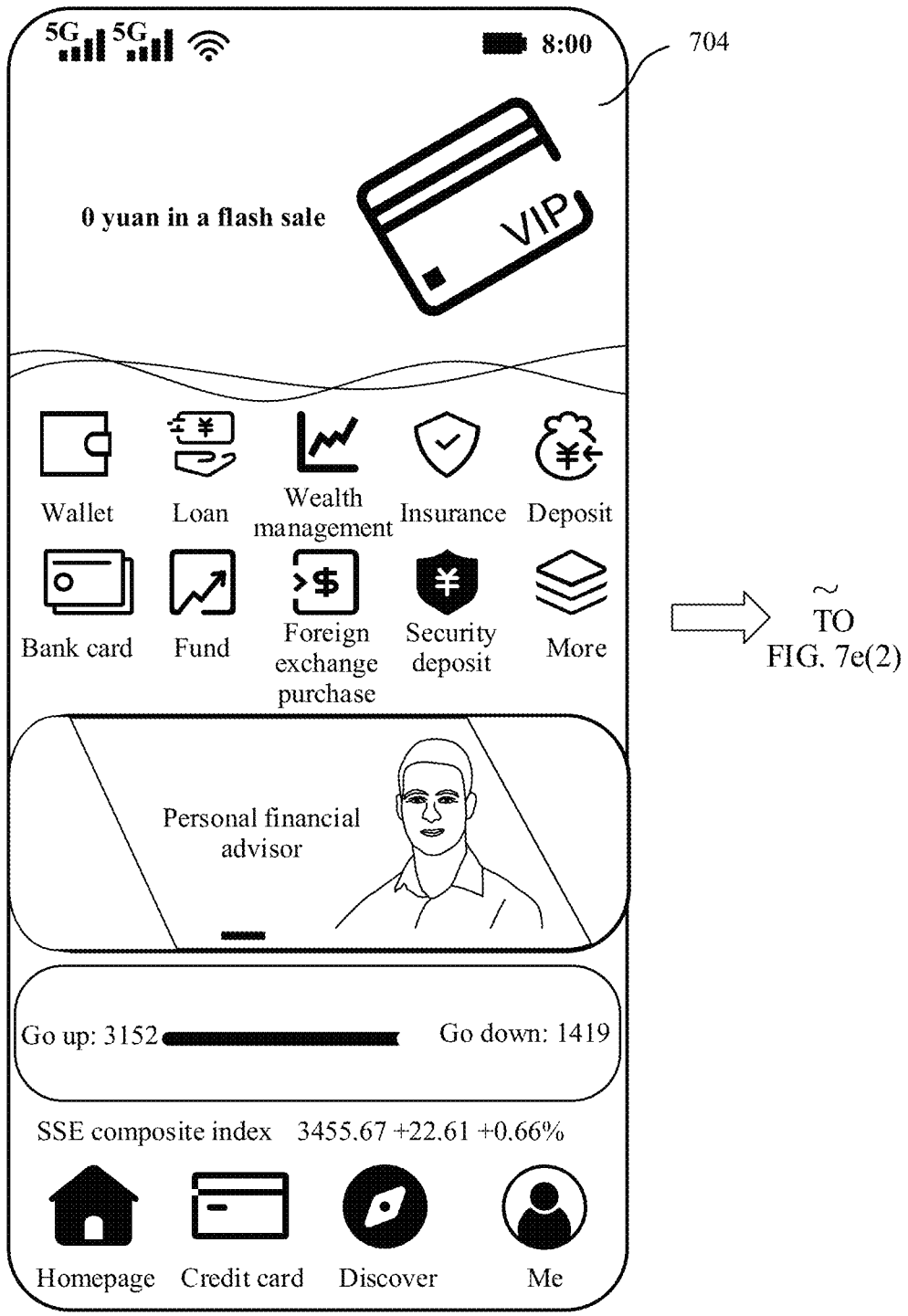
FIG. 7e(1)

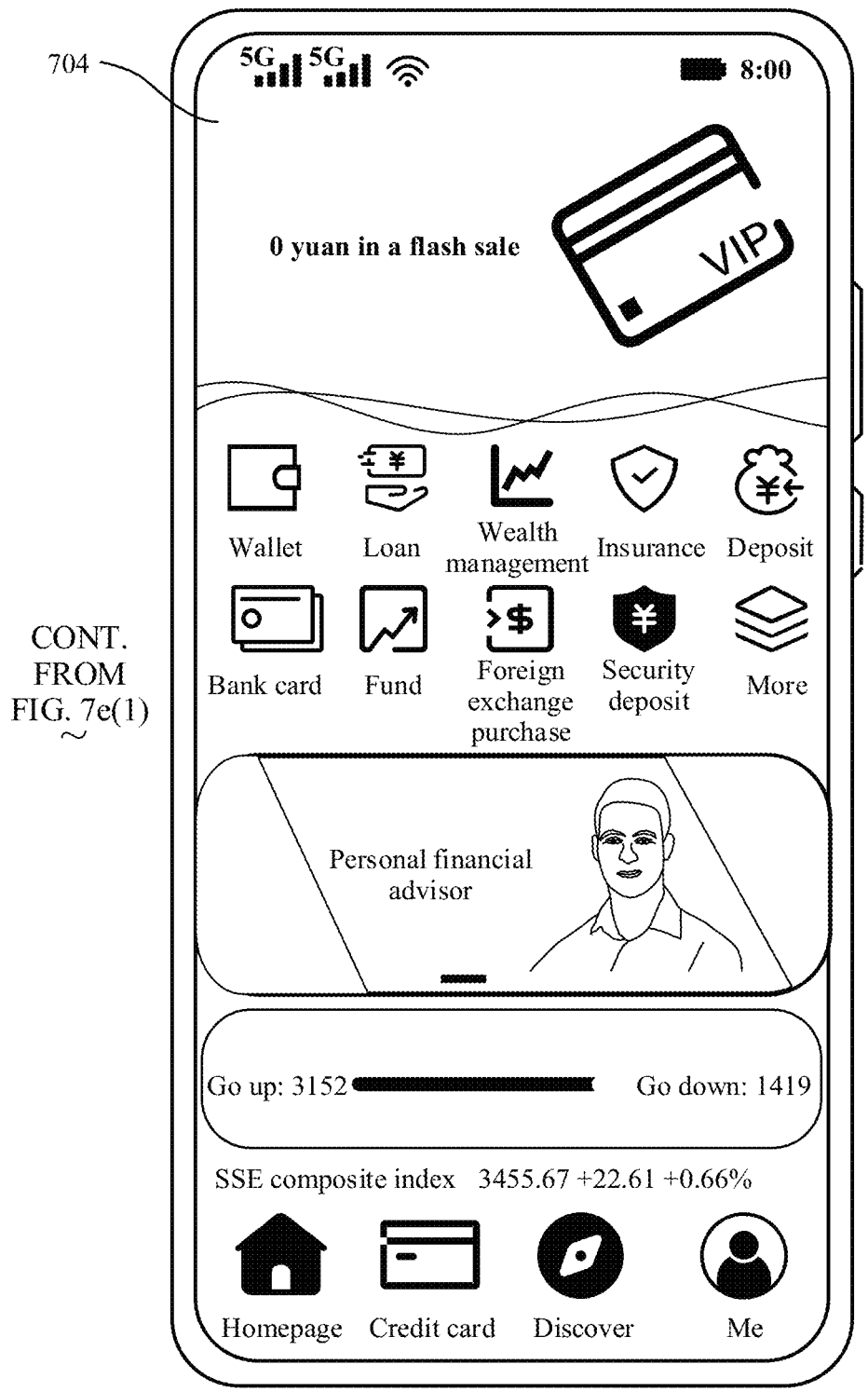
FIG. 7e(2)

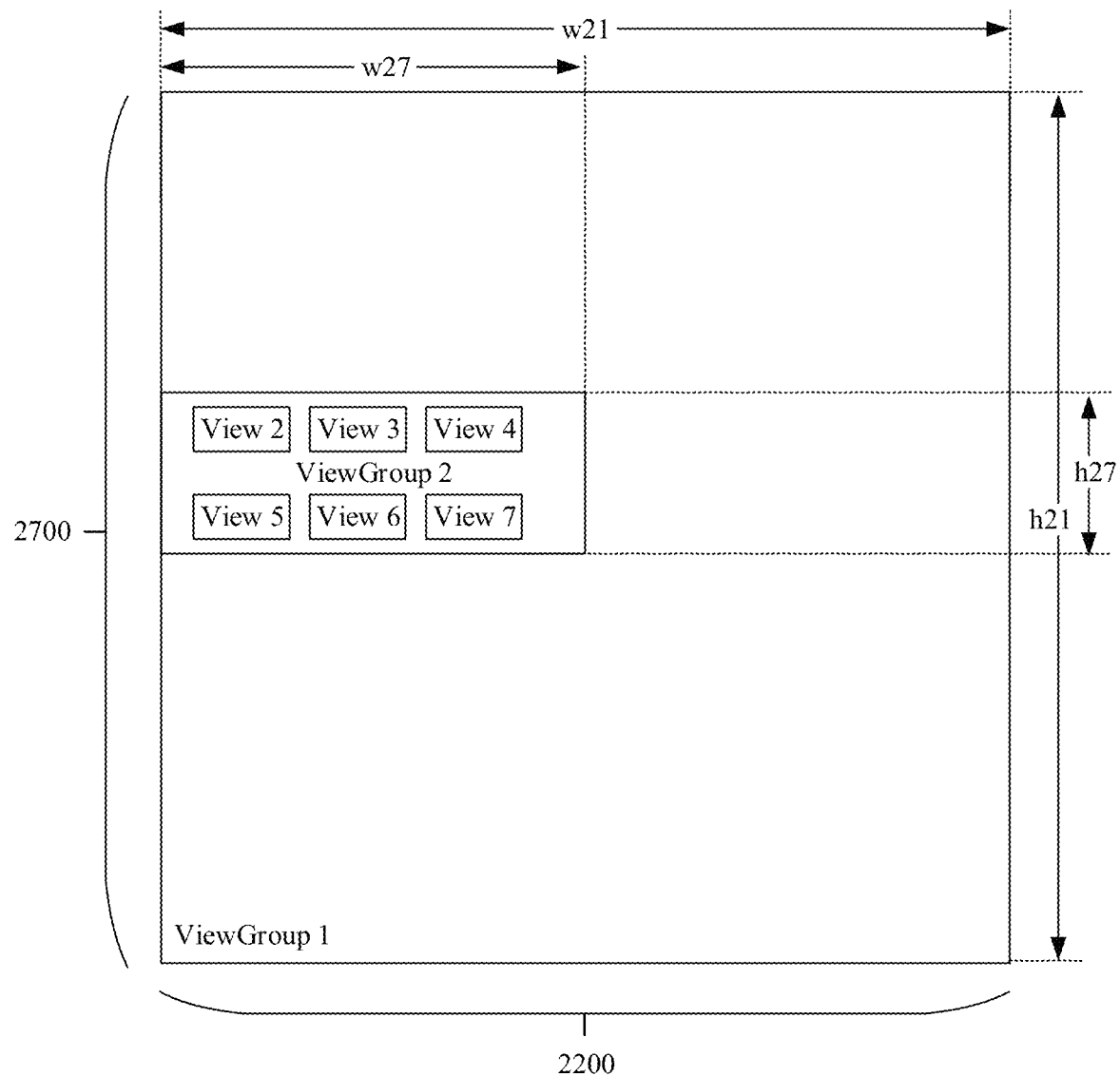
FIG. 22a(1)

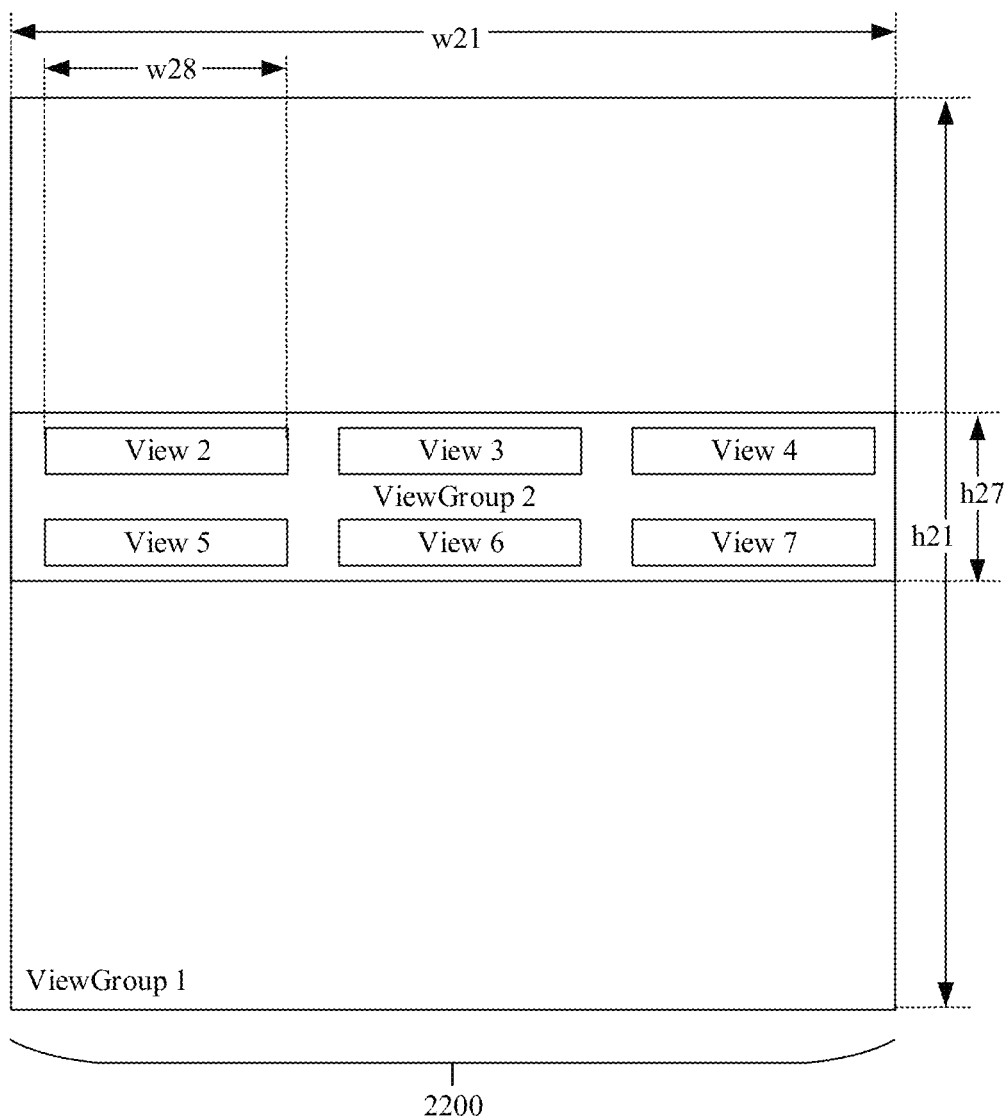
FIG. 22a(2)

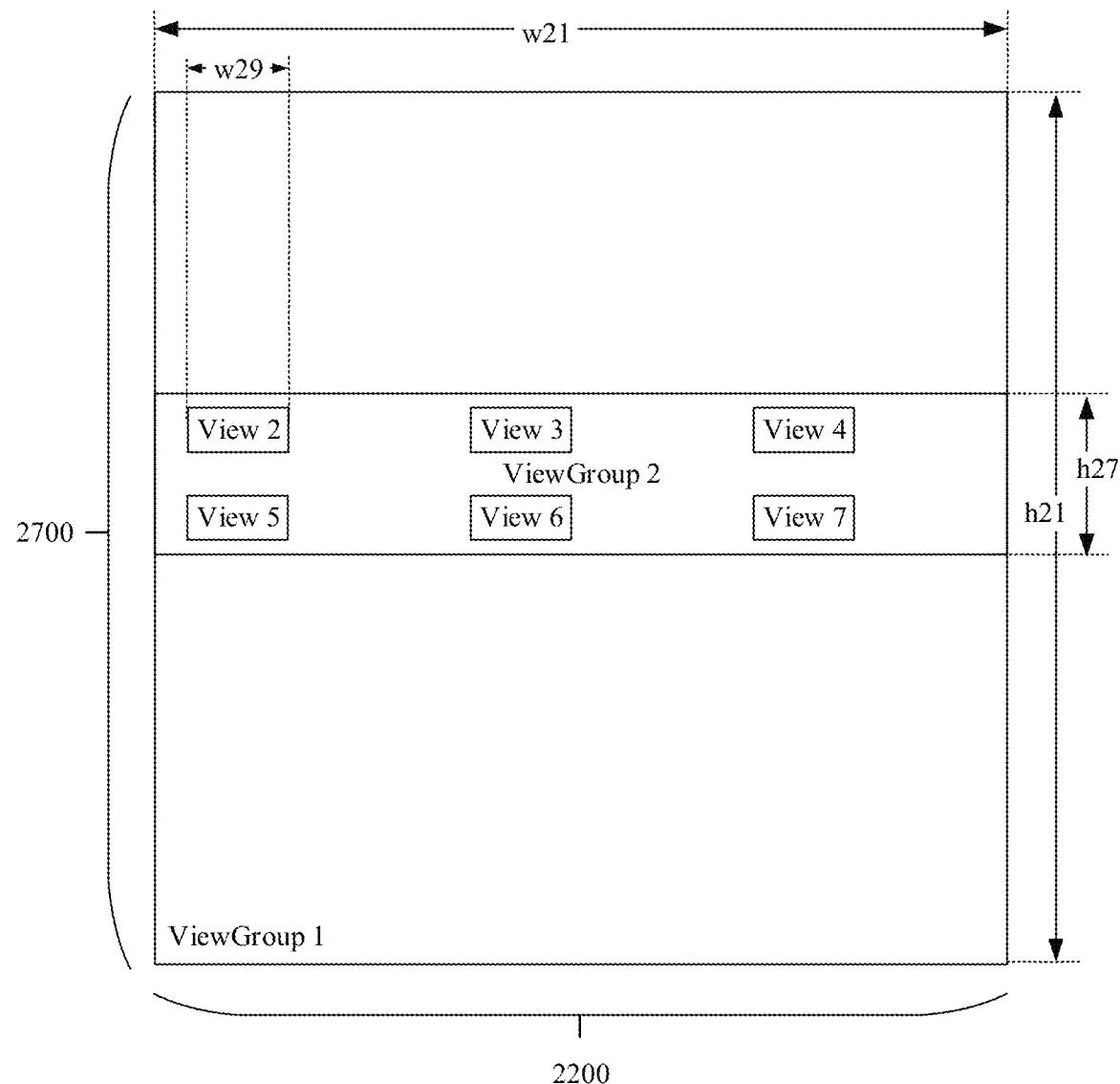
FIG. 22a(3)

INTERFACE DISPLAY METHOD AND ELECTRONIC DEVICE

CROSS-REFERENCE TO RELATED APPLICATIONS

This application is a continuation of International Application No. PCT/CN2023/088457, filed on Apr. 14, 2023, which claims priority to Chinese Patent Application No. 202210414619.1, filed on Apr. 20, 2022. The disclosures of the aforementioned applications are hereby incorporated by reference in their entireties.

TECHNICAL FIELD

Embodiments of this application relate to the field of terminal devices, and in particular, to an interface display method and an electronic device.

BACKGROUND

With development of foldable screen technologies, more users are choosing to use foldable mobile phones as their popularity increases. One issue, however, is that a third-party application is generally laid out on a window based on a screen ratio of a bar-type mobile phone. Therefore, because the screen ratio of the bar-type mobile phone differs greatly from that of a foldable mobile phone, a need exists for a window layout manner because the third-party application cannot adapt to a screen of the foldable mobile phone. This negatively affects user experience.

SUMMARY

Embodiments of this disclosure provide an interface display method and an electronic device. In the method, the electronic device may display a user interface of an application without reducing interface content to be displayed by the application, thereby improving user experience.

According to a first aspect, an embodiment provides an interface display method. The method includes: An electronic device obtains a view tree of a target application, where the view tree is generated by the target application based on window information transmitted by the electronic device to the target application, the window information indicates a width and a height of a first display window, and the view tree includes a first view node and a second view node. Then, the electronic device generates a user interface, where a size of the user interface is the same as a size of a second display window, a height of the second display window is equal to the height of the first display window, a width of the second display window is greater than the width of the first display window, and the user interface includes a first control corresponding to the first view node and a second control corresponding to the second view node. The electronic device stretches a width of the second control in the user interface based on a correspondence between the width of the second display window and the width of the first display window, where a height of the second control in the user interface remains unchanged, and the electronic device does not change a size and a layout of the first control in the user interface. The electronic device displays the user interface in the second display window. In this embodiment, a user interface of an application is self-adapted at a system level, so as to be applicable to any application. The application may generate a user interface whose quantity of controls is a quantity of controls that the application requires to display without modification. In addition, in this embodiment, some view nodes in the user interface are stretched, so that content in a user interface to be displayed by the application is not reduced. In addition, in this embodiment, widths of some view nodes in the user interface are not stretched in the user interface, so that processing load of a system can be reduced, processing steps can be simplified, and processing efficiency of interface display can be improved.

For example, the first display window may be a display window 901 in this embodiment.

For example, the second display window may be a display window 902 in this embodiment.

For example, a height of each display window and a height of space are optionally pixel values in a vertical direction. A width of the display window and a width of the space are optionally pixel values in a horizontal direction.

For example, the view tree is a ViewTree in this embodiment.

For example, the view node includes a View and/or a ViewGroup. The first view node may be a ViewGroup or a View, and the second view node may be a ViewGroup or a View.

For example, the electronic device generates, one by one in the user interface based on a sequence of the view tree, a control corresponding to each view node.

For example, after generating a control of the second view node, the electronic device stretches a width of the control of the second view node.

According to a first aspect, that the electronic device generates a user interface includes: The electronic device obtains first layout information of the first view node and second layout information of the second view node, where the first layout information indicates a position of the first view node in the second display window, and the second layout information indicates a position of the second view node in the second display window. The electronic device creates a canvas of the first view node based on the first layout information and draws control content of the first view node on the canvas of the first view node. The electronic device creates a canvas of the second view node based on the second layout information and draws control content of the second view node on the canvas of the second view node. In this way, in this embodiment, the canvas of the node is stretched, to implement a stretching operation on the control in the user interface.

For example, a control displayed in the user interface may be understood as a control corresponding to a view node. It should be noted that control content displayed in the user interface is only a part of content of the control, and may include a part that is not displayed, namely, a part that is not filled with an image in a canvas. A user may not see a part other than the control content on the canvas in the display interface. However, the part that is not displayed is also a part of the control, and may also be understood as a part of the control corresponding to the view node.

According to an implementation of the first aspect, that the electronic device stretches a width of the second control based on a correspondence between the width of the second display window and the width of the first display window includes: The electronic device stretches a width of the canvas of the second view node based on the correspondence between the width of the second display window and the width of the first display window, where the control content on the canvas of the second view node is stretched as the canvas is stretched. In this way, in this embodiment, the canvas is stretched, to stretch the control. In this embodiment, only a canvas corresponding to each view node is changed, and an actual position of the control is not changed. The actual position is a result of the control in a layout phase. It may be understood that in this embodiment, only content presented by each control in the display window is changed, and an actual position of the control in the display window in the layout phase is not changed, so that system processing complexity is reduced.

According to an implementation of the first aspect, that the electronic device obtains first layout information of the first view node and second layout information of the second view node includes: The electronic device measures the second view node based on the second display window, to obtain first size information of the second view node, where the first size information indicates a height and a width of the second view node in the second display window; the electronic device detects that a type of the second view node and the first size information meet a first preset condition, and remeasures the second view node to obtain second size information, where the second size information indicates a height and a width of the second view node in the second display window, and a ratio of the width indicated by the second size information to the width indicated by the first size information is equal to a ratio of the width of the first display window to the width of the second display window; and the height indicated by the second size information is the same as the height indicated by the first size information, or a ratio of the height indicated by the second size information to the height indicated by the first size information is equal to the ratio of the width of the first display window to the width of the second display window; and the electronic device lays out the second view node based on the second display window and the second size information, to obtain the second layout information of the second view node. In this way, in this embodiment, for a node of a large media type, for example, a node of a large picture type, the electronic device may compress the node to reduce occupation of the node in the vertical direction, thereby avoiding reduction of content in the user interface. In addition, the electronic device stretches the node, so that a width of the node is adapted to the second display window, thereby improving aesthetics of the user interface.

According to an implementation of the first aspect, the first preset condition includes: a type of a view node is a media type, and a width of the view node in the second display window is greater than a preset threshold, where the media type indicates that the control content corresponding to the second view node is a picture or a video. In this way, in this embodiment, some picture nodes that may be distorted or increase occupation of the user interface may be processed, to improve aesthetics of the user interface.

For example, in this embodiment, different preset conditions are set, so that an abnormal node, namely, a node that may affect aesthetics of the user interface, can be identified. In addition, in this embodiment, different processing policies are set for different preset conditions, and the electronic device may process a node based on a corresponding processing policy, to effectively improve aesthetics of the user interface.

According to an implementation of the first aspect, after the electronic device stretches the width of the second control based on the correspondence between the width of the second display window and the width of the first display window, the method further includes: The electronic device restores the control content of the second view node to a state before the stretching, where the width of the canvas of the second view node is still a width after the stretching, and the control content of the second view node is displayed in the middle of the canvas of the second view node after being restored; and the electronic device fills a part other than the control content on the canvas of the second view node with a target image. In this way, in this embodiment, a large picture is processed correspondingly, so that deformation of the large picture after being stretched can be avoided. In addition, a canvas of the large picture is filled, so that aesthetics of the picture can be effectively improved.

According to an implementation of the first aspect, the target image is consistent with partial content of the control content, or the target image is an image obtained after Gaussian blur processing is performed on partial content of the control content.

According to an implementation of the first aspect, that the electronic device obtains first layout information of the first view node and second layout information of the second view node includes: The electronic device measures the second view node based on a second display window, to obtain third size information of the second view node, where the third size information indicates a height and a width of the second view node in the second display window; the electronic device detects that a type of the second view node and the third size information meet a second preset condition, and determines that the second view node is a node that needs to be stretched; and the electronic device lays out the second view node based on the second display window and the third size information, to obtain the second layout information of the second view node. In this way, the electronic device may stretch a node whose width in the second display window is within a preset range, to improve aesthetics of the user interface.

According to an implementation of the first aspect, the second preset condition includes: a type of a view node is a ViewGroup view group type, and a width of the view node in the second display window is within a preset range.

According to an implementation of the first aspect, the second view node includes a plurality of child view nodes, and that the electronic device generates a user interface includes: The electronic device obtains layout information of the plurality of child view nodes, where the layout information of each child view node indicates a position of the child view node in the second display window; and the electronic device creates canvases of the plurality of child view nodes based on the layout information of the plurality of child view nodes, and draws, on the canvas corresponding to each child view node, control content corresponding to each child view node.

According to an implementation of the first aspect, after the electronic device stretches the width of the second control based on the correspondence between the width of the second display window and the width of the first display window, the method further includes: The electronic device stretches widths of the canvases of the plurality of child view nodes based on the correspondence between the width of the second display window and the width of the first display window, where the control content on the canvases of the plurality of child view nodes is stretched as the canvases are stretched. In this way, the electronic device may stretch the view node and a child node thereof, so that the child node does not need to be determined as an abnormal node. In this way, system processing complexity is reduced. In addition, the child node and the parent node are stretched at the same time, so that aesthetics of the user interface can be further improved.

According to an implementation of the first aspect, after the electronic device stretches the width of the second control based on the correspondence between the width of the second display window and the width of the first display window, the method further includes: The electronic device restores a width of a canvas of at least one of the plurality of child view nodes to a width before the stretching. In this way, after canvases of controls are stretched, canvases of some controls may be restored, to avoid control content distortion caused by stretching.

According to an implementation of the first aspect, the at least one child view node is of a text type and/or a small media type. The small media type indicates that the width of the canvas of the child view node is less than a preset threshold, and control content of the child view node is media data. The text type indicates that the control content of the child view node is text.

According to an implementation of the first aspect, the second view node includes a plurality of child view nodes. That the electronic device obtains first layout information of the first view node and second layout information of the second view node includes: The electronic device measures the second view node and the plurality of child view nodes based on the second display window, to obtain the fourth size information of the second view node and size information of the plurality of child view nodes, where the fourth size information indicates a height and a width of the second view node in the second display window, and the size information of the plurality of child view nodes indicates widths and heights of the child view nodes in the second display window; the electronic device lays out the second view node based on the second display window and the fourth size information, to obtain fourth layout information of the second view node, where the fourth layout information is different from the second layout information; the electronic device lays out the plurality of child view nodes based on the second display window and the size information of the plurality of child view nodes, to obtain layout information of the plurality of child view nodes, where the layout information of the plurality of child view nodes indicates positions of the plurality of child view nodes in the second display window; the electronic device determines, based on the fourth size information and the layout information of the plurality of child view nodes, that the second view node meets a third preset condition; the electronic device remeasures the second view node to obtain fifth size information of the second view node, where the fifth size information indicates a height and a width of the second view node in the second display window, a ratio of the width indicated by the fifth size information to the width indicated by the fourth size information is equal to a ratio of the width of the first display window to the width of the second display window, and the height indicated by the fifth size information is the same as the height indicated by the fourth size information; and the electronic device re-lays out the second view node based on the second display window and the fifth size information, to obtain the second layout information of the second view node. In this way, the electronic device may determine, based on a size and a layout of the node, whether the node needs to be stretched. A node that meets the third preset condition may also be understood as an abnormal node that may affect aesthetics of the user interface, and the electronic device stretches the abnormal node, to improve aesthetics of the user interface.

According to an implementation of the first aspect, the third preset condition includes the following.

A width of a view node in the second display window is greater than a preset threshold, and a width occupied by a plurality of child nodes of the view node in the second display window is within a preset range, where the preset threshold is greater than a maximum value of the preset range.

According to an implementation of the first aspect, the user interface further includes child controls corresponding to the plurality of child view nodes.

According to an implementation of the first aspect, that the electronic device stretches a width of the second control based on a correspondence between the width of the second display window and the width of the first display window includes: The electronic device stretches, based on the correspondence between the width of the second display window and the width of the first display window, the width of the second control and widths of the child controls corresponding to the plurality of child view nodes.

According to an implementation of the first aspect, the second view node includes a plurality of child view nodes. That the electronic device obtains first layout information of the first view node and second layout information of the second view node includes: The electronic device measures the first view node and the plurality of child view nodes based on the second display window, to obtain sixth size information of the first view node and size information of the plurality of child view nodes, where the sixth size information indicates a height and a width of the first view node in the second display window, and the size information of the plurality of child view nodes indicates widths and heights of the child view nodes in the second display window; the electronic device lays out the first view node based on the second display window and the sixth size information, to obtain the first layout information of the first view node; the electronic device lays out the plurality of child view nodes based on the second display window and the size information of the plurality of child view nodes, to obtain layout information of the plurality of child view nodes, where the layout information of the plurality of child view nodes indicates positions of the plurality of child view nodes in the second display window; and the electronic device determines, based on the sixth size information and the layout information of the plurality of child view nodes, that the first view node meets a fourth preset condition, and that a width of a control of the first view node and widths of controls of the plurality of child view nodes in the user interface do not need to be adjusted. In this way, the electronic device may determine, based on a width and a layout of each of a node and a child node thereof, that some nodes do not need to be stretched. To be specific, the electronic device stretches only a node that may affect aesthetics of the user interface, and does not need to stretch a node that does not affect aesthetics. In this way, system processing complexity is effectively reduced.

According to an implementation of the first aspect, the fourth preset condition includes at least one of the following: A width of a view node in the second display window is greater than a preset threshold, and a width occupied by the plurality of child view nodes in the second display window is not within a preset range, where the preset threshold is greater than a maximum value of the preset range; the width of the view node in the second display window is greater than the maximum value of the preset range and is less than the preset threshold; and the width of the view node in the second display window is less than a minimum value of the preset range.

According to an implementation of the first aspect, the method further includes: receiving a touch operation on the second control in a user interface in the second display window, where the touch operation is at a first position in the second display window, a distance between the first position and a left edge of the second display window is a first distance value, and a distance between the first position and an upper edge of the second display window is a second distance value; determining, based on the second layout information, a second position to which the first position is mapped in the second view node, where a distance between the second position and the left edge of the second display window is a third distance value, a distance between the second position and the upper edge of the second display window is a fourth distance value, a ratio of the first distance value to the third distance value is equal to a ratio of the width of the second display window to the width of the first display window, and the second distance value is equal to the fourth distance value; and determining, based on the second position, that the touch operation corresponds to the second view node. In this way, in this embodiment, only a position of the stretched control displayed in the interface is changed, and an actual position of the control, namely, a position obtained by the electronic device in a layout process, is not changed. Correspondingly, when dispatching a touch event, the electronic device may obtain, based on a mapping relationship between the control in the user interface and a layout phase, a control actually operated by the user, and perform a corresponding operation.

According to an implementation of the first aspect, the target application is any third-party application in the electronic device.

According to an implementation of the first aspect, the electronic device is an inward foldable mobile phone, an outward foldable mobile phone, an in-vehicle device, a wearable device, and/or a television.

According to a second aspect, an embodiment provides an electronic device, including one or more memories, a foldable display, and one or more processors, where the one or more memories are coupled to the one or more processors, the one or more memories are configured to store computer program code, the program code includes computer instructions, and when the one or more processors execute the computer instructions, the electronic device is enabled to perform instructions of the method in the first aspect or any possible implementation of the first aspect.

The second aspect and any implementation of the second aspect respectively correspond to the first aspect and any implementation of the first aspect. For technical effects corresponding to the second aspect and any implementation of the second aspect, refer to technical effects corresponding to the first aspect and any implementation of the first aspect. Details are not described herein again.

According to a third aspect, an embodiment provides a computer-readable medium, configured to store a computer program, where the computer program includes instructions for performing the method according to the first aspect or any possible implementation of the first aspect.

According to a fourth aspect, an embodiment provides a computer program, where the computer program includes instructions for performing the method according to the first aspect or any possible implementation of the first aspect.

According to a fifth aspect, an embodiment provides a chip, where the chip includes a processing circuit and a transceiver pin. The transceiver pin and the processing circuit communicate with each other through an internal connection path. The processing circuit performs the method according to the first aspect or any possible implementation of the first aspect, to control a receiving pin to receive a signal and a sending pin to send a signal.

BRIEF DESCRIPTION OF DRAWINGS

FIG. 7e(1) and FIG. 7e(2) are a diagram of an example of a user interface;

FIG. 22a(1) to FIG. 22a(3) are a diagram of an example of a node restoration process;

DESCRIPTION OF EMBODIMENTS

The following clearly and completely describes the technical solutions in embodiments of this application with reference to the accompanying drawings in embodiments of this application. It is clear that the described embodiments are some but not all of embodiments of this application.

Figure 1:
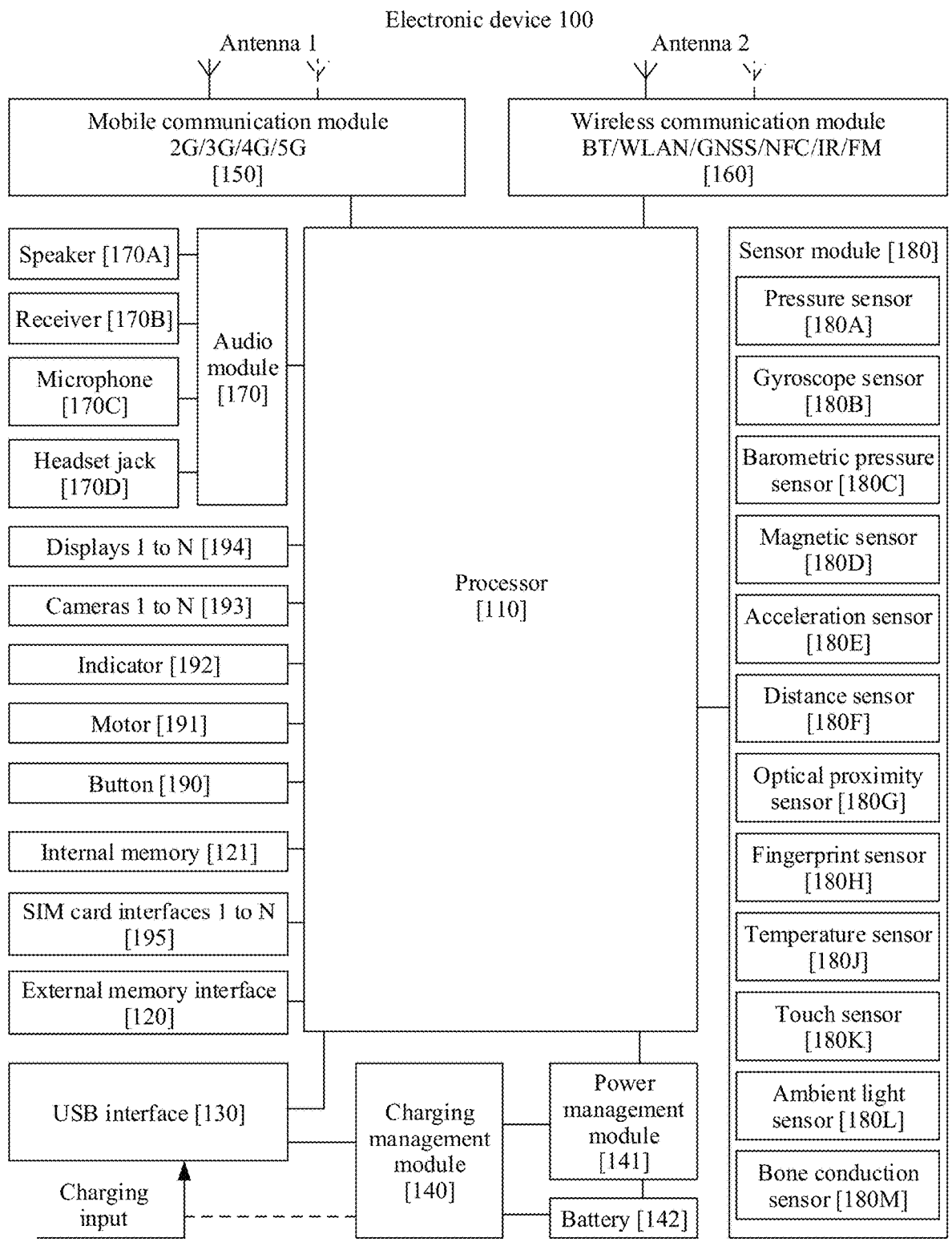
FIG. 1 is a diagram of an example of a hardware structure of an electronic device.

FIG. 1 is a diagram of a structure of an electronic device 100. It should be understood that the electronic device 100 shown in FIG. 1 is merely an example of electronic devices, and the electronic device 100 may have more or fewer components than those shown in the figure, or may combine two or more components, or may have different component configurations. The various components shown in FIG. 1 may be implemented in hardware including one or more signal processing circuits and/or application-specific integrated circuits, software, or a combination of hardware and software.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

A memory may be further disposed in or external to the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that is applied to the electronic device 100 and that includes 2G/3G/4G/5G or the like. The mobile communication module 150 may include at least one filter, a switch, a power amplifier, a low noise amplifier (low noise amplifier, LNA), and the like.

The wireless communication module 160 may provide a wireless communication solution that is applied to the electronic device 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processor module.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology.

The electronic device 100 implements a display function through the GPU, the display 194, the application processor, and the like. The GPU is a microprocessor for image processing, and is connected to the display 194 and the application processor. The GPU is configured to: perform mathematical and geometric computations, and to render an image. The processor 110 may include one or more GPUs, which execute program instructions to generate or change display information.

Figure 2:
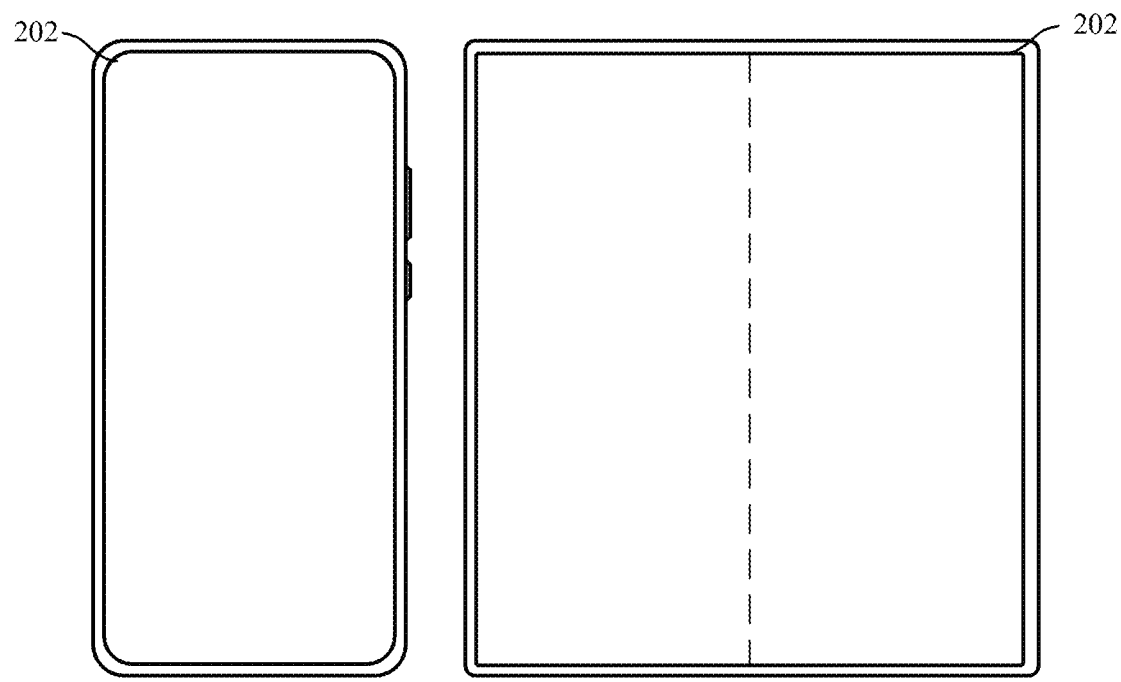
FIG. 2 is a diagram of an example of a foldable mobile phone.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode or an active-matrix organic light-emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194, where N is a positive integer greater than 1. For example, FIG. 2 is a diagram of an inward foldable mobile phone. Refer to FIG. 2. The foldable mobile phone includes an outer display (outer screen for short) 201 and an inner display (inner screen for short) 202. A height of the outer screen 201 is equal to a height of the inner screen 202, and a screen width of the inner screen 202 is twice a screen width of the outer screen 201. Certainly, the display in FIG. 2 is merely an example.

In another embodiment, a ratio of the inner screen to the outer screen may alternatively be another ratio. For example, the outer screen 201 may be a screen smaller than a housing of the mobile phone, for example, a square screen, or a rectangular screen smaller than the outer screen 201 shown in FIG. 2, and is disposed in the middle or any area of a housing of the screen of the mobile phone. The inner screen may be the same as that in FIG. 2. A specific size and proportion of the screen may be set according to an actual requirement. This is not limited in this application. It should be noted that, in addition to the inward foldable mobile phone shown in embodiments of this application, the foldable mobile phone may further include a foldable mobile phone in another form, for example, an outward foldable mobile phone. This is not limited in this application. Details are not described in the following again. It should be further noted that, in embodiments of this application, only an interface display of the foldable mobile phone is used as an example for description. In another embodiment, an interface display solution in this embodiment may also be applied to a device like a tablet, an in-vehicle device, or a television, whose aspect ratio of a screen differs greatly from that of a bar-type mobile phone. Specific implementation is the same as that of inner screen display of the foldable mobile phone. Examples are not described one by one again in this application.

The electronic device 100 may implement a photographing function through the ISP, the camera 193, the video codec, the GPU, the display 194, the application processor, and the like.

The external memory interface 120 may be used to connect to an external storage card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to code and decode an audio signal. In some embodiments, the audio module 170 may be disposed in the processor 110, or some functional modules in the audio module 170 are disposed in the processor 110.

A software system of the electronic device 100 may use a layered architecture, an event-driven architecture, a microkernel architecture, a micro service architecture, or a cloud architecture. In this embodiment, an Android system with a layered architecture is used as an example to describe a software structure of the electronic device 100.

Figure 3:
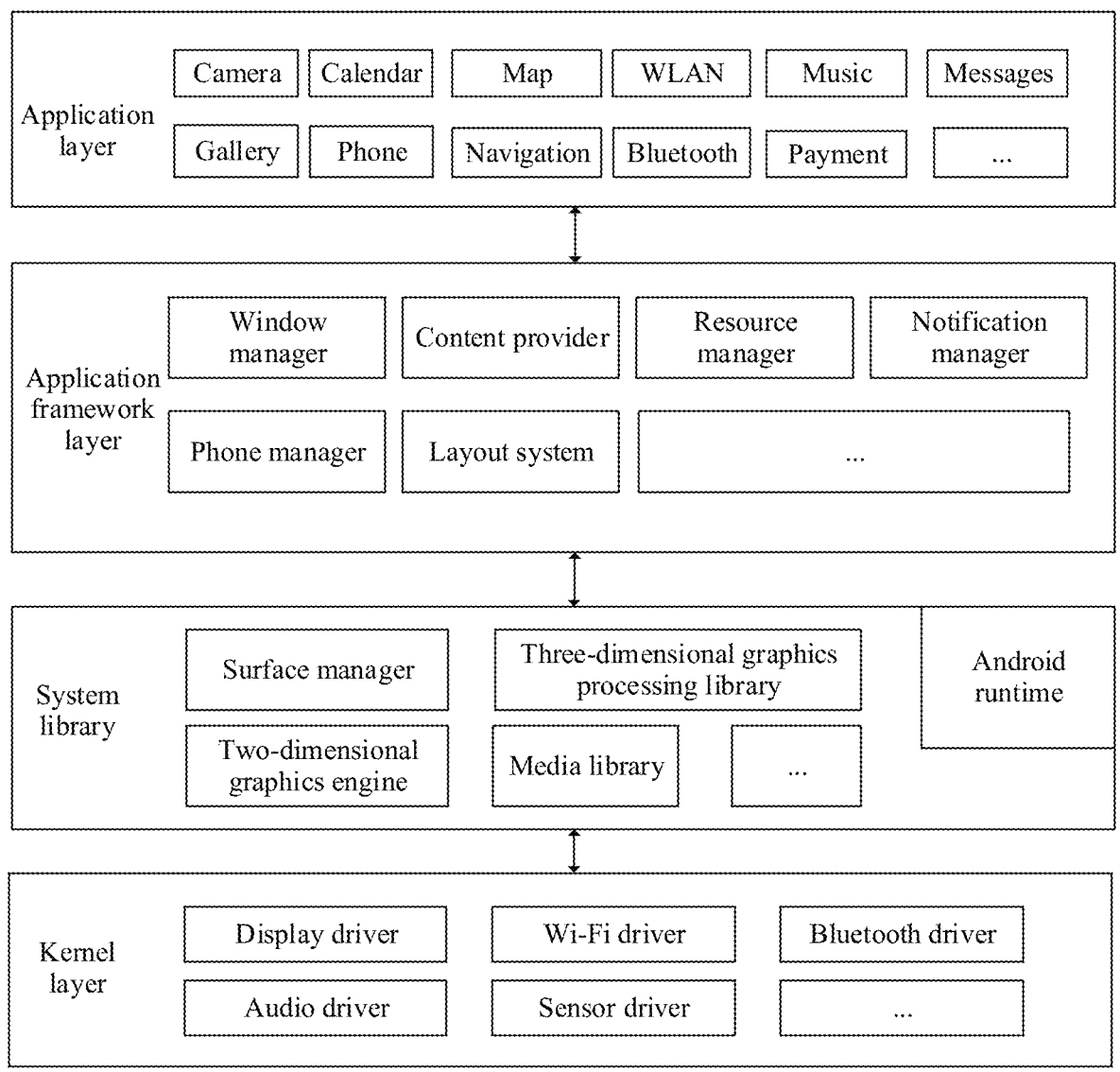
FIG. 3 is a diagram of an example of a software structure of an electronic device.

FIG. 3 is a block diagram of the software structure of the electronic device 100 according to this embodiment.

In a layered architecture of the electronic device 100, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 3, the application packages may include applications such as Camera, Gallery, Calendar, Phone, Map, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 3, the application framework layer may include a window manager, a content provider, a view system, a phone manager, a resource manager, a notification manager, a layout system, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, an audio, calls that are made and answered, a browsing history and bookmarks, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The phone manager is configured to provide a communication function for the electronic device 100, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is configured to: notify download completion, give a message notification, and the like. The notification manager may alternatively be a notification that appears in a top status bar of the system in a form of a graph or a scroll bar text, for example, a notification of an application that is run on a background, or may be a notification that appears on a screen in a form of a dialog window. For example, text information is displayed in the status bar, an announcement is given, the electronic device vibrates, or an indicator light blinks.

The layout system may properly arrange and lay out elements based on an interface element (which may also be referred to as a window element, a page element, or the like, and this is not limited in this application) input by an application, and draw a user interface.

The Android runtime includes a kernel library and a virtual machine. The Android runtime is responsible for scheduling and management of the Android system.

The kernel library includes two parts: a function that needs to be called in Java language and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, such as a surface manager (surface manager), a media library (Media Library), a three-dimensional graphics processing library (for example, OpenGL ES), and a 2D graphics engine (for example, SGL).

The surface manager is configured to manage a display subsystem, and provides fusion of 2D and 3D layers for a plurality of applications.

The media library supports playback and recording in a plurality of commonly used audio and video formats, and static image files. The media library supports a plurality of audio and video encoding formats.

The three-dimensional graphics processing library is configured to: implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

It may be understood that components included in the system framework layer, and the system library and runtime layer that are shown in FIG. 3 do not constitute any specific limitation on the electronic device 100. In some other embodiments of this application, the electronic device 100 may include more or fewer components than those shown in the figure, or some components may be combined, or some components may be split, or different component arrangements may be used.

Figure 4:
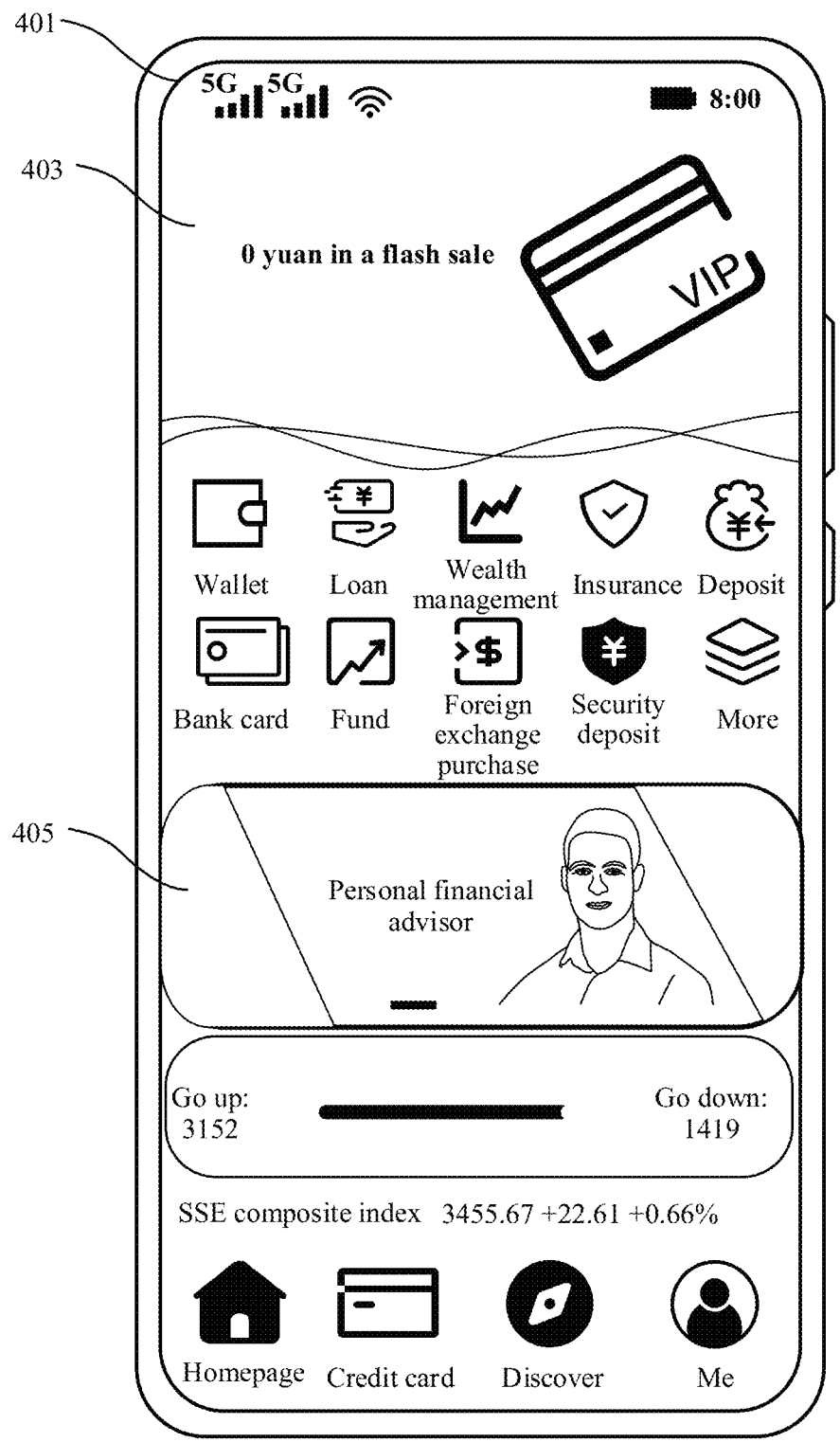
FIG. 4(1) to FIG. 4(3) are a diagram of an example of a user interface of a foldable mobile phone.
Figure 4:
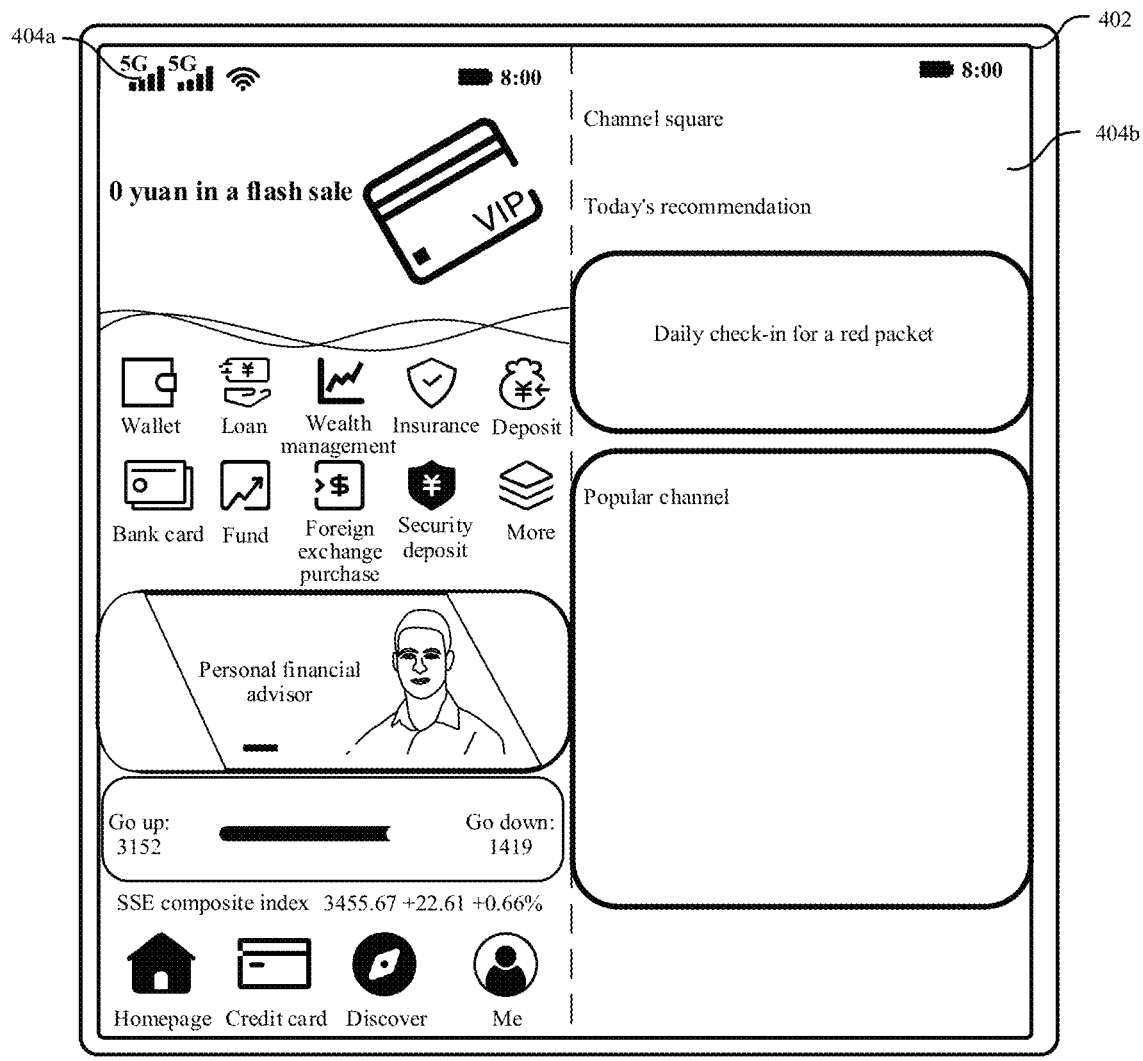
Figure 4:
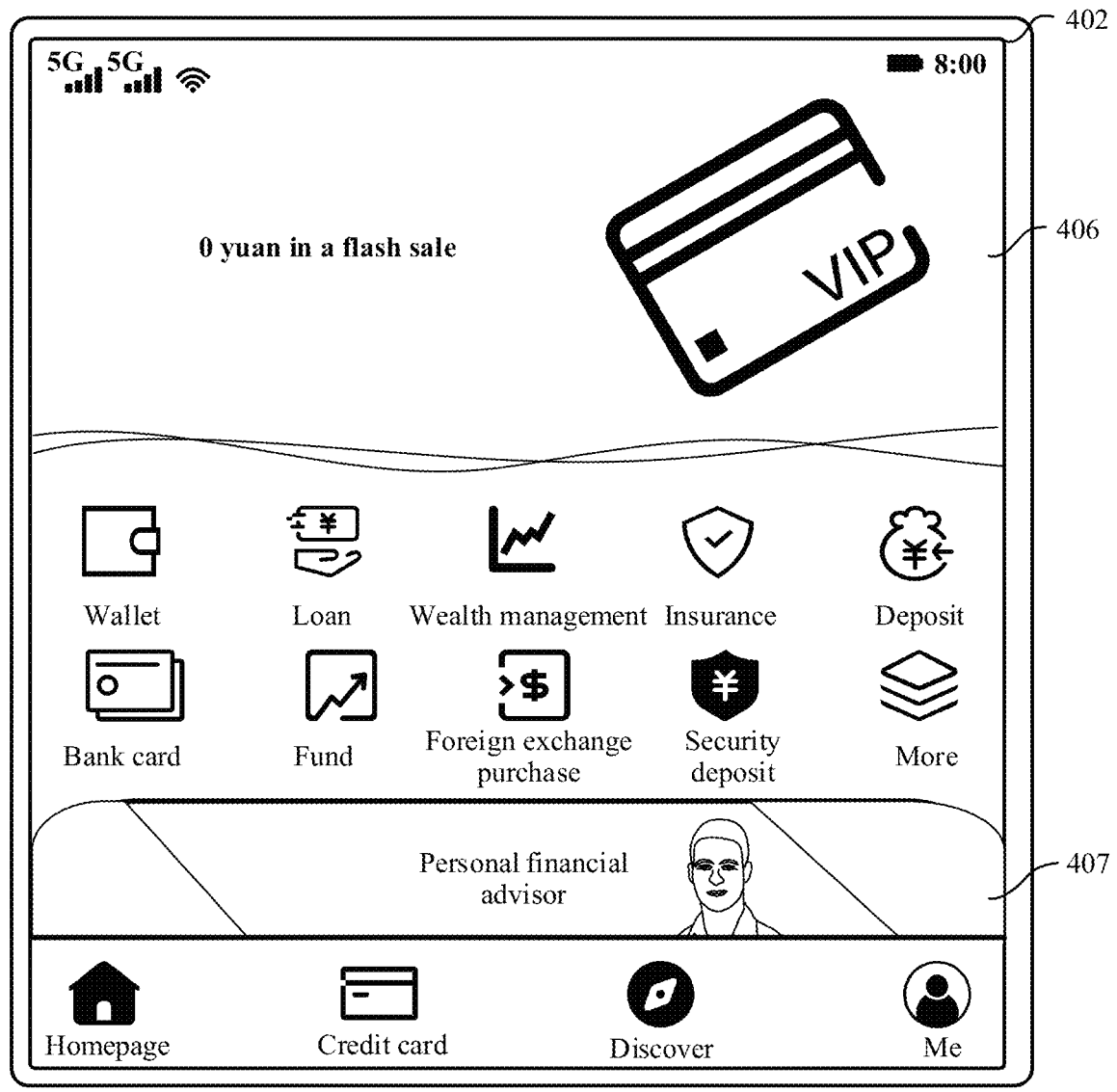

FIG. 4(1) to FIG. 4(3) are a diagram of an example of a user interface of a foldable mobile phone. Refer to FIG. 4(1) to FIG. 4(3). For example, resolution of an outer screen 401 of the foldable mobile phone is 2700*1100 pixels, and resolution of an inner screen 402 of the foldable mobile phone is 2700*2200 pixels. In other words, a width of a display interface of the inner screen 402 is twice a width of a display interface of the outer screen 401. The resolution in this embodiment is merely an example, and is not limited in this application.

As shown in FIG. 4(1), a user interface 403 (which may also be referred to as an application interface, an application display interface, or the like, and this is not limited in this application) of a payment application is displayed on the outer screen 401 of the foldable mobile phone. The user interface 403 is displayed in full screen on the outer screen 401. To be specific, resolution corresponding to the user interface 403 is 2700*1100 pixels, and the resolution is the same as a size of the outer screen 401. It should be noted that the size in this embodiment, for example, a size of a screen, is a size that can be used for displaying interface content on the screen, instead of an actual appearance size of the screen. Details are not described in the following again.

A user may open a foldable screen, so that the foldable screen changes from a folded state (namely, a state shown in FIG. 4(1)) to an unfolded state (for example, a state shown in FIG. 4(2) or FIG. 4(3)). The foldable mobile phone in the unfolded state displays the user interface of the payment application on the inner screen. Currently, an application interface created by a third-party application is generally applicable to a horizontal-to-vertical ratio (which may also be referred to as an aspect ratio, namely, a ratio of a width to a height of a screen) of a screen of a bar-type mobile phone. Generally, the aspect ratio of the screen (or the outer screen of the foldable mobile phone) of the bar-type mobile phone is approximately (or close to) 1:2. For example, when resolution is 2700*1100 pixels, the aspect ratio of the inner screen of the foldable mobile phone is generally 1:1 or close to 1:1. Therefore, a user interface that is of the third-party application in the mobile phone and that is laid out based on the aspect ratio of the bar-type mobile phone is not applicable to the inner screen, with the aspect ratio of 1:1 (or close to 1:1, which is not repeatedly described below) of the foldable screen.

FIG. 4(2) shows an example of a display manner of a user interface on an inner screen. In the example shown in FIG. 4(2), a user interface of an application is displayed on the inner screen 402 in a multi-interface manner (which may also be referred to as a parallel view manner). Refer to FIG. 4(2). When an application interface is displayed on the inner screen 402, the mobile phone may display a user interface 404a of the payment application on a left half screen (namely, a dashed-line left half area) of the inner screen 402, and display a user interface 404b of the payment application on a right half screen (namely, a dashed-line right half area) of the inner screen 402. Content displayed in the user interface 404a is different from that displayed in the user interface 404b. For example, the user interface 404b may display a user interface displayed by the mobile phone in response to a received user's tap on a "Discover" control (which may also be referred to as a button, a component, an element, an option, or the like, and this is not limited in this application) in the user interface 404a. An aspect ratio of each of the left half screen and the right half screen of the inner screen 402 is close to that of the screen of the bar-type mobile phone. For example, if a size of the inner screen 402 is 2700*2200, the aspect ratio of each of the left half screen and the right half screen is 2700*1100. It may be understood that, in the example shown in FIG. 4(2), two user interfaces of the third-party application are displayed on the inner screen 402 by using two display windows (namely, a display window of the left half screen and a display window of the right half screen) having a same (or similar) aspect ratio as that of the screen of the bar-type mobile phone. A size of a display window corresponding to each user interface is equivalent to a size of a display window of the bar-type mobile phone. Therefore, in this example, the third-party application is still laid out based on a display window whose aspect ratio is approximately 1:2, and an interface layout of the third-party application does not need to be changed. In addition, content of each page in a plurality of pages displayed by the mobile phone is the same as content displayed by the bar-type mobile phone (or a housing of the foldable mobile phone).

FIG. 4(3) shows an example of another display manner of a user interface on an inner screen. In the example shown in FIG. 4(2), a user interface of an application is displayed on the inner screen 402 in a manner of stretching the interface, or in a manner that may be understood as changing content displayed in the user interface. Refer to FIG. 4(3). For example, in the unfolded state, a user interface 406 of the application is displayed on the inner screen 402 of the mobile phone. In this example, when displaying the user interface of the application on the inner screen 402, the mobile phone properly enlarges the user interface, so that a size of the user interface is adapted to a size of the inner screen 402. However, as shown in FIG. 4(3), in the display manner, the user interface 406 displayed on the inner screen 402 has less content than the user interface 404a displayed on the outer screen 401, so that an amount of information displayed on the screen is reduced. For example, the user interface 403 on the outer screen 401 shown in FIG. 4(1) includes a picture 405. Because each element in the user interface 406 is enlarged for display, the element is moved down and stretched for display. Therefore, when the picture is displayed in the user interface 406, the picture is also moved down and stretched for display, for example, as a picture 407 shown in FIG. 4(3). In this example, the user interface of the third-party application needs to be re-laid out based on a size of a display window on the screen. In addition, as shown in FIG. 4(1) to FIG. 4(3), in a current display method, the user interface is displayed in a manner of changing interface content displayed on the display. For example, a multi-interface display manner is used in FIG. 4(2), and a manner of re-laying out elements in the interface is used in FIG. 4(3). The foregoing manner of changing the interface content displayed on the screen may not meet user's expectation for displaying the user interface.

An embodiment provides an interface display method, so that content of a user interface displayed on a large screen (for example, the inner screen 202 of the foldable screen shown in FIG. 2) whose aspect ratio has a large difference from that of the bar-type mobile phone is the same as content of a user interface displayed on a screen of the bar-type mobile phone. In other words, in the interface display method in this embodiment, a user interface is not displayed in a manner of enlarging an element of the user interface on the screen or adding an element of the user interface (for example, in a parallel view manner, namely, the manner shown in FIG. 4(2)), so that user experience is effectively improved.

Figure 5:
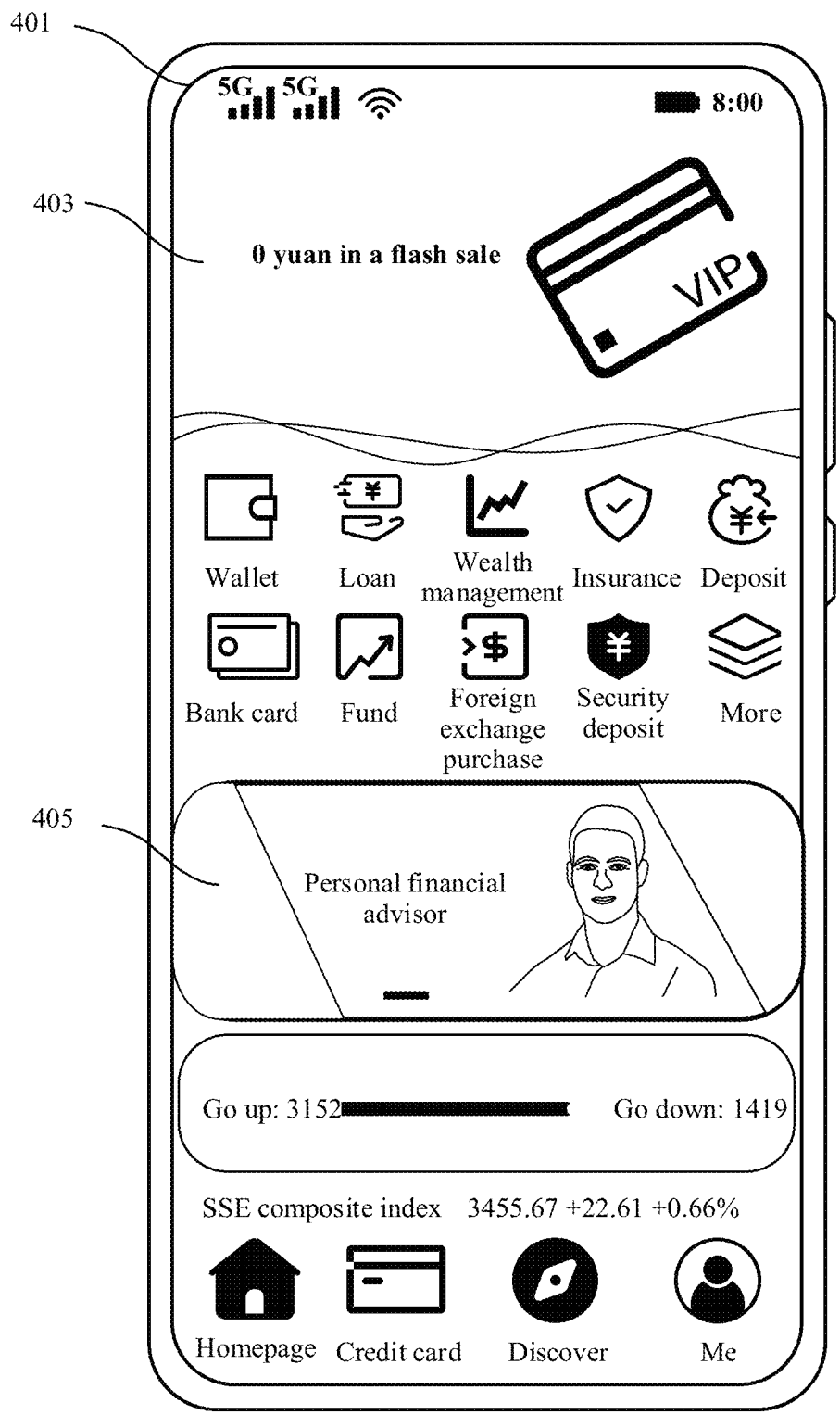
FIG. 5(1) and FIG. 5(2) are a diagram of an example of effect of applying an interface display method according to an embodiment.
Figure 5:
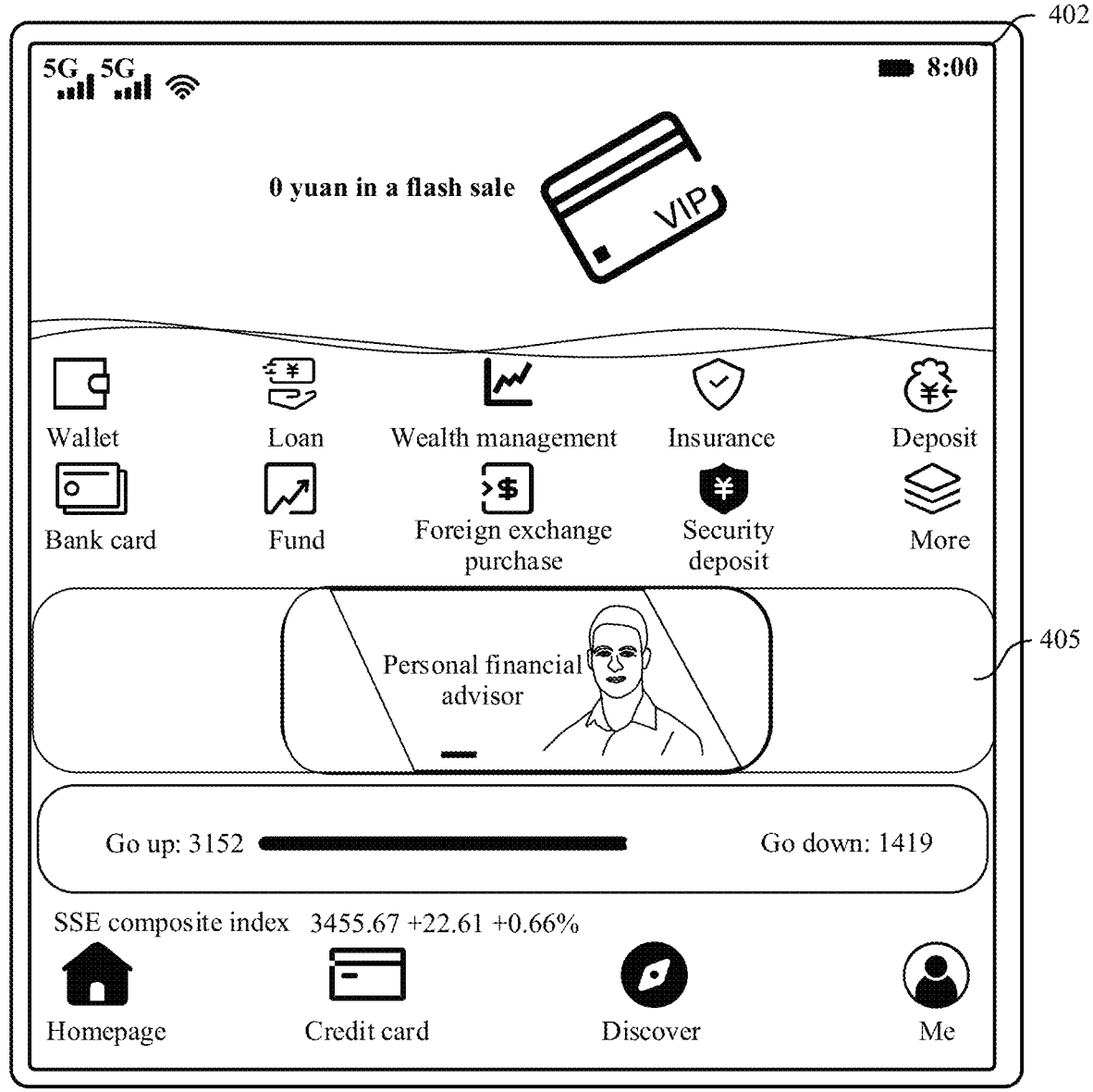

FIG. 5(1) and FIG. 5(2) are a diagram of an example of effect of applying an interface display method according to an embodiment. Refer to FIG. 5(1) and FIG. 5(2). An inward foldable mobile phone is still used as an example. The user interface 403 (for related description, refer to FIG. 4(1). Details are not described herein again) of the payment application is displayed on the outer screen 401 of the mobile phone. The mobile phone changes to an unfolded state in response to a received user operation of opening a foldable screen. The mobile phone displays a user interface 408 of the payment application on the inner screen 402. As shown in FIG. 5(1) and FIG. 5(2), an interface element included in the user interface 408 is the same as an interface element included in the user interface 403, or it may be understood that information displayed in the user interfaces is the same, so that an amount of information displayed may not be reduced when a screen size changes. In some embodiments, the user interface, displayed on the inner screen 402, of the payment application may further include more content (a specific example is described in detail in the following embodiment), so that viewing experience of the user interface, displayed on the inner screen 402, of the payment application, is closer to that of the bar-type mobile phone. In addition, when a user uses the foldable mobile phone, a user interface displayed by the foldable mobile phone in an unfolded state and a user interface displayed by the foldable mobile phone in a folded state have same or more content, or similar interface layouts. Therefore, in a process of switching the foldable mobile phone between the folded state and the unfolded state, continuity of a user interface displayed on the inner screen and the outer screen can be enhanced. Take a case in which the user views the picture 405 in the user interface 403 displayed on the outer screen 401 as an example. In the conventional technology shown in FIG. 4(1) to FIG. 4(3), after the folded state is changed to the unfolded state, a position of the picture 405 in an interface changes. This leads to poor display coherence of a user interface after switching between the folded state and the unfolded state is performed. In the solution in this embodiment, as shown in FIG. 5(1) and FIG. 5(2), after the folded state is switched to the unfolded state (certainly, the unfolded state may be switched to the folded state), a horizontal position of the picture 405 does not change. This can effectively enhance coherence of browsing a user interface by the user, and therefore improve user experience.

It should be noted that, in this embodiment, the inward foldable mobile phone is used as an example for description. For an outward foldable mobile phone, after the mobile phone is changed from a folded state to an expanded (semi-expanded) state, a size of a screen changes (the screen is widened), and an aspect ratio of the screen changes (the aspect ratio increases). The method described in this embodiment is also applicable.

Figure 6:
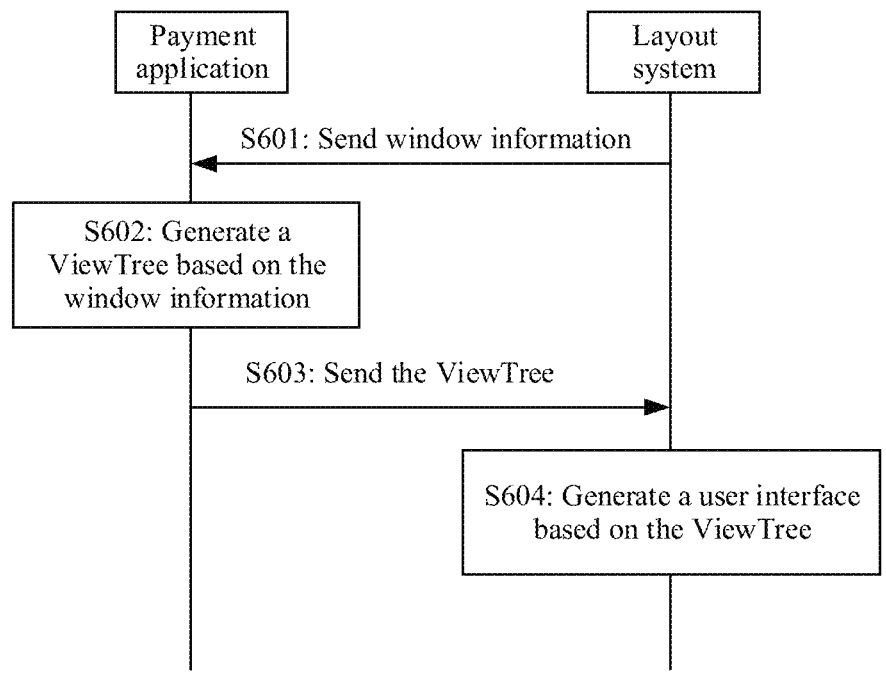
FIG. 6 is a schematic flowchart of an example of an interface display method.

Before the interface display method in this embodiment is described, a bar-type mobile phone is first used as an example to briefly describe an interface display principle and an interaction process of modules. FIG. 6 is a schematic flowchart of an example of an interface display method. Refer to FIG. 6. The method may specifically include but is not limited to the following steps.

S601: A layout system sends window information to a payment application.

For example, the payment application is still used as an example for description. One or more controls such as an application icon control, a battery control, and a network control may be included in a desktop of a mobile phone. The application icon control may include a payment application control and an icon control of another application. A user may tap an icon control corresponding to the payment application (which may also be referred to as a payment application icon for short), to trigger the payment application. The mobile phone runs the payment application in response to a received user operation. It should be noted that, in this embodiment, only interaction between the payment application and the layout system, namely, an interface display process of the payment application, is used for description. Actually, in a running process of the payment application, another module in the mobile phone, for example, a window management module, also cooperates to run. For specific execution details of the another module, refer to descriptions in embodiments of the conventional technology. Details are not described in this application.

For example, after the payment application is started, the layout system sends the window information to the payment application. The window information indicates a size of a window for displaying the user interface of the payment application on a screen of the mobile phone. In this example, an example in which the user interface of the payment application is displayed in full screen on the screen is used for description. Correspondingly, the window information sent by the layout system to the payment application indicates a window size (namely, a size of the screen) when the mobile phone displays the user interface of the payment application in full screen. For example, the window information indicates that the window size is 2700*1100 pixels when the user interface is displayed on the screen.

It should be noted that, in the user interface described in this embodiment, all related description manners are that the interface is displayed on the screen. In another embodiment, the user interface may alternatively be understood as being displayed on an application window (or may be referred to as a display window, an application display window, or the like). This is not limited in this application. Correspondingly, it may alternatively be understood that the window information indicates a size of a display window.

Figure 8:
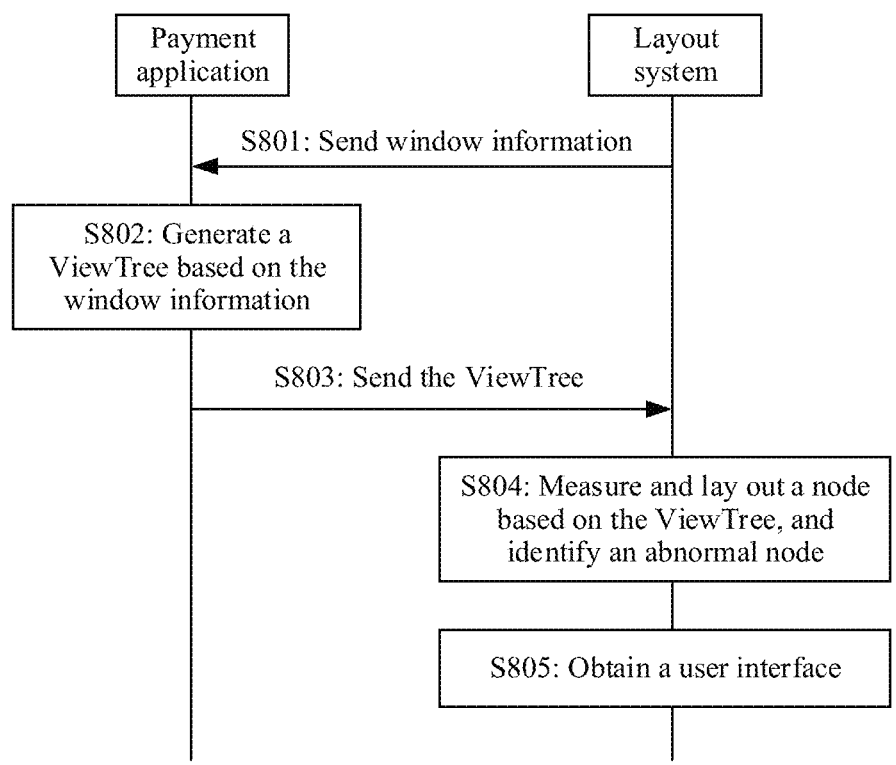
FIG. 8 is a schematic flowchart of an example of an interface display method.

It should be further noted that this embodiment and the embodiment shown in FIG. 8 are described by using an example in which a user interface is displayed in full screen on a display, that is, a size of a display window of an application is the same as a size of a screen. An embodiment in which a size of a display window is different from a size of a screen is described in the following embodiments. Details are not described herein.

S602: The payment application generates a ViewTree (view tree) based on the window information.

S603: The payment application sends the ViewTree to the layout system.

For example, the payment application receives the window information sent by the layout system, and may determine a size of a window on which the user interface is displayed. The payment application may generate a ViewTree based on an interface element and the window information. The interface element may be understood as an element included in an interface to be displayed on the display window. Optionally, the interface element may be locally cached by the application, or may be obtained by the application from a server. This is not limited in this application.

Figure 7A:
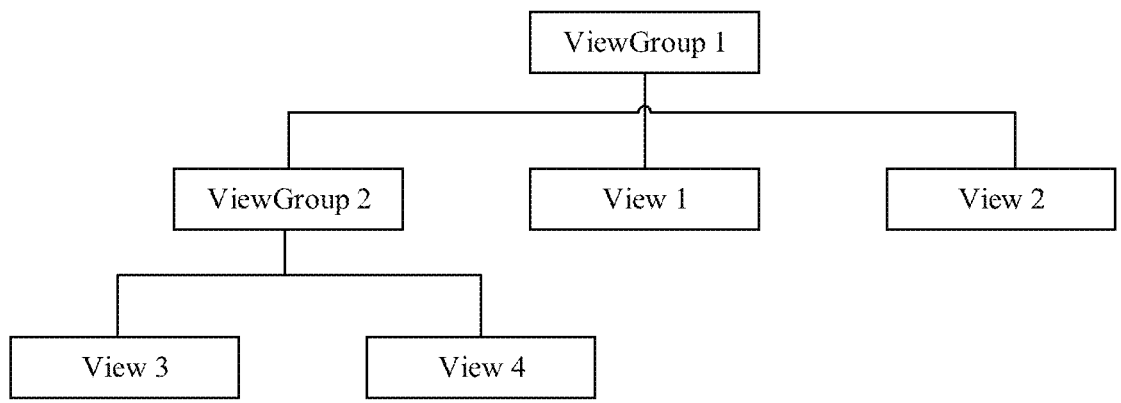
FIG. 7a is a diagram of an example of a structure of a ViewTree.

FIG. 7*a* is a diagram of an example of a structure of a ViewTree. Refer to FIG. 7*a*. Each user interface (or page) of an application corresponds to a ViewTree that describes a layout structure of the user interface (or page). A View (view) and a ViewGroup (ViewGroup) are constituent units of a ViewTree. It may also be understood as that a View and a ViewGroup are basic components of an Android UI (User Interface, user interface). The ViewGroup may include a View and/or a ViewGroup, and the ViewGroup is an extension of the View. ViewGroups and Views are nested in a tree structure layer by layer to form a ViewTree. In the description in this embodiment, the View and/or the ViewGroup in the ViewTree may also be referred to as a node/nodes in the ViewTree, or may be referred to as a component/components, an element/elements, or a control/controls in another embodiment. In other words, the "node" in this embodiment may be a View, or may be a ViewGroup. Details are not described in the following again.

An example in which the ViewTree displayed in FIG. 7*a* corresponds to the user interface 403 in FIG. 5(1) and FIG. 5(2) or FIG. 4(1) to FIG. 4(3) is used for description. It should be noted that, FIG. 7*a* optionally shows some nodes of the ViewTree corresponding to the user interface 403, and the ViewTree corresponding to the user interface 403 may include more or fewer nodes than that shown in FIG. 7*a*. This is not limited in this application.

Still refer to FIG. 7*a*. For example, a ViewGroup 1 is a root node of the ViewTree. The root node ViewGroup 1 may include at least one ViewGroup and/or at least one View. For example, the root node ViewGroup 1 may include a ViewGroup 2, a View 1, and a View 2. Each ViewGroup may further include at least one ViewGroup and/or at least one View. For example, the ViewGroup 2 includes a View 3 and a View 4. The ViewGroup 1 is a parent node of the ViewGroup 2, the View 1, and the View 2. Correspondingly, the ViewGroup 2, the View 1, and the View 2 are child nodes of the ViewGroup 1. The ViewGroup 2 is a parent node of the View 3 and the View 4, and the View 3 and the View 4 are child nodes of the ViewGroup 2.

For example, each node in the ViewTree corresponds to respective declaration information (which may also be referred to as attribute information, description information, or the like, and is not limited in this application). The declaration information includes but is not limited to: layout information indicating a control (or a component, an element, or the like) corresponding to the node in a display window (the display window is a window indicated by the window information in S601), and type information indicating a type of the node. It should be noted that the type of the node may alternatively be understood as a type of a control corresponding to the node. Details are not described in the following again.

In this embodiment, a node (for example, a View) may be understood as being corresponding to a control. Alternatively, it may be understood as that a node is a control. This is not limited in this application. For example, in the description of this embodiment, optionally, a "Wallet" control is a "Wallet" control displayed in the user interface, or may represent a View or a ViewGroup corresponding to the "Wallet" control, or may represent a graph of the "Wallet" control in the user interface.

For example, the layout information indicates a position and a size of a View or a ViewGroup in a parent node of the View or the ViewGroup, or may be understood as indicating a position and a size of a View or a ViewGroup on a display window. In other words, when obtaining the position and the size of the View or the ViewGroup in the parent node of the View or the ViewGroup, the mobile phone may obtain the position and the size of the View or the ViewGroup on the display window in an associated manner.

Optionally, in the layout information of the node indicated by the application, information (which may be referred to as size information) indicating a node size may be indicated in a fixed-value manner, or may be indicated in a proportion-value manner, or may be indicated in another manner. This may be specifically set according to an actual requirement. This is not limited in this application. For example, size information of the ViewGroup 2 indicates that a width of the ViewGroup 2 is 1100 pixels, and a height of the ViewGroup 2 is 20 pixels, that is, both the width and the height of the ViewGroup 2 are fixed values. For another example, size information of the ViewGroup 2 indicates that a width of the ViewGroup 2 is 1100 pixels, and a height of the ViewGroup 2 is 50% of the width, that is, the width of the ViewGroup 2 is a fixed value, and the height of the ViewGroup 2 is a proportion value. For another example, size information of the ViewGroup 2 indicates that a height of the ViewGroup 2 is 100 pixels, and a width of the ViewGroup 2 is 80% of a width of the parent node, that is, the width of the ViewGroup 2 is a fixed value, and the height of the ViewGroup 2 is a proportion value. For another example, a width of the ViewGroup 2 is 80% of a width of the parent node, and a height is 50% of the width, that is, both the height and the width of the ViewGroup 2 are proportion values. In other words, the "proportion value" in this embodiment indicates that a width and/or a height of a node change/changes with another factor, and is a non-fixed value. For example, when size information of a node whose node type (or control type) is a text type is a proportion value, the proportion value may be understood as that a node length is adapted to a text length. For example, if a width of a text is 200 pixels and a height of the text is 20 pixels, a width of the node is 200 pixels and a height of the node is 20 pixels. Certainly, the height and the width of the node may alternatively be slightly greater than the width and the height of the text. This is not limited in this application. A manner of declaring the size information in this embodiment is merely an example. Manners of declaring different nodes of different applications may be the same or different, and specifically depend on settings of the applications. This is not limited in this application. In this embodiment, the nodes may be correspondingly processed based on different declaration information of the different applications, so that each control in the user interface is adapted to a large screen display scenario.

Optionally, in the layout information of the node indicated by the application, information (which may be referred to as position information) indicating a position of the node may be indicated in an alignment manner, a proportional manner, a fixed-value manner, or the like. This may be specifically set according to an actual requirement. This is not limited in this application.

For example, the alignment manner may include but is not limited to: a left alignment manner, a center alignment manner, a right alignment manner, and the like. Optionally, in the left alignment manner, a left edge of the node is aligned with a specified edge (for example, a left edge of the parent node, or a left edge or a right edge of another node). Optionally, in the center alignment manner, the node is in the center of the parent node. Optionally, in the right alignment manner, a right edge of the node is aligned with a specified edge (for example, a left edge of the parent node, or a left edge or a right edge of another node).

For example, the alignment manner may further indicate top alignment of a plurality of Views, bottom alignment of a plurality of Views, and the like. For example, the View 1 is left-aligned with the parent node, and tops of the View 2 and the View 1 are aligned. In this case, in a subsequent layout process, the layout system aligns a left edge of the View 1 with a left edge of the parent node, and tops (namely, upper edges) of the View 2 and the View 1 are aligned. In other words, in the user interface, a control corresponding to the View 2 and a control corresponding to the View 1 are displayed in a same row.

For example, the fixed-value manner may indicate a distance between any edge of the node and any edge of the parent node. For example, position information of the View 1 indicates that a distance between the left edge of the View 1 and the left edge of the parent node (the ViewGroup 2) is 80 pixels. Position information of the View 2 indicates that a distance between the right edge of the View 2 and the right edge of the parent node (the ViewGroup 2) is 80 pixels, and the tops of the View 1 and the View 2 are aligned. Correspondingly, in the layout process, the layout system obtains positions of the View 1 and the View 2 in the user interface, namely, a distance of 80 pixels between the left edge of the View 1 and the left edge of the ViewGroup 2, a distance of 80 pixels between the right edge of the View 2 and the right edge of the parent node ViewGroup 2, and alignment between the upper edge of the View 1 and the upper edge of the View 2.

For example, the position information of the node indicates only some information of the node, for example, the position information of the View 1 indicates that the View 1 is left-aligned with the ViewGroup 2, that is, the position information indicates a position of the View 1 in a horizontal direction of the ViewGroup 2, but does not indicate a position of the View 1 in a vertical direction of the ViewGroup 2. In this case, in the layout process, the layout system may perform a layout based on a quantity of nodes included in the vertical direction of the ViewGroup 2. Specific setting may be made according to an actual requirement, and this is not limited in this application.

For example, the fixed-value manner may alternatively indicate an interval between Views. For example, the position information of the View 1 and the position information of the View 2 indicate that the tops of the View 1 and the View 2 are aligned, and a distance between the View 1 and the View 2 is 80 pixels. For example, the distance between nodes may be optionally a distance between left edges of the two nodes, or may be a distance between center points of the two nodes. This is not limited in this application.

Both the fixed-value manner and the alignment manner described above are examples, and may actually include more combination manners. This is not limited in this application.

For example, as described above, the position information may alternatively be in a proportional manner. For example, position information of the View 3 indicates that a distance between a left edge of the View 3 and the left edge of the ViewGroup 2 is 10% of a width of the ViewGroup 2. That is, the width of the ViewGroup 2 varies with a width of the display window, and correspondingly, a position of the View 3 in the ViewGroup 2 also changes.

For example, in this embodiment, the node may alternatively be understood as a control, and correspondingly, the node type may alternatively be understood as a control type. The type information indicates a type of the node, or may be understood as a type of the control. The node type may include but is not limited to: a root layout type, a text type, a picture type, and the like. For example, type information of the ViewGroup 1 is "DecorView", and indicates that a type of the ViewGroup 1 is a root node type. For another example, type information of the View 4 is "TextView", and indicates that a type of View 4 is a text type. The type information in this embodiment is merely an example, and is not limited in this application.

Optionally, each node in the ViewTree corresponds to a control (which may also be referred to as a component, an element, or the like. Details are not described in the following again) in the user interface. For example, the View 3 corresponds to a "Wallet" control in the user interface 403 in FIG. 5(1) and FIG. 5(2). The "Wallet" control in the user interface 403 includes a graph of the "Wallet" control and a text of the "Wallet" control. The View 3 may correspond to the text of the "Wallet" control, namely, a text "Wallet". In the ViewTree generated by the payment application, declaration information is set for the View 3, to set information such as specific content, a type, and a layout in a window of the View 3. For example, the declaration information corresponding to the View 3 includes but is not limited to: type information of the View 3, content information of the View 3, layout information of the View 3 in the window, and the like. More specifically, the type information of the View 3 is a text type, the content information of the View 3 is a text "Wallet", and the layout information of the View 3 indicates that the View 3 is left-aligned with the parent node (for example, the ViewGroup 2) of the View 3 and is indented by 80 pixels. That is, the layout information of the View 3 indicates that the View 4 is close to the left edge of the parent node of the View 3.

For example, after creating the ViewTree, the payment application outputs the ViewTree (including nodes in the ViewTree and declaration information of the nodes) to the layout system.

S604: The layout system generates a user interface based on the ViewTree.

Figure 7B:
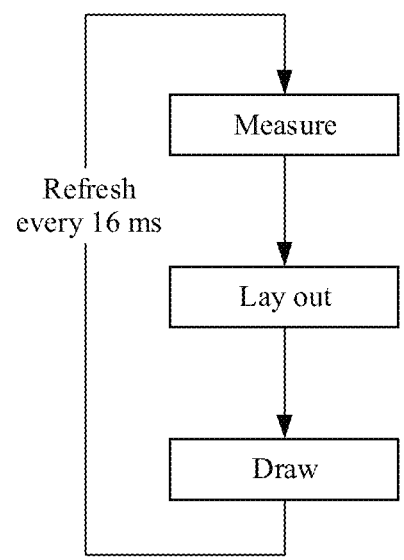
FIG. 7b is a diagram of an example of a processing process of a layout system.

For example, after receiving the ViewTree, the layout system executes a layout refresh process based on the ViewTree. As shown in FIG. 7*b*, the layout refresh process may include a measure (measure) process, a layout (layout) process, and a draw (draw) process.

For example, optionally, the measure process is as follows: The layout system traverses all nodes (including the View and/or the ViewGroup) in the ViewTree from top to bottom, and determines, based on the declaration information corresponding to each node, an actual size of each node in the user interface, namely, a maximum width (width) and height (height) required by the node.

Figure 7C:
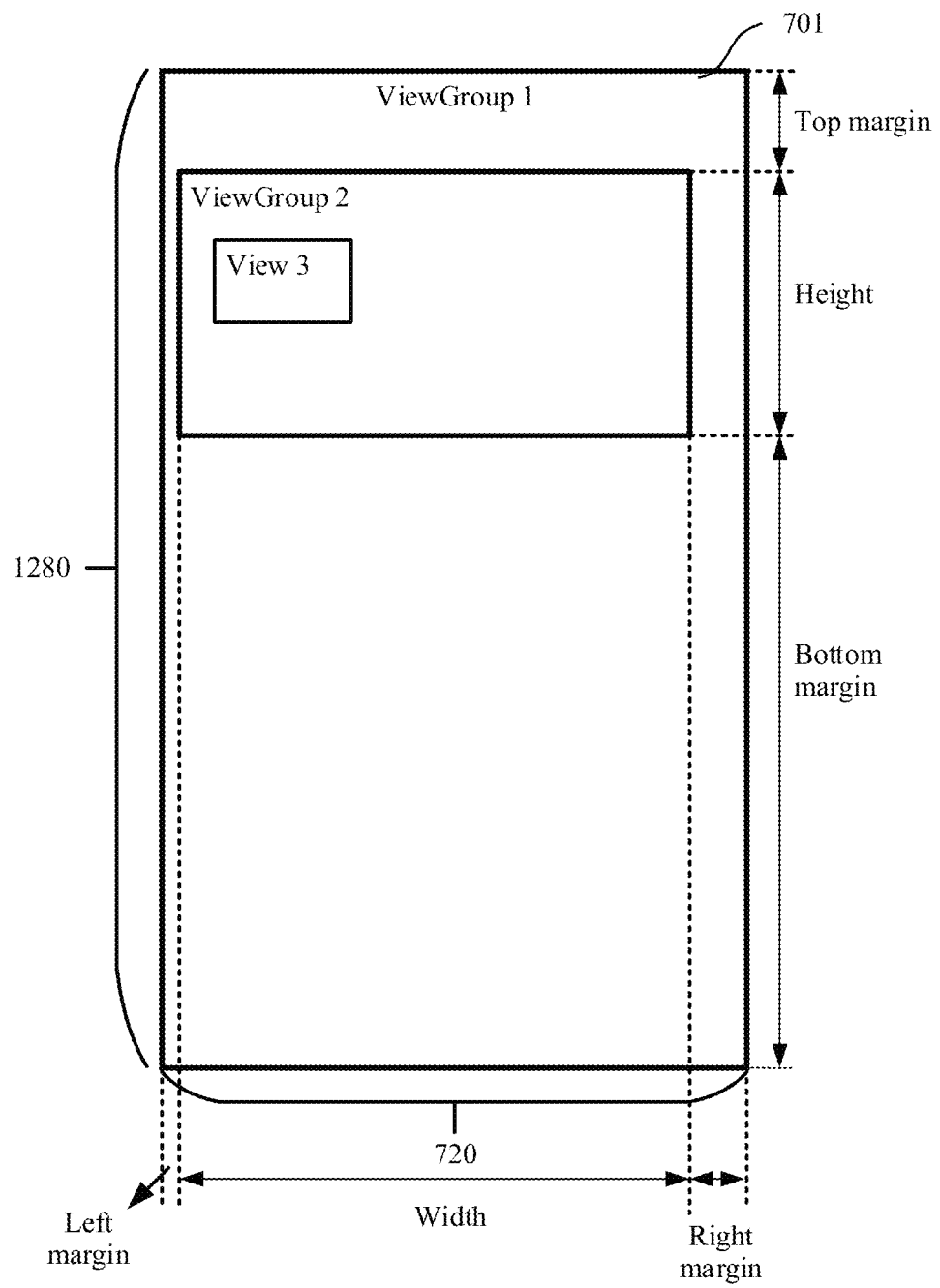
FIG. 7c is a diagram of an example of a layout phase.

For example, optionally, the layout process is as follows: The layout system traverses all nodes in the ViewTree from top to bottom, and determines, based on the declaration information corresponding to each node, a position and a size of each child node in a parent node of the child node. For example, each node may be considered as a rectangular node. As described above, the nodes in the ViewTree are in a parent-child relationship, and all nodes other than the root node correspond to parent nodes. The layout system may calculate distances between the left (left), top (top), right (right), and bottom (bottom) edges of a rectangular View or ViewGroup and left, top, right, and bottom edge of a parent node of the rectangular View or ViewGroup, to obtain a position and size of each rectangular View or ViewGroup in the parent node of the View or ViewGroup. A position and a size corresponding to the root node are the position and the size corresponding to the display window of the application. For example, the ViewTree in FIG. 7*a* is still used as an example. The layout system first traverses the root node ViewGroup 1. Refer to FIG. 7*c*. In this example, a user interface of an application is displayed in full screen on a screen. In this case, a size of a corresponding display window 701 is the same as resolution (for example, the resolution is 1280*720 pixels) of the screen. Correspondingly, the position and the size corresponding to the root node ViewGroup 1 are consistent with those of the display window of the screen, that is, resolution is also 1280*720 pixels. If the user interface of the application is displayed on the screen in a form of split screen or floating window, a corresponding display window is in a size of resolution of the split screen or the floating window. Details are not described in the following again. Then, the layout system continues to traverse child nodes of the ViewGroup 1, including the ViewGroup 2, the View 1, and the View 2. In this embodiment, a traversal order of the ViewTree is from top to bottom and from left to right. In another embodiment, another traversal order may alternatively be used. This is not limited in this application. The ViewGroup 2 is used as an example. Still refer to FIG. 7*c*. The layout system may determine, based on a width and a height (that are obtained in the measure process) of the ViewGroup 2 and declaration information, a distance (namely, a left margin) between a left edge of the ViewGroup 2 and a left edge of the parent node (namely, the ViewGroup 1) of the ViewGroup 2, a distance (namely, a top margin) between an upper edge of the ViewGroup 2 and an upper edge of the ViewGroup 1, a distance (namely, a right margin) between a right edge of the ViewGroup 2 and a right edge of the ViewGroup 1, and a distance (namely, a bottom margin) between a lower edge of the ViewGroup 2 and a lower edge of the ViewGroup 1, to obtain a position and a size (namely, a layout) of the ViewGroup 2 in the parent node (namely, the ViewGroup 1) of the ViewGroup 2. Then, the layout system continues to traverse child nodes of the ViewGroup 2, including the View 3, and the View 4. The View 3 is used as an example. The layout system may determine, based on a width and a height (namely, results obtained in the measure process) of the View 3 and declaration information of the View 3, a distance between the left edge of the View 3 and the left edge of the parent node (namely, the ViewGroup 2), a distance between an upper edge of the View 3 and an upper edge of the ViewGroup 2, a distance between a right edge of the View 3 and a right of the ViewGroup 2, and a distance between a lower edge of the View 3 and a lower edge of the ViewGroup 2, to obtain a position and a size of the View 3 in the parent node ViewGroup 2 of the View 3.

For example, in the draw process, optionally, a canvas (Canvas) is created for the layout system, and content of each node in the ViewTree is drawn at a corresponding position of the canvas based on a result obtained in a calculation process, to obtain a user interface.

It should be noted that, the draw process is the same as the measure process and the layout process, and all nodes in the ViewTree are traversed from top to bottom and from left to right. The layout system may draw content corresponding to each node (which may also be understood as a UI corresponding to each node) in sequence based on a traversal order. The traversal order is merely an example, and is not limited in this application.

It should be further noted that, in a process of drawing each node on the canvas, each node in the ViewTree corresponds to a canvas of the node, a size of the canvas corresponding to the node is the same as a size of the node, that is, a width of the canvas is the same as a width of the node, a height of the canvas is the same as a height of the node, and the width and the height of the node are obtained in the foregoing measure process.

Figure 7D:
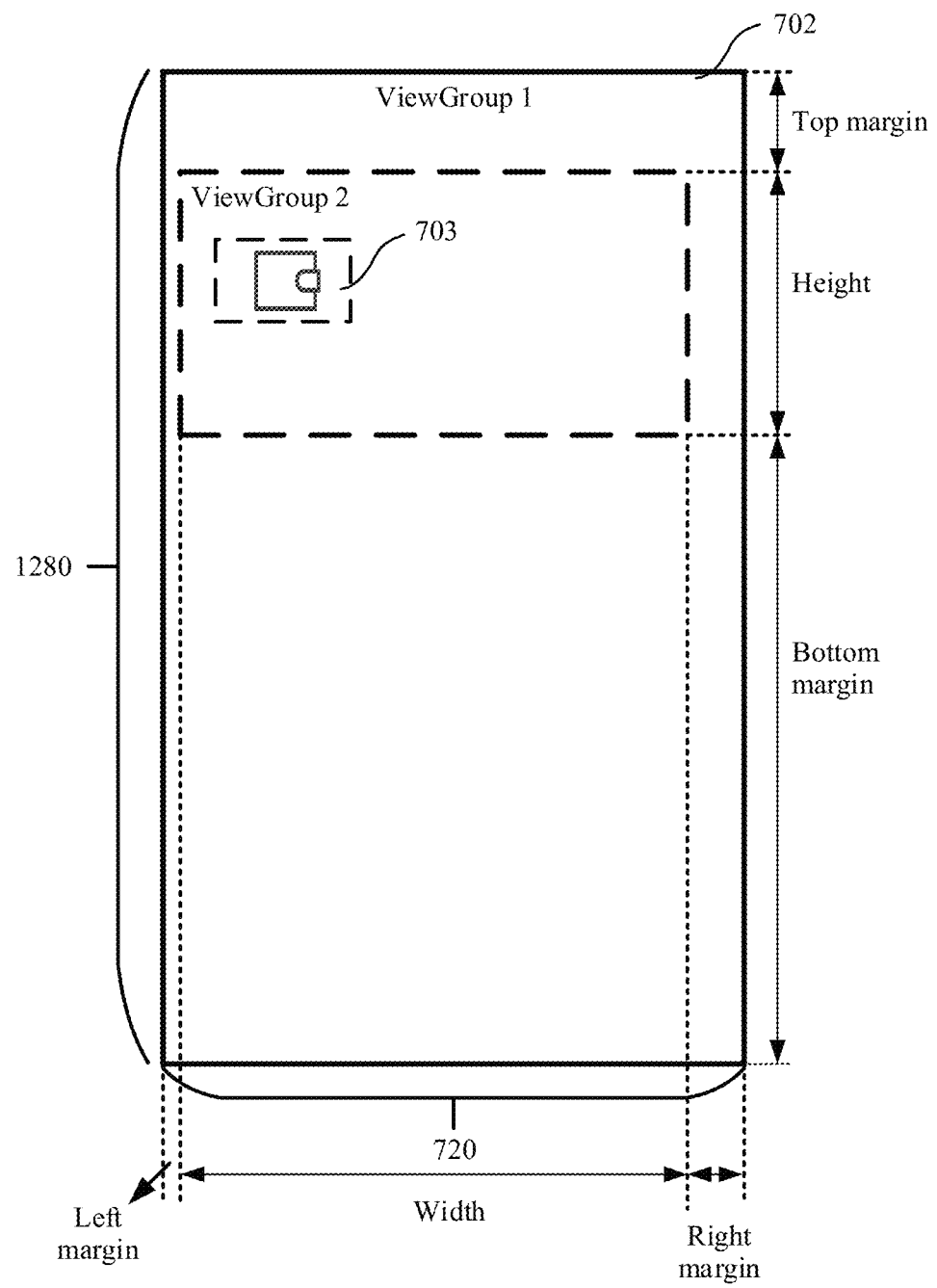
FIG. 7d is a diagram of an example of a draw phase.

For example, the layout system may draw content corresponding to each node on the canvas corresponding to each node. It should be noted that a size of a canvas corresponding to the root node ViewGroup 1 is the same as the size of the display window of the application (for a concept, refer to the foregoing description. Details are not described herein again). For example, refer to FIG. 7*d*. The layout system creates a canvas 702 of the root node ViewGroup 1, and draws content corresponding to the root node ViewGroup 1 on the canvas 702. For example, if content corresponding to the root node ViewGroup 1 is "red", the layout system may fill the canvas 702 in red as a background color of the user interface. Then, based on the structure of the ViewTree, the layout system continues to traverse the ViewGroup 2, and the layout system may draw, based on the position and the size (namely, results obtained in the layout process) of the ViewGroup 2 in the parent node ViewGroup 1 of the ViewGroup 2, a user interface of the ViewGroup 2 at a corresponding position of the canvas 702 of the ViewGroup 1. Specifically, refer to FIG. 7e(1) and FIG. 7e(2). The layout system draws a canvas of the ViewGroup 2 at a corresponding position, and content corresponding to the ViewGroup 2 is drawn on the canvas of the ViewGroup 2. The layout system further traverses the View 1 and the View 2 in sequence, and draws, based on a position and a size of the View 1 in the ViewGroup 1 and a position and a size of the View 2 in the ViewGroup 1 that are obtained in the layout process, user interfaces (not shown in the figure) of the View 1 and the View 2 at corresponding positions of the ViewGroup 1. Still refer to FIG. 7d. For example, the layout system traverses to the View 3. The layout system may determine, based on a result obtained in the layout process, a position and a size of the View 3 (which may be understood as a canvas or a user interface of the View 3) in the parent node ViewGroup 2 of the View 3. The layout system draws a UI (which may also be referred to as an image of the View 3, a view of the View 3, a graph of the View 3, or the like, which is not limited in this application. Details are not described in the following again), namely, a "Wallet" icon control 703, of the View 3 at a corresponding position.

For example, the layout system continues to traverse and draw nodes of the ViewTree in the foregoing manner, to obtain a user interface (which may also be understood as a user interface corresponding to the ViewTree) shown in FIG. 7e(1). Refer to FIG. 7e(2). After the layout system generates a user interface 704, the layout system outputs the user interface 704 to a related module for processing such as rendering, and displays the user interface 704 in full screen on the screen.

Optionally, in the Android system, the layout system may invoke a member function-Perform Traversals of the ViewRoot type to perform the measure, layout, and draw processes. This is not limited in this application.

Optionally, in embodiments of this application, an example in which a layout refresh process is triggered every 16 ms (a corresponding frame rate is 60 frames/s). In another embodiment, a refresh interval varies with a frame rate, and may be set according to an actual requirement. This is not limited in this application. Details are not described in the following again. In other words, in this embodiment, the layout system re-executes the measure, layout, and draw processes shown in FIG. 7b every 16 ms, to refresh the user interface displayed on the screen. Optionally, if the layout system detects, in a refresh cycle, that the user interface does not change, the layout system may not execute the process in FIG. 7b, to reduce power consumption.

The following describes in detail the interface display method in embodiments of this application with reference to the accompanying drawings. FIG. 8 is a schematic flowchart of an example of an interface display method. Refer to FIG. 8. The method may specifically include but is not limited to the following steps.

S801: A layout system sends window information to a payment application.

In this embodiment, the layout system sends the window information to the payment application. As described above, the display window information sent in S601 is information corresponding to a window on which a user interface is to be displayed. For example, in FIG. 7e(1) and FIG. 7e(2), if the user interface 704 is displayed in full screen on a display, a size of a display window corresponding to the user interface 704 is the same as resolution of a screen of a mobile phone. Correspondingly, resolution indicated by the display window information sent by the layout system in S601 is a size of an actual display window, that is, is the same as the resolution of the screen of the mobile phone, so that an application may be laid out based on the size indicated by the window information. In this embodiment, a difference from S601 is that in S801, a height of the display window indicated by the window information sent by the layout system to the payment application is the same as a height of the actual display window, and a width of the display window indicated by the window information is less than a width of the actual display window. For example, the display window indicated by the window information is identified as a first display window, and the actual display window is identified as a second display window in the following, to distinguish an actual size of the display window. In this embodiment, a size of the first display window indicated by the window information is close to a display size of a bar-type mobile phone, so that the application can still be laid out based on a display window of the bar-type mobile phone, and the application does not need to make a modification to adapt to the size of the actual display window.

In this embodiment, an example in which the width of the window indicated by the window information sent by the layout system to the payment application is a half (namely, 50%) of a width of a window to be actually displayed, and the height of the window indicated by the window information is the same as a height of the window to be actually displayed is used for description. It should be noted that, in another embodiment, a ratio of a width of the first display window indicated by the window information to a width of the second display window (namely, the actual display window) may be greater than 50% or less than 50%. For example, the width of the first display window may be one third or two thirds of the width of the second display window, so that the window indicated by the window information sent by the layout system to the application is close to that of the bar-type mobile phone. It should be noted that aspects ratios of bar-type mobile phones are also different. Therefore, in this embodiment, when the height of the display window indicated by the window information is consistent with that of the actual display window, the ratio of the width to the height is close to a proportion of a screen of the bar-type mobile phone (or an outer screen of a mobile phone with a large foldable screen therein).

Figure 9A:
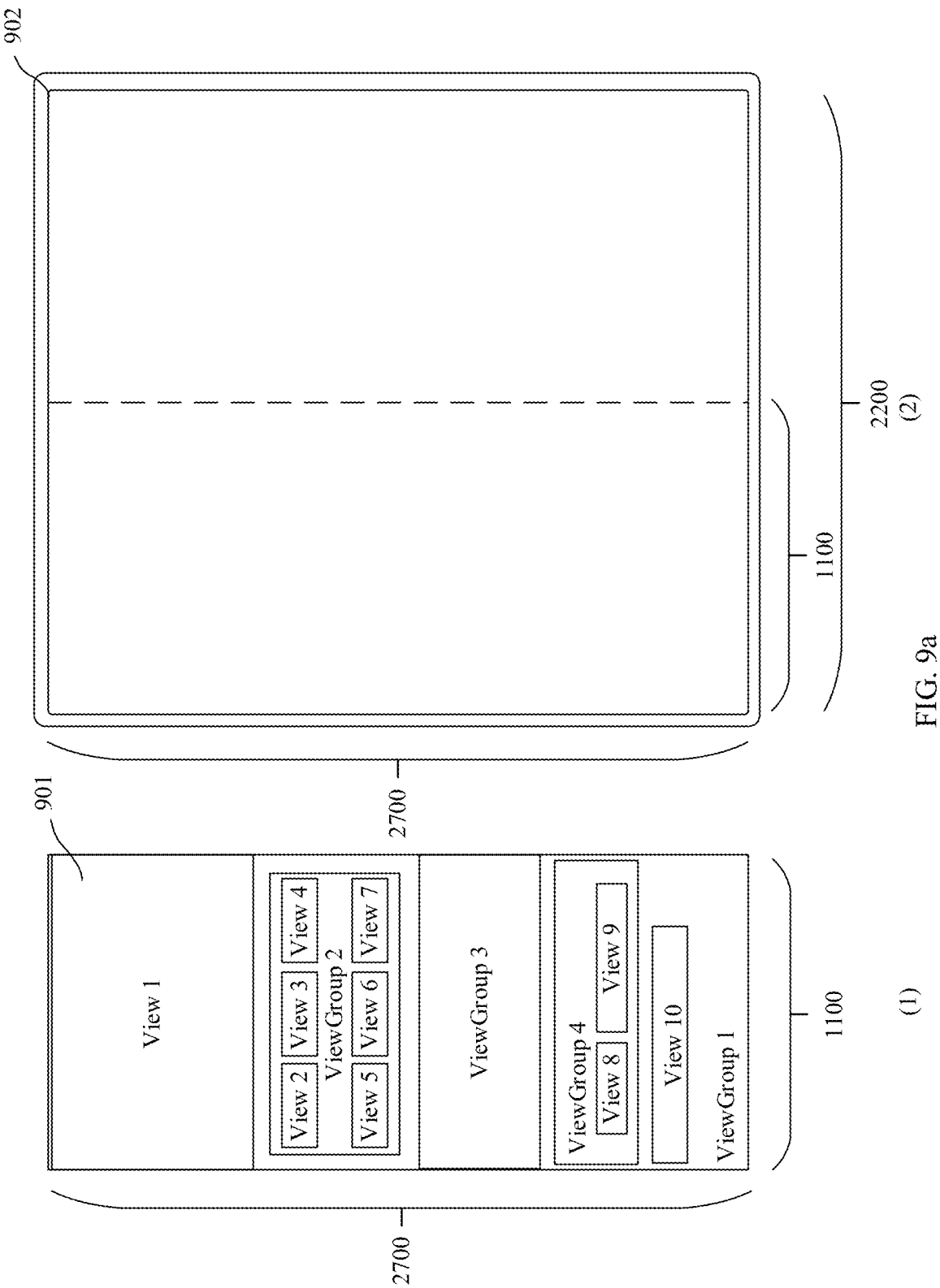
FIG. 9a is a diagram of an example of a first display window and a second display window.

For example, refer to (2) in FIG. 9a. For example, resolution of an inner screen 902 of a foldable mobile phone is 2700*2200 pixels. In this embodiment, an example in which a user interface is displayed in full screen on the inner screen 902 is still used for description. In other words, resolution of an actual display window of a user interface of the payment application is 2700*2200 pixels. As shown in (1) in FIG. 9a, resolution of the display window indicated by the window information sent by the layout system to the payment application is 2700*1100 pixels. In other words, a width of a first display window 901 that is described by the window information sent by the layout system is a half of the width of the actual display window (namely, the second display window), and heights are the same.

It should be noted that the window information sent by the layout system to the payment application includes only a height and a width of the first display window, and does not indicate a position of the first display window in the actual display window. A dashed line shown in the inner screen 902 in (2) in FIG. 9a is merely an example of a relationship between the width of the first display window and the width of the second display window.

It should be further noted that, in this embodiment, the payment application is used as an example for description. In another embodiment, this embodiment may be used for interface display of another application, for example, a shopping application, a social application, or a travel application. This is not limited in this application.

S802: The payment application generates a ViewTree based on the window information.

S803: The payment application sends the ViewTree to the layout system.

For example, the payment application receives the window information that is input by the layout system. The payment application may generate the ViewTree based on the window information, and output the ViewTree to the layout system.

Figure 9B:
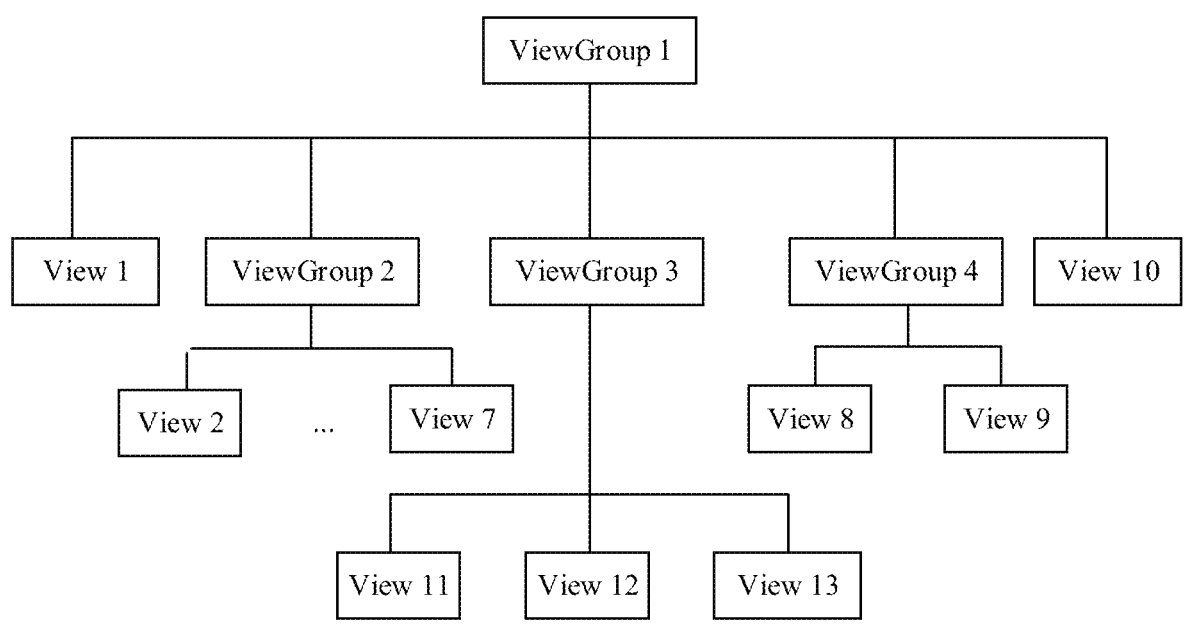
FIG. 9b is a diagram of an example of a structure of a ViewTree.

FIG. 9b is a diagram of an example of a structure of a ViewTree. Refer to FIG. 9b. The ViewTree includes but is not limited to a root node ViewGroup 1 and child nodes of the root node: a View 1, a ViewGroup 2, a ViewGroup 3, a ViewGroup 4, and a View 10. The ViewGroup 2 includes but is not limited to child nodes: a View 2, a View 3, a View 4, a View 5, a View 6, and a View 7. The ViewGroup 3 includes but is not limited to child nodes: a View 11, a View 12, and a View 13. The ViewGroup 4 includes but is not limited to child nodes: a View 8 and a View 9. For related description of the ViewTree, refer to related content in S602. Details are not described herein again.

In this embodiment, declaration information of the ViewGroup 1 includes but is not limited to: type information of the ViewGroup 1, layout information of the ViewGroup 1, content information of the ViewGroup 1, and the like. For example, the type information of the ViewGroup 1 is "DecorView", namely, a root layout type (which may also be referred to as a root layout control type). The layout information of the ViewGroup 1 indicates that resolution of the ViewGroup 1 is 2700*1100 pixels, that is, the resolution of the ViewGroup 1 is the same as a size of the first display window. For example, the content information of the ViewGroup 1 indicates that the ViewGroup 1 is filled in white.

Declaration information of the View 1 includes but is not limited to: type information of the View 1, layout information of the View 1, content information of the View 1, and the like. The type information of the View 1 is an image, namely, an image type node (which may also be referred to as an image control type). The layout information of the View 1 includes position information and size information. Optionally, the position information includes but is not limited to the following: A top of the View 1 is aligned with a top of the parent node (ViewGroup 1) of the View 1. The size information includes but is not limited to the following: A width of the View 1 is equal to a width of the parent node (ViewGroup 1) of the View 1, and a height of the View 1 is 80% of the width. That is, as described above, the size information of the View 1 is indicated in a proportion manner (namely, a non-fixed value manner).

Declaration information of the ViewGroup 2 includes but is not limited to: type information of the ViewGroup 2, layout information of the ViewGroup 2, content information of the ViewGroup 2, and the like. The type information of the ViewGroup 2 is "ViewGroup", namely, a ViewGroup type node (which may also be referred to as a ViewGroup control type). The layout information of the ViewGroup 2 includes position information and size information. Optionally, the position information includes but is not limited to the following: A distance between a left edge of the ViewGroup 2 and a left edge of the parent node (the ViewGroup 1) is 20 pixels. The size information includes but is not limited to: A width of the ViewGroup 2 is 80% of a width of the ViewGroup 1, and a height of the ViewGroup 2 is 200 pixels. That is, as described above, the size information of the ViewGroup 2 is indicated in a manner in which a width is an unfixed value and a height is a fixed value. Optionally, the layout information of the ViewGroup 2 may further indicate that child nodes in the ViewGroup 2 are evenly distributed horizontally in the ViewGroup 2. A specific indication manner may be set according to an actual requirement. This is not limited in this application.

Declaration information of the View 2 includes but is not limited to: type information of the View 2, layout information of the View 2, content information of the View 2, and the like. The type information of the View 2 is an image, namely, an image type (which may also be referred to as an image control type). The layout information of the View 2 includes position information and size information. Optionally, the position information includes but is not limited to the following: A distance between a left edge of the View 2 and a left edge of the parent node (the ViewGroup 2) is 20 pixels. The size information includes but is not limited to the following: A width of the View 2 is 50 pixels, and a height of the View 2 is 50 pixels. That is, as described above, the size information of the View 2 is indicated in a fixed-value manner.

Declaration information of the View 3 includes but is not limited to: type information of the View 3, layout information of the View 3, content information of the View 3, and the like. The type information of the View 3 is an image, namely, an image type (which may also be referred to as an image control type). The layout information of the View 3 includes size information. Optionally, the size information includes but is not limited to the following: A width of the View 3 is 50 pixels, and a height of the View 3 is 50 pixels. That is, as described above, the size information of the View 3 is indicated in a fixed-value manner. The layout information of the View 3 may include position information, or may not include position information (for example, the position information of the View 3 has been set in the ViewGroup 2, that is, the View 3 is evenly distributed with other nodes in the ViewGroup 2 horizontally). In a subsequent layout process, the layout system may lay out the View 3 based on a size of the ViewGroup 2 and a size and a position of another child node.

Declaration information of the View 4 includes but is not limited to: type information of the View 4, layout information of the View 4, content information of the View 4, and the like. The type information of the View 4 is an image, namely, an image type (which may also be referred to as an image control type). The layout information of the View 4 includes size information (optionally includes position information). The size information includes but is not limited to the following: A width of the View 4 is 50 pixels, and a height of the View 4 is 50 pixels. That is, as described above, the size information of the View 4 is indicated in a fixed-value manner.

For the View 5, refer to the View 2. For the View 6, refer to the View 3. For the View 7, refer to the View 4. Details are not described herein again.

Declaration information of the ViewGroup 3 includes but is not limited to: type information of the ViewGroup 3, layout information of the ViewGroup 3, content information of the ViewGroup 3, and the like. The type information of ViewGroup 3 is "ViewPager", namely, a view page turning type (which may also be referred to as a view page turning control type). This type of control can display a plurality of images in a form of page turning. For example, a user can slide a control left or right to view the plurality of images. The layout information of the ViewGroup 3 includes size information (or may include position information, which may be set according to an actual requirement. Details are not described in this application). The size information includes but is not limited to the following: A width of the ViewGroup 3 is the same as a width of the parent node (the ViewGroup 1) of the ViewGroup 3, and a height of the ViewGroup 3 is 300 pixels.

Types of the View 11 to the View 13 are picture types. The layout information indicates that a width and a height of the View are equal to those of the ViewGroup 3. For the parts that are not described, refer to the View 1.

Declaration information of the ViewGroup 4 includes but is not limited to: type information of the ViewGroup 4, layout information of the ViewGroup 4, content information of the ViewGroup 4, and the like. The type information of the ViewGroup 4 is "ViewGroup", namely, a ViewGroup type (which may also be referred to as a ViewGroup control type). The layout information of the ViewGroup 4 includes position information and size information. Optionally, the position information includes but is not limited to the following: A distance between a left edge of the ViewGroup 4 and a left edge of the parent node (the ViewGroup 1) is 10 pixels. The size information includes but is not limited to the following: A width of the ViewGroup 4 is 900 pixels, and a height of the ViewGroup 4 is 100 pixels. That is, as described above, the size information of the ViewGroup 4 is indicated in a fixed-value manner.

Declaration information of the View 8 includes but is not limited to: type information of the View 8, layout information of the View 8, content information of the View 8, and the like. The type information of the View 8 is "TextView", namely, a text type (which may also be referred to as a text control type). The layout information of the View 8 includes size information (or may include position information, which may be set according to an actual requirement. Details are not described in this application). Optionally, the size information includes but is not limited to the following: A width of the View 8 is 200 pixels, and a height of the View 8 is 50 pixels. That is, as described above, the size information of the View 8 is indicated in a fixed-value manner.

Declaration information of the View 9 includes but is not limited to: type information of the View 9, layout information of the View 9, content information of the View 9, and the like. The type information of the View 9 is an image. The layout information of the View 9 includes size information (or may include position information, which may be set according to an actual requirement. Details are not described in this application). Optionally, the size information includes but is not limited to the following: A width of the View 9 is 700 pixels, and a height of the View 9 is 50 pixels. That is, as described above, the size information of the View 9 is indicated in a fixed-value manner.

Declaration information of the View 10 includes but is not limited to: type information of the View 10, layout information of the View 10, content information of the View 10, and the like. The type information of the View 10 is "TextView", namely, a text type (which may also be referred to as a text control type). The layout information of the View 10 includes size information (or may include position information, which may be set according to an actual requirement. Details are not described in this application). Optionally, the size information indicates that a height of the View 10 is 20 pixels, and a length of the View 10 is the same as a text length. That is, as described above, the size information of the View 10 is indicated in a proportion-value manner, and a length of the View 10 changes with a length of the text.

It should be noted that the parameter in the declaration information is merely an example, and this is not limited in this application.

It should be further noted that the nodes shown in FIG. 9b are only some nodes in the ViewTree, and the ViewTree may include more nodes.

Refer to (1) in FIG. 9a. Herein, (1) in FIG. 9a shows a diagram of displaying the ViewTree in the first display window. The diagram may also be understood as a display result that is of the ViewTree in the first display window and that is expected by an application. Refer to (1) in FIG. 9a. For example, if the application expects the View 1 to be displayed on the top of the first display window, correspondingly, the declaration information of the View 1 is described above, and the layout information of the View 1 indicates that the top of the View 1 is aligned with the top of the parent node, so that the View 1 may be located on the top of the first display window. The layout information of the View 1 indicates that a width of the View 1 is equal to a width of the parent node (the ViewGroup 1), and the height is 80% of the width. In this case, the width of the View 1 in the first display window is equal to a width of the first display window (namely, the width of the ViewGroup 1), and the height is 80% of the width, for example, 880 pixels. Descriptions of other nodes are similar to that of the View 1. Details are not described herein again.

It should be noted that the diagram is merely for better understanding of this application. Actually, the diagram is not generated by the application. A position and a size of each node in the first display window 901 are merely a better description of a correspondence between position information and size information that are of the node and that are indicated in the declaration information, and this is not limited.

Figure 9C:
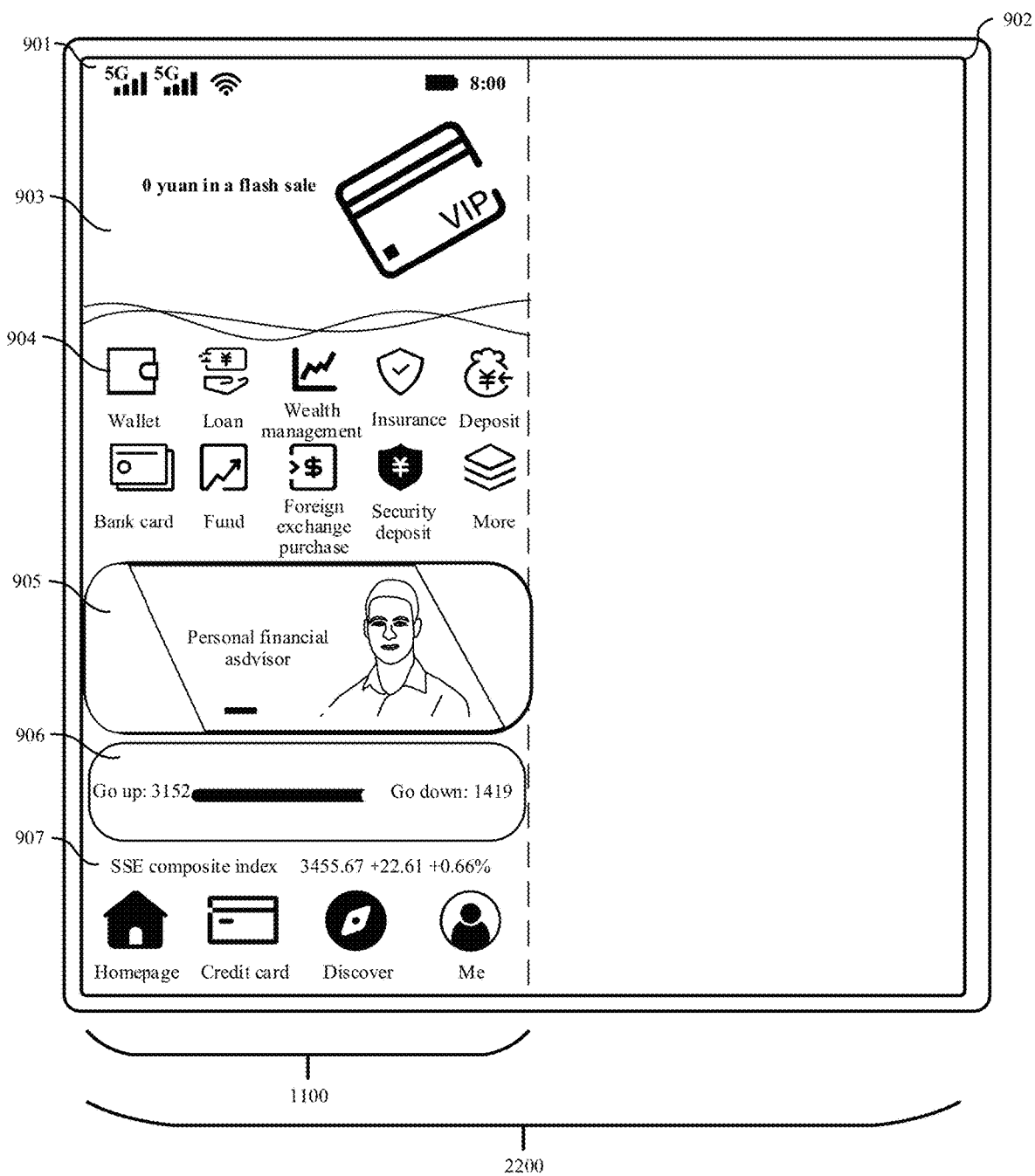
FIG. 9c is a diagram of an example of effect of a user interface.

FIG. 9c is an example of a diagram of effect corresponding to (1) in FIG. 9a. It should be noted that the diagram of the effect is merely for better understanding of this solution, and a mobile phone does not generate the diagram. Refer to FIG. 9c. For example, as described above, an application is laid out based on the first display window. Correspondingly, on the inner screen 902, the first display window 901 occupies the inner screen 902, namely, a half of a width of the second display window. It should be noted that a position of the first display window 901 on the inner screen 902 is merely an example, and is not limited in this application. For example, the first display window 901 includes but is not limited to: an advertisement control 903, an option control 904, an advertisement control 905, a wealth management control 906, a wealth management control 907, a "Homepage" option control, a "Credit card" option control, a "Discover" option box control, a "Me" option control, and the like. For example, the advertisement control 903 corresponds to the View 1 in (1) in FIG. 9a. In other words, a position, a size, and content that are of the View 1 on the first display window, and that are indicated by the declaration information of the View 1 are shown by the advertisement control 903. The option control 904 includes a plurality of option controls, including but not limited to: a "Wallet" icon option control, a "Wallet" text option control, a "Wealth management" icon option control, a "Wealth management" text option control, and the like. For example, the "Wallet" icon option control may correspond to the View 2, the "Wealth management" icon option control corresponds to the View 3, a "Loan" icon option control corresponds to the View 4, a "Bank card" icon option control corresponds to the View 5, a "Foreign exchange purchase" icon option control corresponds to the View 6, and a "More" icon option control corresponds to the View 7. It should be noted that, because space is limited, the ViewGroup 2 shows only Views corresponding to some controls of the option control 904. Actually, the ViewGroup 2 further includes a View corresponding to the "Loan" icon option control and Views corresponding to text option controls. Details are not described in this application again. It should be noted that the ViewGroup 2 is optionally located at a lower layer of the option control 904. For example, content of the ViewGroup 2 is filled in white. Therefore, a graph of the ViewGroup 2 is not displayed in FIG. 9*b*.

For example, the advertisement control 905 corresponds to the ViewGroup 3 in (1) in FIG. 9*a*. In other words, a position, a size, and content that are of the ViewGroup 3 on the first display window, and that are indicated by the declaration information of the ViewGroup 3 are shown by the advertisement control 905.

For example, the wealth management control 906 corresponds to the ViewGroup 4, the View 8, and the View 9 in (1) in FIG. 9*a*. In other words, positions, sizes, and content that are of the ViewGroup 4, the View 8, and the View 9 on the first display window, and that are indicated by the declaration information of the ViewGroup 4, the View 8, and the View 9 are shown by the wealth management control 906.

For example, the wealth management control 907 corresponds to the View 10 in (1) in FIG. 9*a*. In other words, a position, a size, and content that are of the View 10 on the first display window, and that are indicated by the declaration information of the View 10 are shown by the wealth management control 907.

S804: Measure and lay out a node based on the ViewTree, and identify an abnormal node.

For example, after receiving the ViewTree, the layout system executes, based on the ViewTree, a layout refresh process, namely, measure, layout and draw processes.

In this embodiment, when executing the measure and layout processes, the layout system measures and lays out nodes in the ViewTree based on a size of the actual display window, namely, a size of the second display window. In other words, a measurement result and a layout result obtained by the layout system indicate a position and a size of the ViewTree in the actual display window.

In this embodiment, when measurement and a layout are performed based on the second display window, some nodes may be abnormal. This type of node is referred to as an abnormal node. For example, after the node is measured and laid out in the second display window, the node is stretched, and consequently, an area occupied by the node is increased. When a height occupied by the node in a vertical direction increases, a node under the node (namely, below the vertical direction) is correspondingly moved downward in the user interface, and consequently, elements included in the user interface may be decreased. In addition, when the node includes a picture, the picture may be distorted after being stretched. For another example, when a size of a node in the first display window is a proper size, and the same node is laid out in the second display window, because a width of the second display window is increased, a graph of the node in the second display window may be small, and overall aesthetics of the user interface are affected. In this embodiment, the layout system may identify a measurement result and/or a layout result of a node based on a preset rule, to determine whether the node is an abnormal node. For an abnormal node, the layout system may correspondingly process the abnormal node based on a corresponding policy in the preset rule, so that a user interface corresponding to the node is adapted to the second display window, thereby improving aesthetics of the user interface.

In this embodiment, the layout system traverses all nodes in the ViewTree, to measure the traversed nodes, so as to obtain a measurement result (including a width and a height) of each node. After the measure process ends, the ViewTree is traversed again to obtain a layout result of each node (including a position in a parent node).

In this embodiment, the layout system traverses the ViewTree from top to bottom and from left to right, and preferably performs depth traversal. For example, the ViewTree in FIG. 9*b* is used as an example. A traversal order of the ViewTree by the layout system is as follows: the ViewGroup 1, the ViewGroup 2, the View 2, the View 3, the View 4, the View 5, the View 6, the View 7, the ViewGroup 2, the ViewGroup 3, the View 11, the View 12, the View 13, the ViewGroup 3, the ViewGroup 4, the View 8, the View 9, the ViewGroup 4, and the View 10. It should be noted that, in a traversal process, the layout system traverses nodes of the ViewGroup. After traversing all nodes of the ViewGroup, the layout system returns to the ViewGroup, and traverses nodes at a same level of the ViewGroup. For example, in a measurement phase, the layout system traverses to the ViewGroup 2 and measures the ViewGroup 2. The layout system traverses the View 2 to the View 7 of the ViewGroup 2 to obtain a measurement result of each node. The layout system returns to the ViewGroup 2 and continues to traverse the ViewGroup 3 to obtain a measurement result of the ViewGroup 3. The layout process is similar. Details are not described herein again. It should be further noted that the traversal order in this embodiment is merely an example. In another embodiment, the layout system may alternatively perform traversal in another traversal order. This is not limited in this application.

Figure 10A:
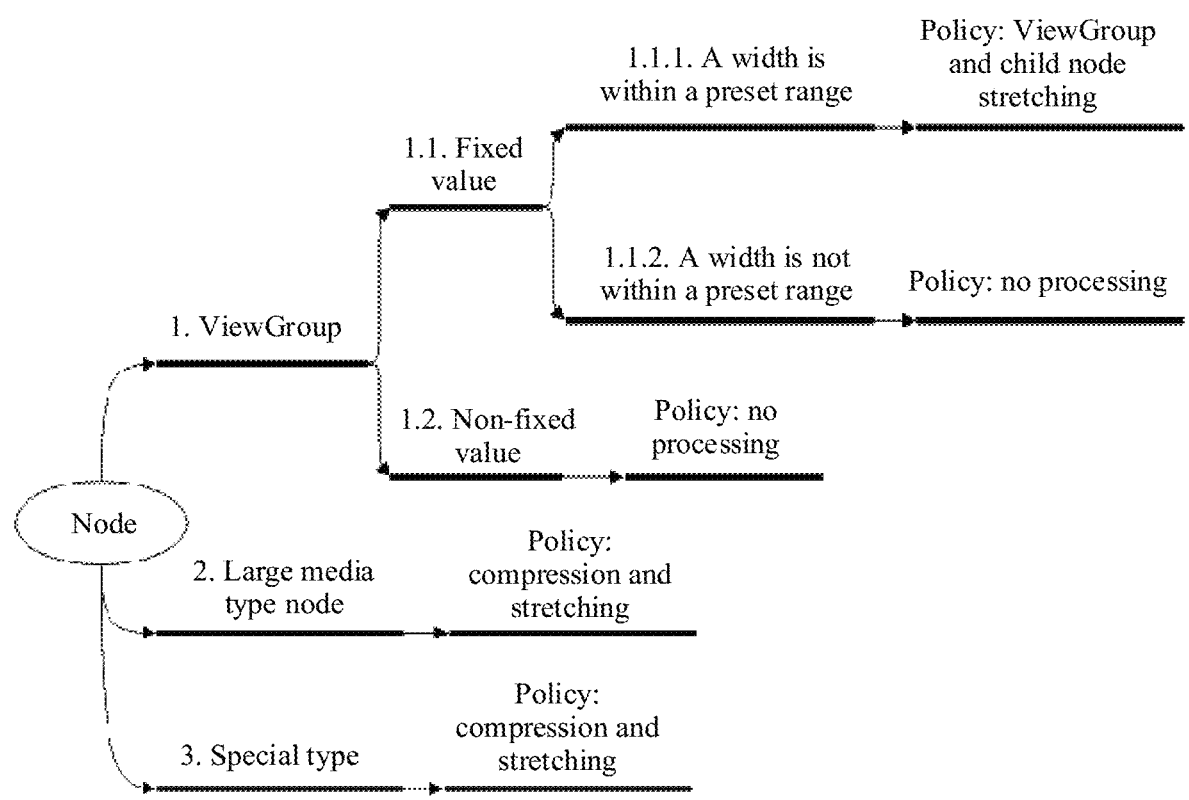
FIG. 10a is a diagram of an example of a preset rule in a measurement phase.

FIG. 10*a* is a diagram of an example of a preset rule in a measurement phase. Refer to FIG. 10*a*. In the measurement phase, the layout system traverses to any node, measures the node, and obtains a measurement result. The measurement result includes a width and a height of the node. Then, the layout system may identify the node based on the rule, the measurement result of the node, and the declaration information of the node in FIG. 10*a*, to determine whether the node is an abnormal node, and perform corresponding processing.

1. ViewGroup Node

For example, the layout system may determine, based on type information of the node, that the node is a ViewGroup type node, and perform processing based on a preset rule of the ViewGroup node type.

1.1. Fixed Value

For example, as described above, size information of the node may be a fixed value, or may be a non-fixed value. When a width of the node is a fixed value, the layout system detects, based on a width in the measurement result of the node, namely, a width of the node in the second display window (namely, the actual display window), whether the width is greater than a preset range.

In this embodiment, an example in which the preset range is greater than or equal to 40% of a width of the second display window and less than or equal to 60% of the width of the second display window is used for description. In another embodiment, the preset range may be another value, and the preset range may be set according to an actual requirement. This is not limited in this application.

1.1.1. The Width is within the Preset Range.

For example, if the layout system detects, based on the measurement result of the node in the second display window, that the width of the node is within the preset range, the layout system determines that a policy corresponding to the node is that the ViewGroup and a child node thereof are stretched.

In this embodiment, that the policy is node stretching is specifically as follows: The layout system stretches a canvas of the node in a draw process. Specific details of canvas stretching are described in detail in the following embodiments.

For example, in this embodiment, the layout system determines that a policy of the ViewGroup is that the ViewGroup and the child node thereof are stretched, and the layout system marks the ViewGroup, where the mark indicates that the policy of the ViewGroup is stretching. A marking manner may be set according to an actual requirement. This is not limited in this application. The mark is used by the layout system to determine a previous policy determining result based on the mark in a subsequent processing process. For example, in the draw process, the layout system may determine, based on the mark of the ViewGroup, that the ViewGroup needs to be stretched.

For example, the layout system traverses to a child node of the ViewGroup, and measures the child node. The layout system determines that a policy of the child node is also stretching based on the mark of the parent node. The layout system may mark the child node as a node that needs to be stretched, or may not mark the child node. This is not limited in this application. That is, for a node whose policy is that the ViewGroup node is stretched with the child node, the layout system does not need to execute abnormal node determining on the child node again. Instead, the layout system only needs to stretch the child node with the parent node of the child node in the draw process.

1.1.2. The Width is not within the Preset Range.

For example, if the layout system detects, based on a measurement result of the ViewGroup, that a width of the ViewGroup is less than the preset range, or a width of the ViewGroup is greater than the preset range. For example, if the width of the ViewGroup is less than 40% of the width of the second display window, or the width of the ViewGroup is greater than 60% of the width of the second display window, the layout system does not process the ViewGroup in the measurement phase, and the layout system continues to traverse another node.

1.2. Non-Fixed Value

For example, when the width of the node is a non-fixed value, the layout system determines that the policy of the node is no processing. That is, the layout system does not process the ViewGroup in the measurement phase, and continues to traverse another node.

2. Large Media Type Node

For example, after the layout system obtains a measurement result of a single node (including the ViewGroup or the View), the layout system determines, based on type information of the node, whether the node is a media type node, for example, a picture type node or a video type node.

For example, if the node is a media type node, and a width (namely, a width in the second display window) of the node is greater than a threshold (for example, 80% of the width of the second display window), the layout system determines that the node is a large media type node, and a corresponding policy is compression and stretching. Optionally, the threshold is 80% of the width of the second display window. The value may be set according to an actual requirement. This is not limited in this application.

In this embodiment, that the policy is node compression is specifically as follows: In the measurement phase, the layout system remeasures the node, and reduces the width of the node based on a ratio of the width of the first display window to the width of the second display window. For example, if the width of the first display window is a half of the width of the second display window, the layout system compresses the width (namely, the width in the second display window) of the node in the measurement result to a half. For another example, if the width of the first display window is one third of the width of the second display window, the layout system compresses the width (namely, the width in the second display window) of the node in the measurement result to one third.

In this embodiment, the layout system scales down the ViewGroup to a half of the current width based on the ratio of the width of the second display window to the width of the first display window. For example, the layout system measures the node, and a result obtained is that a width of the node is 2200 pixels. The layout system remeasures the node, and compresses the width to a half of the measurement result. A remeasurement result obtained is that the width of the node is 1100 pixels.

It should be noted that, in this embodiment, the layout system processes the width of the node. For some nodes whose heights change with widths, for example, a node whose declaration information indicates that a height is 50% of a width, after the layout system compresses the width of the node, a height is compressed with the width. Details are not described in the following.

For example, the layout system marks the node, to indicate that the node is stretched in the draw process. Correspondingly, in the draw process, the layout system may perform canvas stretching on the node based on the mark.

3. Special Type Node

For example, the layout system determines, based on type information and a measurement result of a node (including the View or the ViewGroup), whether the node is of a special type.

In this embodiment, a determining condition of a special type node includes but is not limited to the following:

(1) A type of the node is "Recycler View", the node includes at least one picture, and a width of each picture exceeds the threshold (for example, 80% of the width of the second display window).

(2) A type of the node is "ViewPager", the node includes at least one picture, and a width of each picture exceeds the threshold (for example, 80% of the width of the second display window).

A type of the special type node in this embodiment is merely an example. In another embodiment, the special type node may be another type of node including a picture whose width exceeds the threshold. This is not limited in this application.

For example, for the special type node, a policy corresponding to the special type node is compression and stretching. For detailed description, refer to the large media type node. Details are not described herein again.

It should be noted that, as described above, in the measurement phase, the layout system does not process some nodes, for example, a node whose width is not within the preset range, to avoid incorrect processing. The layout system processes the node in a layout phase, that is, the layout system processes the node after obtaining more information corresponding to the node.

Figure 10B:
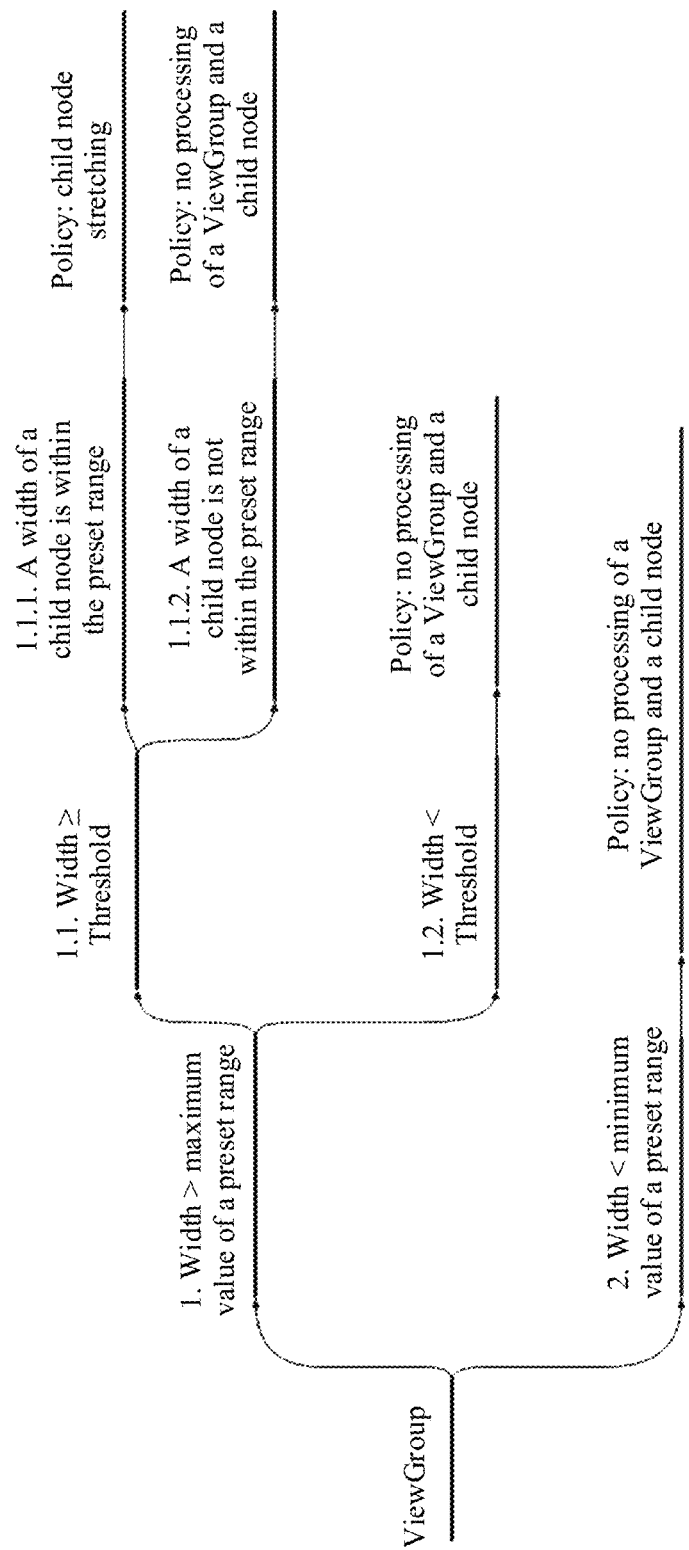
FIG. 10b is a diagram of an example of a preset rule in a layout phase.

FIG. 10b is a diagram of an example of a preset rule in a layout phase. Refer to FIG. 10b. In the layout phase, the layout system traverses to any node, and lays out the node based on a measurement result and declaration information of the node, to obtain a layout result of the node. The layout result includes a position of the node in a parent node (for a specific concept, refer to the foregoing description. Details are not described herein again). Then, the layout system may identify the node based on the rule, the measurement result of the node, the abnormal node determining result of the node in the measurement phase, and the declaration information of the node in FIG. 10a, to determine whether the node is an abnormal node, and perform corresponding processing. As described above, determining and processing of an abnormal node in the layout phase may be understood as further processing a node that is not processed in the measurement phase. Therefore, in the layout phase, a node of a ViewGroup type is mainly processed.

Refer to FIG. 10b. For example, the layout system may process a ViewGroup node that is not processed in the measurement phase. After traversing to the ViewGroup and obtaining a layout result of the ViewGroup, the layout system can check whether the ViewGroup is correspondingly marked. As described above, the layout system marks a ViewGroup that needs to be stretched or compressed and stretched, and does not mark a ViewGroup that is not processed. If the layout system detects that the ViewGroup has a corresponding mark, the layout system does not need to perform abnormal node determining and processing on the ViewGroup in the layout phase. If the layout system detects that the ViewGroup does not have a corresponding mark, the layout system performs abnormal node determining and processing based on the process in FIG. 10b.

For example, for an unprocessed ViewGroup, the layout system may detect a width of the ViewGroup.

1. The Width is Greater than a Maximum Value of the Preset Range.

For example, as described above, the preset range is set in the layout system. For example, the preset range is greater than or equal to 40% of the width of the second display window, and less than or equal to 60% of the width of the second display window. For example, if the layout system detects that the width of the ViewGroup is greater than the maximum value of the preset range, for example, greater than 60% of the width of the second display window, the layout system continues to perform identification based on the processing process in FIG. 10b in which the width is greater than the maximum value of the preset range, that is, the layout system further detects whether the width of the ViewGroup is greater than or equal to the threshold (for example, 80% of the width of the second display window).

1.1. The Width is Greater than or Equal to the Threshold.

For example, if the layout system detects that the width of the ViewGroup is greater than or equal to the threshold (for example, 80% of the width of the second display window), the layout system continues to traverse at least one child node of the ViewGroup, to obtain a layout result of each child node.

After traversing all child nodes of the ViewGroup, the layout system returns to the ViewGroup. After the layout system returns to the ViewGroup, a policy of the ViewGroup may be determined based on the layout result of each child node. For example, the layout system may obtain, based on the layout result of each child node, a maximum width (a width of the child node for short) occupied by the child node in the ViewGroup.

In an example, if the width of the child node is within the preset range, processing is performed according to 1.1.1. In an example, if the width of the child node is not within the preset range, processing is performed according to 1.1.2.

1.1.1. The Width of the Child Node is within the Preset Range.

For example, if the width occupied by the child node in the ViewGroup is within the preset range, a policy corresponding to the ViewGroup and the child node thereof is that the child node is stretched.

In an example, in the layout process, after the layout system determines that the policy of the ViewGroup is child node stretching, the layout system may remeasure the ViewGroup. The layout system compresses the width of the ViewGroup based on the ratio of the width of the first display window to the width of the second display window. For example, the layout system compresses the width of the ViewGroup to a half of the current width. The layout system may re-lay out the ViewGroup and the child node thereof based on a remeasurement result of the ViewGroup. The layout system marks the ViewGroup to indicate stretching in a draw process. In the draw process, the layout system may stretch canvases of the ViewGroup and the child node thereof.

In another example, the layout system may mark the ViewGroup to indicate that the policy of the ViewGroup is child node stretching. Certainly, the layout system may alternatively mark each node of the ViewGroup, and mark the child node as a node that needs to be stretched. This is not limited in this application. In the draw process, the layout system may stretch the canvas of the child node of the ViewGroup based on the mark.

1.1.2. The Width of the Child Node is not within the Preset Range.

For example, if the width occupied by the child node in the ViewGroup is within the preset range, for example, the width of the child node is greater than the maximum value of the preset range, or the width of the child node is less than a minimum value of the preset range, a policy corresponding to the ViewGroup and the child node thereof is that the ViewGroup and the child node thereof are not processed. In other words, the layout system does not need to perform compression, stretching or the like on the ViewGroup and the child node thereof. A specific example is described in detail below. Details are not described herein.

1.2. The Width is Less than the Threshold.

For example, if the layout system detects that the width of the ViewGroup is less than the threshold (for example, 80% of the width of the second display window), it is determined that the policy of the ViewGroup is that the ViewGroup and the child node thereof are not processed.

It may be understood that, in this embodiment, for a ViewGroup whose width is between the maximum value of the preset range and the threshold, it may be considered that the ViewGroup has small impact on aesthetics of a user interface. Therefore, the ViewGroup and the child node of the ViewGroup may not be processed.

2. The Width is Less than the Minimum Value of the Preset Range.

For example, after the layout system obtains the layout result of the ViewGroup, the layout system detects that the width of the ViewGroup is less than the minimum value of the preset range, and determines that the policy of the ViewGroup is that the ViewGroup and the child node thereof are not processed. It may be understood that, in this embodiment, if the width occupied by the ViewGroup and the child node thereof is less than the minimum value of the preset range (for example, 40% of the width of the second display window), the ViewGroup is still kept in a current state in the second display window. In other words, the ViewGroup and the child nodes of the ViewGroup have little impact on aesthetics of a user interface. It may also be understood that, when the node is displayed on a bar-type mobile phone or an outer screen of a foldable mobile phone, a width of the node is smaller than that of another control. When the node is displayed on a large screen (for example, an inner screen of the foldable mobile phone), a width of the node is still small. Therefore, overall aesthetics of a user interface are not affected.

In a possible implementation, when the width of the node (including the View or the ViewGroup) is a non-fixed value, there may be a node type that varies with a text length. The layout system does not need to process this type of nodes.

It should be noted that the node processing manner and the determining condition listed in this embodiment are merely examples. The interface processing method in this application is intended to detect, based on a measurement result and/or a layout result of a node, whether the node has impact on aesthetics of a user interface. For a node that may have impact, the layout system may perform processing such as stretching, or stretching after compression, so that a width of the node is adapted to a width of the actual display window, to improve aesthetics of a user interface.

It should be further noted that the determining manner in this embodiment is executed in the measurement phase, or the measurement phase and the layout phase, for example, the determining processes shown in FIG. 10a and FIG. 10b. In another embodiment, the layout system may alternatively perform abnormal node determining and processing in the layout phase, and does not need to perform determining in the measurement phase. For example, in the layout phase, after obtaining layout information of the node, the layout system may perform determining based on the processes in FIG. 10a and FIG. 10b. For a node that needs to be compressed, in the layout phase, the layout system may remeasure and re-lay out the node. A specific implementation is similar to that in this embodiment. Details are not described in this application again.

The following describes in detail the preset rules shown in FIG. 10a and FIG. 10b with reference to the ViewTree in FIG. 9a.

Figure 11A:
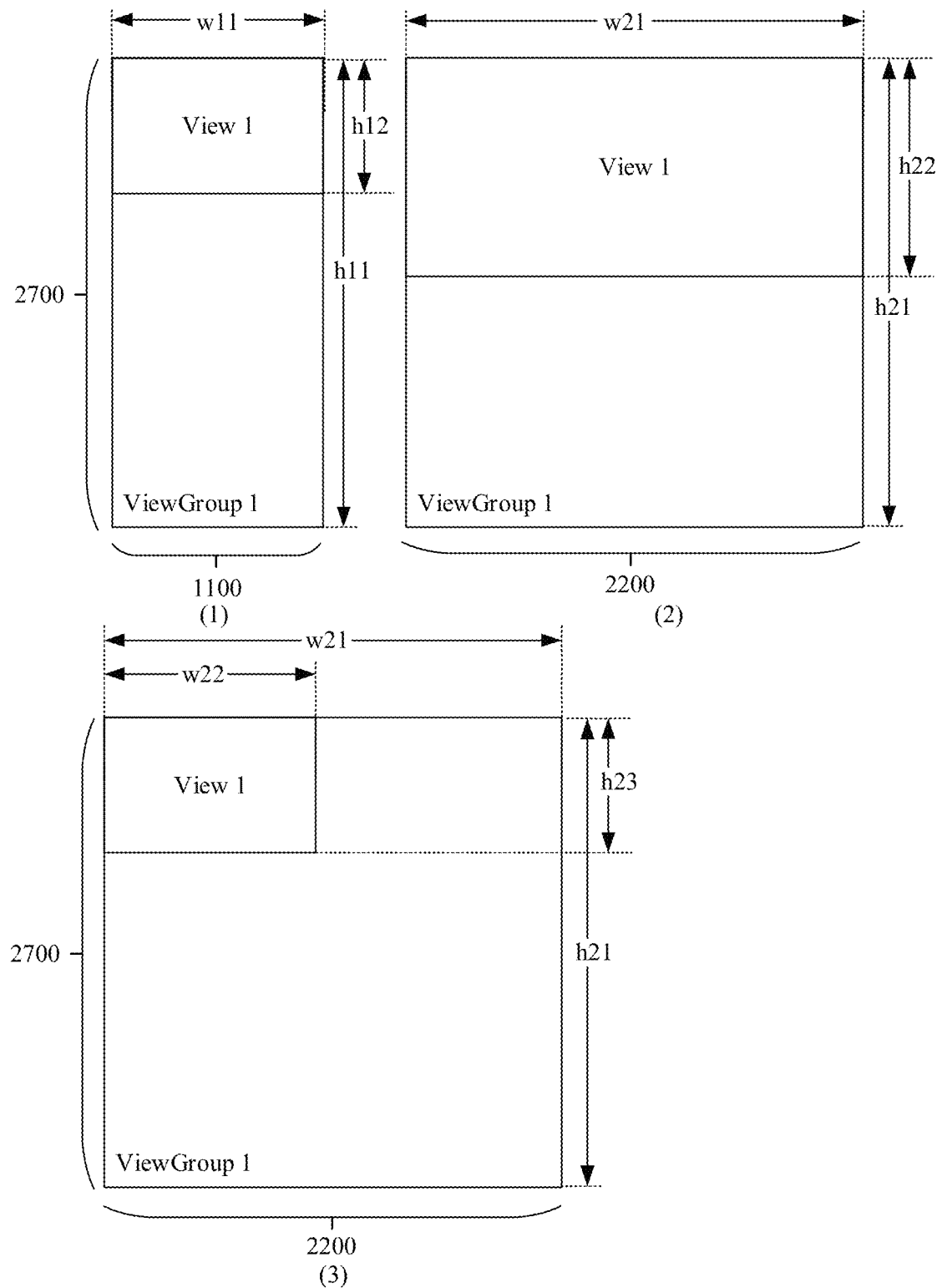
FIG. 11a is a diagram of an example of large picture node processing.

FIG. 11a is a diagram of an example of large picture node processing. Refer to (1) in FIG. 11a. Based on the ViewTree generated by the application, the layout system may determine, based on the declaration information of the ViewGroup 1, that the ViewGroup 1 is a root node. Correspondingly, a height of the ViewGroup 1 in the first display window is h11, and a width of the ViewGroup 1 is w11. The layout system measures the ViewGroup 1, and an obtained measurement result is as follows: A width of the ViewGroup 1 in the second display window is w21, and a height of the ViewGroup 1 is h21. It should be noted that, in this embodiment, an example in which an application is displayed in full screen on an inner screen of a mobile phone is used for description. Correspondingly, a size of the second display window is a display size of the inner screen of the mobile phone, and a size of the ViewGroup 1 and a size of the second display window are equal to each other, for example, both are 2700*2200 pixels. It should be noted that, in this embodiment, the layout system may not execute abnormal node determining shown in FIG. 10 on a root node (namely, the ViewGroup 1).

For example, the layout system continues to traverse the ViewTree, and traverses to the View 1. As shown in (1) in FIG. 11a, the layout system may determine, based on the declaration information of the View 1, that a height of the View 1 in the first display window is h12 and a width of the View 1 is w11. The width of the View 1 is equal to a width (for example, 1100 pixels) of the parent node (namely, the ViewGroup 1) of the View 1, and the height w11 is optionally 80% (for example, 880 pixels) of the width.

For example, refer to (2) in FIG. 11a. The layout system measures the ViewGroup 1 based on the second display window and the declaration information of the ViewGroup 1, to obtain that a size of the ViewGroup 1 is the same as that of the second display window, a height of the ViewGroup 1 is h21, and a width of the ViewGroup 1 is w21.

For example, the layout system measures the View 1 based on the second display window and the declaration information of the View 1. It is obtained that a height of the View 1 in the ViewGroup 1 (or it may alternatively be understood as being in the second display window) is h22, and a width of the View 1 is w21. That is, the width w21 of the View 1 is equal to the width w21 of the ViewGroup 1 (for example, 2200 pixels), and the height h22 of the View 1 is 80% (for example, 1760 pixels) of the width w21. It should be noted that, a measurement result obtained by the layout system in a measurement process includes only a width and a height of a node, but does not obtain a position of the node in the second display window. The position of the node in the display window shown in the measurement process in this embodiment is merely an example. Details are not described in the following again.

Figure 11B:
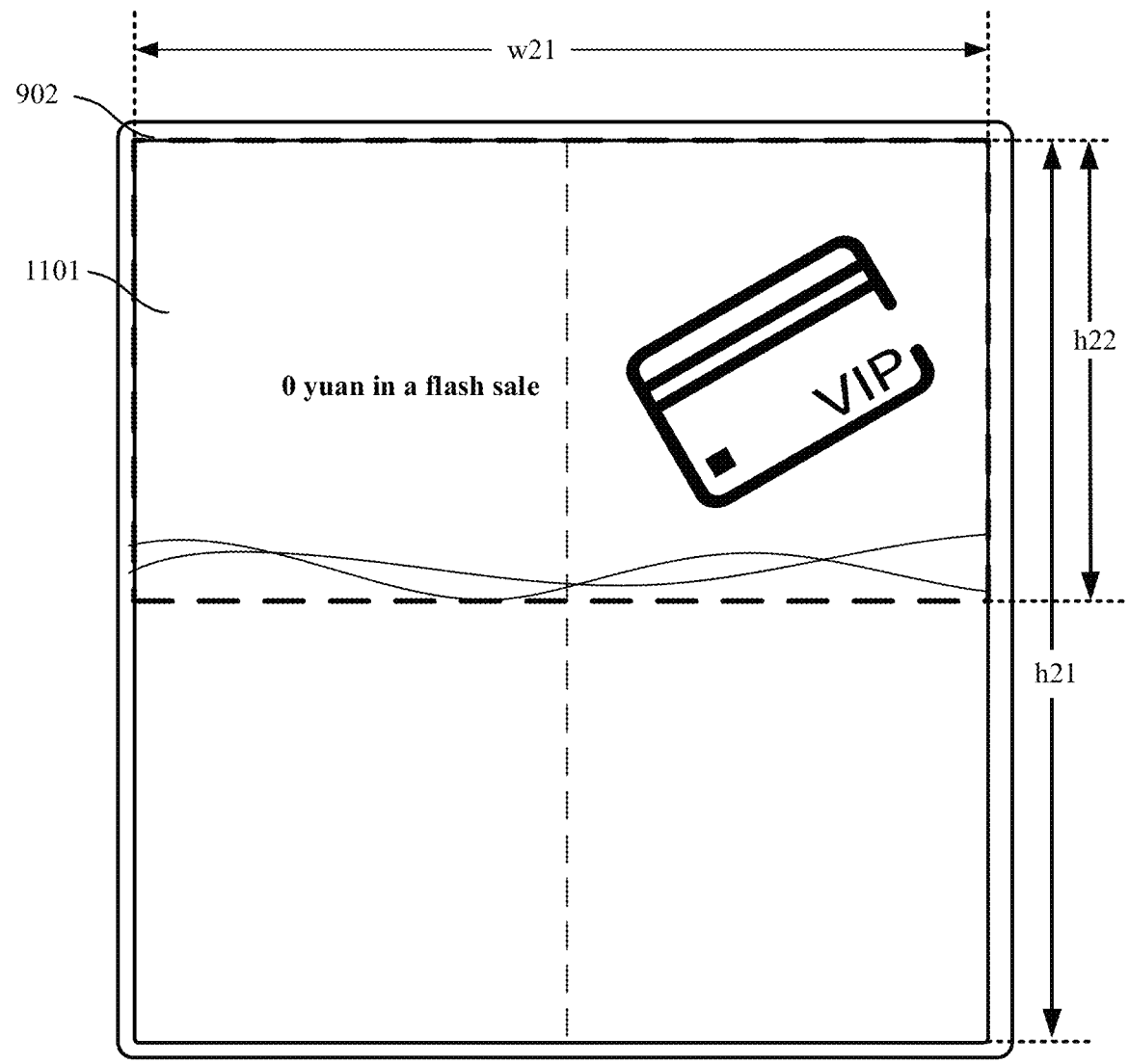
FIG. 11b is a diagram of an example of node effect.

For example, FIG. 11b is a diagram of an example of node effect. Refer to FIG. 11b. The layout system measures the ViewGroup 1 based on the second display window and the declaration information of the ViewGroup 1, and an obtained measurement result indicates that a width and a height of a control corresponding to the View 1 in the second display window are w21 and h22, respectively. For a node of a picture type, if the node is enlarged in the second display window, picture content may be distorted. In addition, if a height of a picture increases with a width, more user interfaces may be occupied, so that elements in the user interface are reduced.

For example, the layout system performs abnormal node determining on the View 1 based on FIG. 10a. For example, the layout system detects that a node is a View node, the layout system further detects that a type of the View 1 is a media type, and the width w21 of the View 1 is greater than the threshold (namely, 80% of the width of the second display window, for example, 1760 pixels), and the layout system determines that the View 1 is a large media node. In other words, an abnormal node determining step proceeds to 2 in FIG. 10a, and the layout system determines that a policy of the View 1 is compression and stretching.

For example, refer to (3) in FIG. 11a. The layout system remeasures the View 1, and compresses the View 1 based on the ratio of the width of the first display window to the width of the second display window. In this embodiment, an example in which the width of the first display window is a half of the width of the second display window is used for description. Details are not described in the following. Correspondingly, the layout system compresses the width of the View 1 to a half (namely, 50%) of the current width, to obtain that a width of the View 1 is w22 (for example, 1100 pixels). For example, the height of the View 1 changes with the width, to obtain a height of h23 (for example, 880 pixels).

Figure 11C:
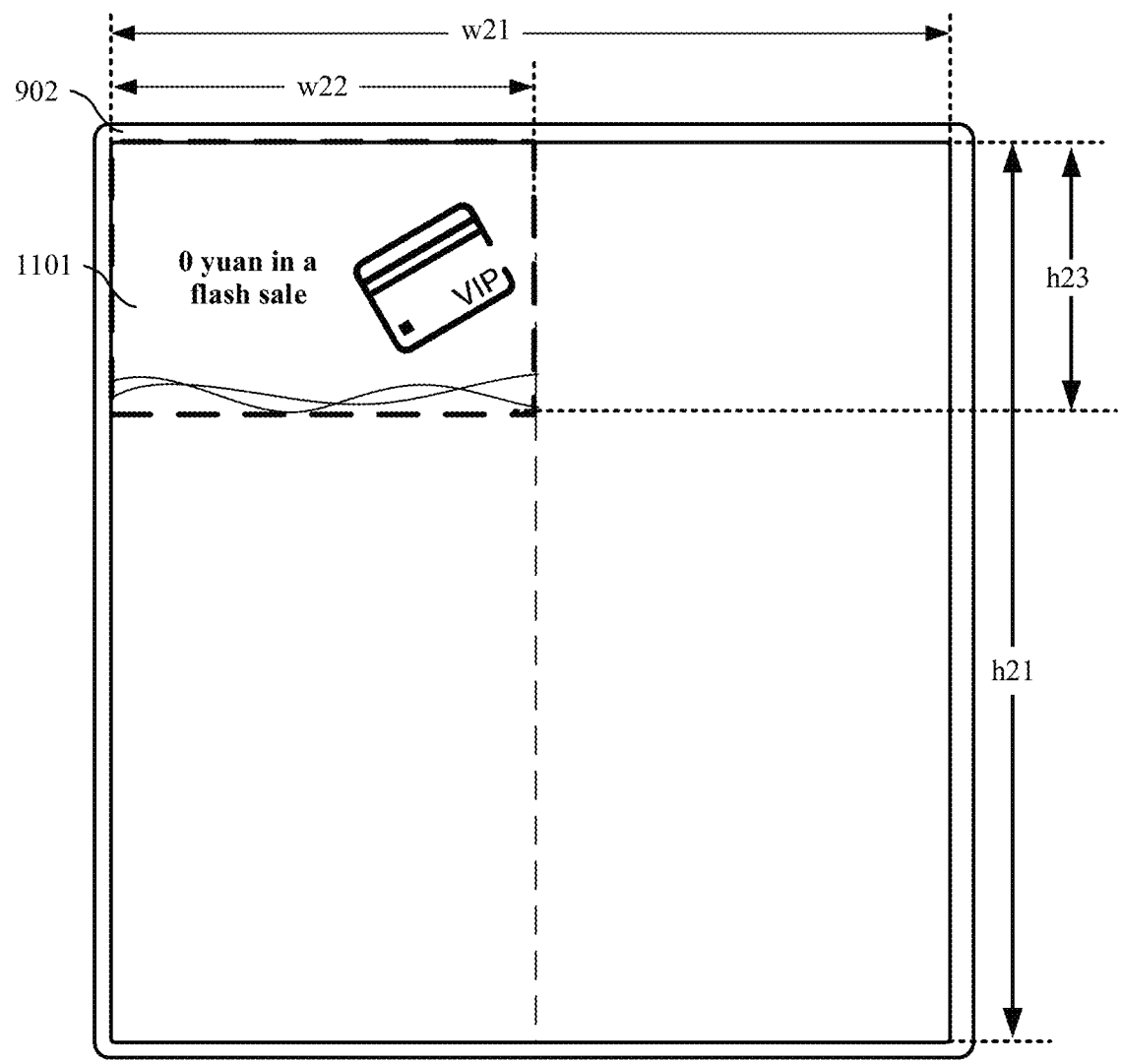
FIG. 11c is a diagram of an example of node effect.

FIG. 11c is a diagram of an example of node effect. Refer to FIG. 11c. After the layout system remeasures the View 1, a width of a control corresponding to the View 1 in the second display window is w22, which is reduced to a half of an original measurement result. A height of the control is also compressed accordingly, so that image distortion can be avoided and a height in a vertical direction of the second display window is reduced.

It should be noted that effect diagrams shown in embodiments of this application are all examples, to better describe effect after node processing in this application. Actually, the layout system does not generate the effect diagram. Details are not described in the following again.

For example, the layout system marks the View 1, to indicate that the View 1 is stretched in the draw process.

Figure 12:
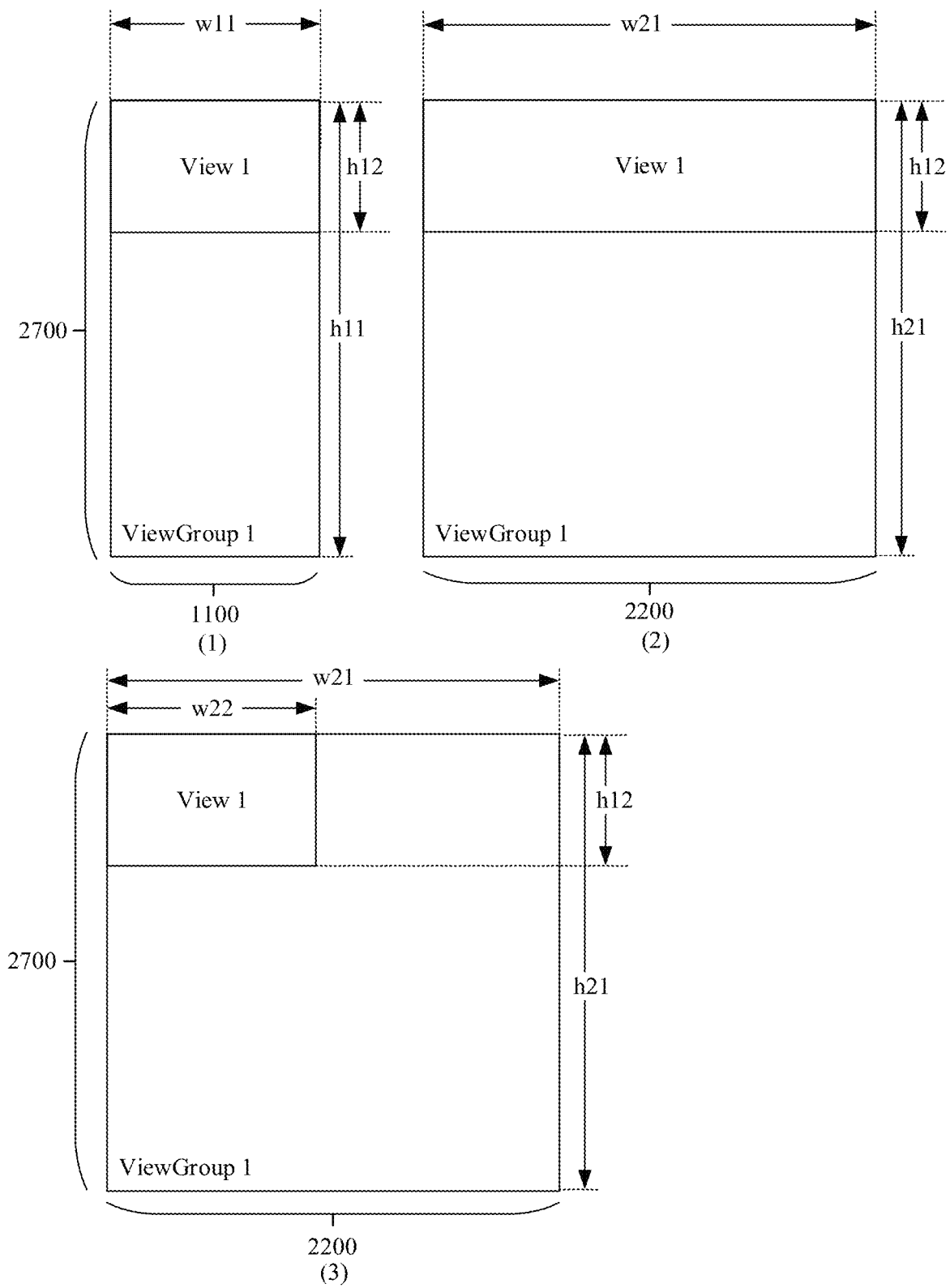
FIG. 12 is a diagram of an example of large picture node processing.

In a possible implementation, the height of the View 1 may be a fixed value. FIG. 12 is another diagram of an example of large picture node processing. Refer to (1) in FIG. 12. The layout system may obtain the declaration information of the View 1, where the declaration information indicates that a width w11 of the View 1 is the same as a width of the ViewGroup 1, and a height h12 of the View 1 is 1760 pixels, namely, a fixed value. Correspondingly, as shown in (2) in FIG. 12, in a process in which the layout system measures the View 1 based on the second display window, a measurement result of the View 1 obtained by the layout system is as follows: A width of the View 1 is w21 (equal to a width of the second display window, for example, 2200 pixels), and a height of the View 1 is still h12. For example, the layout system determines, based on the preset rule in FIG. 10a, that the View 1 is a large media node, and a corresponding policy is compression and stretching. Refer to (3) in FIG. 12. For example, the layout system remeasures the View 1, and the layout system compresses the width of the View 1 to a half of the current width, for example, w22 of 1100 pixels. A height of the View 1 is always h21 (for example, 1760 pixels). That is, in this example, the height of the View 1 is a fixed value and does not change with the width of the View 1.

Figure 13:
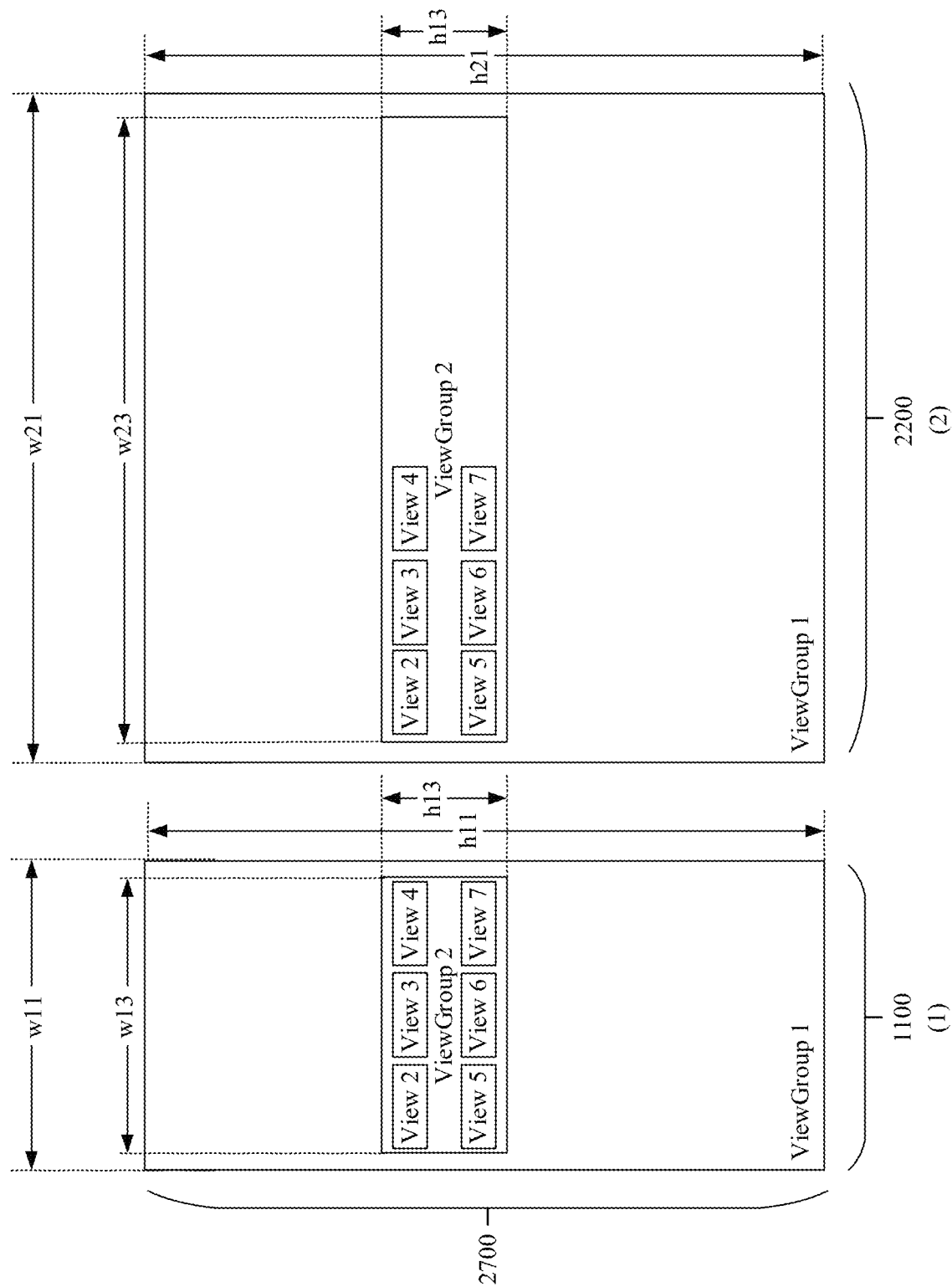
FIG. 13 is a diagram of an example of node processing.

For example, in a measurement process, the layout system continues to traverse the ViewTree based on the order in FIG. 9b, and traverses to the ViewGroup 2. FIG. 13 is a diagram of an example of node processing. (1) in FIG. 13 schematically shows a layout of the ViewGroup 2 and child nodes (including the View 2 to the View 7) thereof in the first display window. For example, the declaration information of the ViewGroup 2 indicates that a height of the ViewGroup 2 is h13 (namely, a fixed value, for example, 200 pixels), and a width w13 of the ViewGroup 2 is 80% (for example, 880 pixels) of a width of the ViewGroup 1.

Refer to (2) in FIG. 13. The layout system measures the ViewGroup 2 based on the second display window, and may obtain that a height of the ViewGroup 2 in the ViewGroup 1 is h13 and a width of the ViewGroup 2 is w23. For example, the height of the ViewGroup 2 is a fixed value, and the height (for example, 200 pixels) of the ViewGroup 2 in the second display window is the same as the height of the ViewGroup 2 in the first display window. The width of the ViewGroup 2 is an unfixed value, and changes with the width of the ViewGroup 1(namely, a width of a display window). For example, the width w23 of the ViewGroup 2 in the second display window is 80% (for example, 1760 pixels) of the width of the ViewGroup 1.

For example, the layout system performs abnormal node determining on the ViewGroup 2 based on FIG. 10a. For example, the layout system detects that a node is a ViewGroup node, and the layout system further detects that a size of the ViewGroup 2 is a non-fixed value, that is, a detection process proceeds to 1.2 in FIG. 10a, and the layout system determines that a policy corresponding to the ViewGroup 2 is no processing. In other words, the layout system does not perform abnormal processing on the ViewGroup 2 in the measurement phase.

Refer to (2) in FIG. 13. For example, the layout system continues to traverse all child nodes (including the View 2 to the View 7) of the ViewGroup 2 one by one, to obtain corresponding measurement results. When measuring the child node, the layout system determines, based on an abnormal node determining result (that is, the policy is no processing) of the ViewGroup 2, that abnormal node determining does not need to be performed on the child node in the measurement phase. It may be understood that the layout system can obtain only a measurement result of the child node in the ViewGroup 2 in the measurement phase, but cannot obtain a layout result. For example, if the child nodes in the ViewGroup 2 are laid out based on a layout shown in (2) in FIG. 13, that is, the child nodes are laid out on a left side of a user interface, aesthetics of the user interface are affected. However, if the child nodes in the ViewGroup 2 are laid out based on a layout shown in FIG. 17b, that is, the child nodes are evenly distributed in the ViewGroup 2, aesthetics of the user interface are not affected. Therefore, because the layout system does not know a layout of child nodes in a ViewGroup in the measurement phase, the layout system may perform determining after obtaining more information in the layout phase, to detect whether abnormal node processing needs to be performed on the ViewGroup and the child node thereof.

After traversing all nodes of the ViewGroup 2, and obtaining corresponding measurement results, the layout system returns to the ViewGroup 2 node.

Figure 14A:
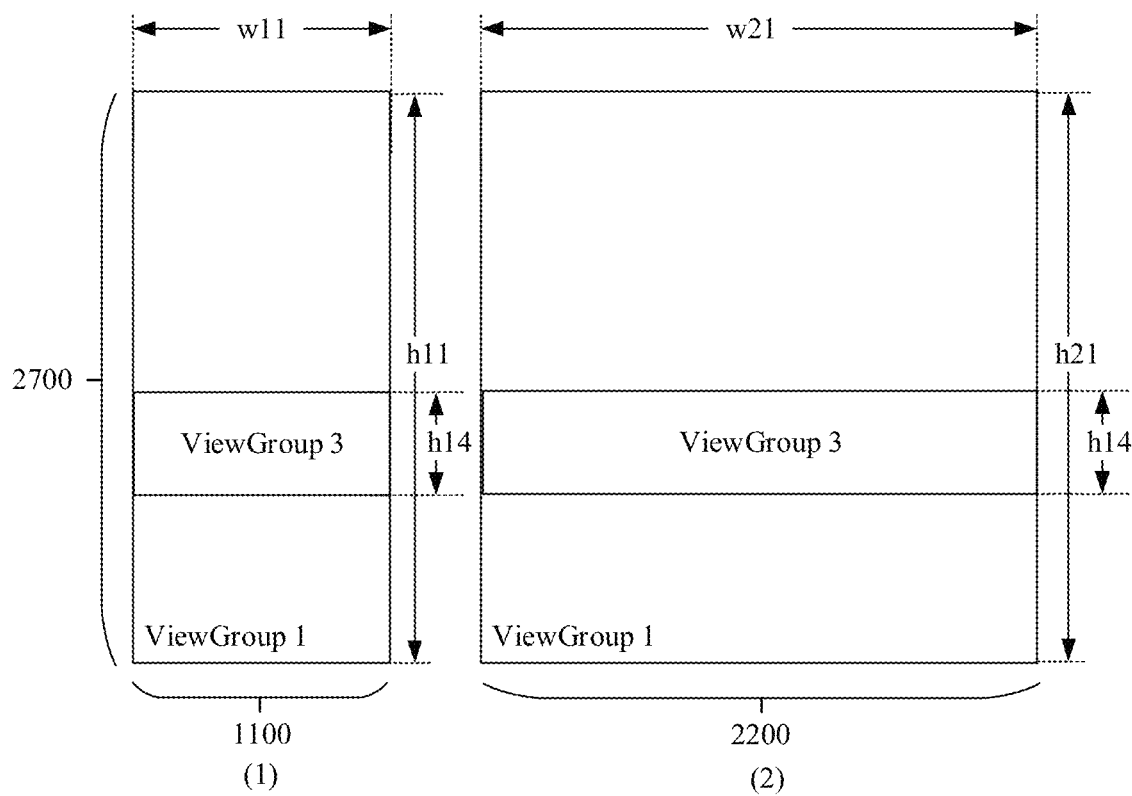
FIG. 14a is a diagram of an example of special type node processing.

For example, the layout system continues to traverse the ViewTree based on the order in FIG. 9b, and traverses to the ViewGroup 3. FIG. 14a is a diagram of an example of special type node processing. Refer to (1) in FIG. 14a. The layout system may obtain the declaration information of the ViewGroup 3. The declaration information of the ViewGroup 3 includes but is not limited to: type information of the ViewGroup 3, layout information of the ViewGroup 3, content information of the ViewGroup 3, and the like. For example, the declaration information of the ViewGroup 3 indicates that a width w11 of the ViewGroup 3 is the same as a width of the parent node (the ViewGroup 1) of the ViewGroup 3, and a height w13 of the ViewGroup 3 is 300 pixels. That is, the width of the ViewGroup 3 is a non-fixed value, and the height of the ViewGroup 3 is a fixed value. For example, the declaration information of the ViewGroup 3 further indicates that the type information of the ViewGroup 3 is "ViewPager", namely, a view page flipping type (which may also be referred to as a view page flipping control type).

For example, the layout system measures the ViewGroup 3 based on the second display window and the declaration information of the ViewGroup 3, to obtain a measurement result of the ViewGroup 3. As shown in (2) in FIG. 14a, a width w21 of the ViewGroup 3 is the same as a width (for example, 2200 pixels) of the parent node (namely, the ViewGroup 1), and a height h14 of the ViewGroup 3 is a fixed value, for example, 300 pixels, indicated in the declaration information.

For example, the layout system performs abnormal node detection on the ViewGroup 3 based on the preset rule in FIG. 10a. If the layout system detects that a type of the ViewGroup 3 is "ViewPager", and a width of a picture in the ViewGroup 3 is greater than the threshold (for example, 80% of the width of the second display window, namely, 1760 pixels), the layout system determines that the ViewGroup 3 is a special type node, and a corresponding policy is compression and stretching.

Figure 14B:
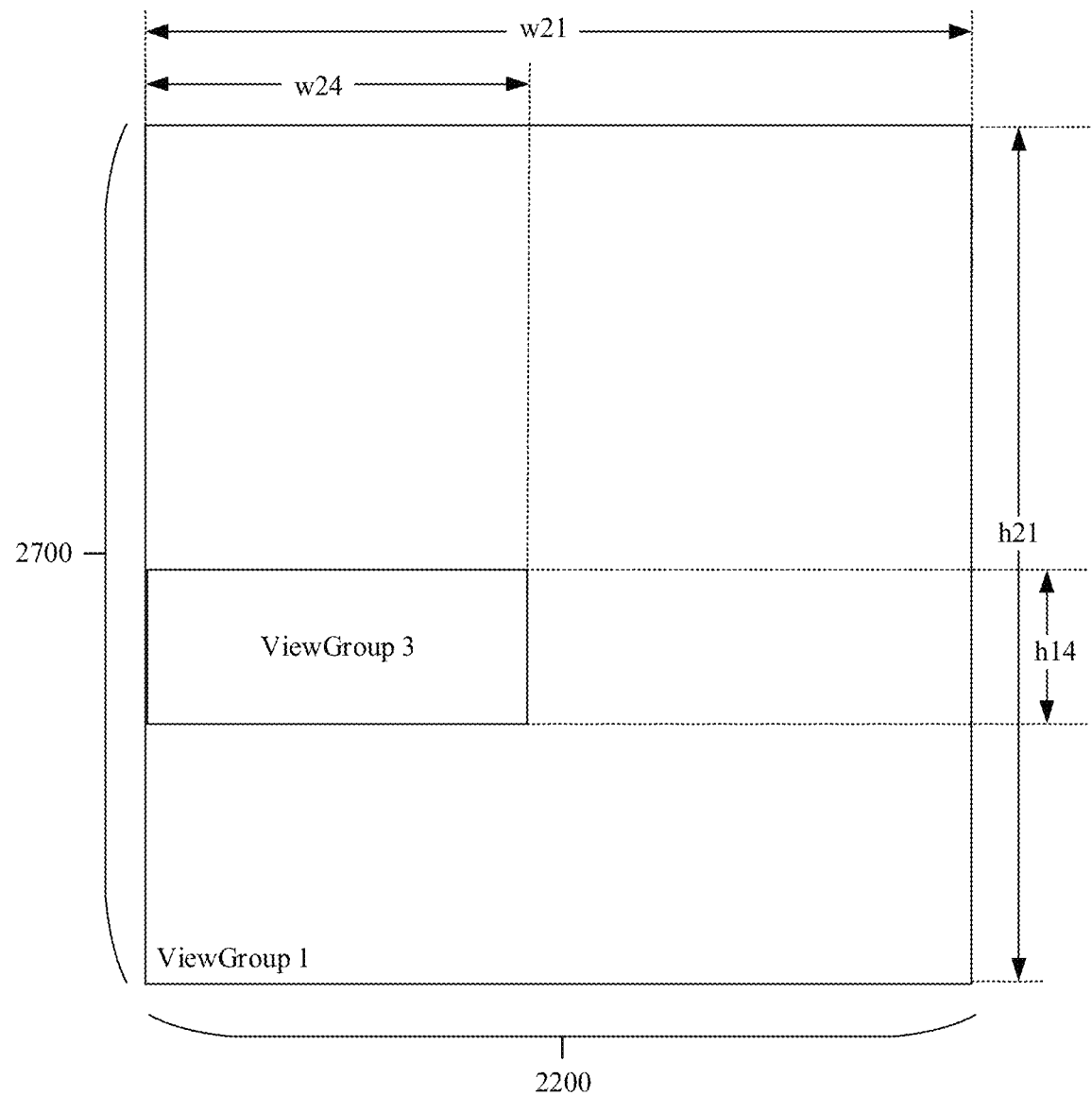
FIG. 14b is a diagram of an example of special type node processing.

FIG. 14*b* is a diagram of an example of special type node processing. Refer to FIG. 14*b*. The layout system remeasures the ViewGroup 3, and compresses a width of the ViewGroup 3 to a half, to obtain that a width of the ViewGroup 3 is w24 (for example, 1100 pixels). For example, a height h14 of the ViewGroup 3 is a fixed value. Correspondingly, after the width of the ViewGroup 3 is compressed, the height of the ViewGroup 3 is still h14 (for example, 300 pixels).

For example, as described above, a "ViewPager" type node may be understood as a node that includes a plurality of pictures. As shown in FIG. 9*b*, the ViewGroup 3 includes a plurality of child nodes, and each child node is a picture type node, or may be understood as a picture type control. Correspondingly, after the layout system compresses the ViewGroup 3, each child node of the ViewGroup 3 is compressed. For example, when the layout system measures the node of the ViewGroup 3, because the ViewGroup 3 has been compressed, correspondingly, a measurement result of each child node is obtained based on a size of the compressed ViewGroup 3. For example, a current size of the ViewGroup 3 is as follows: A height is h14, and a width is w24. If the declaration information that is of the View 11 and that is obtained by the layout system indicates that a size of the View 11 is equal to a size of the ViewGroup 3, a measurement result of the View 11 is as follows: A height of the View 11 is h14, and a width of the View 11 is w24. The processing of the View 12 and the View 13 is the same as that of the View 11. Details are not described herein again.

Figure 14C:
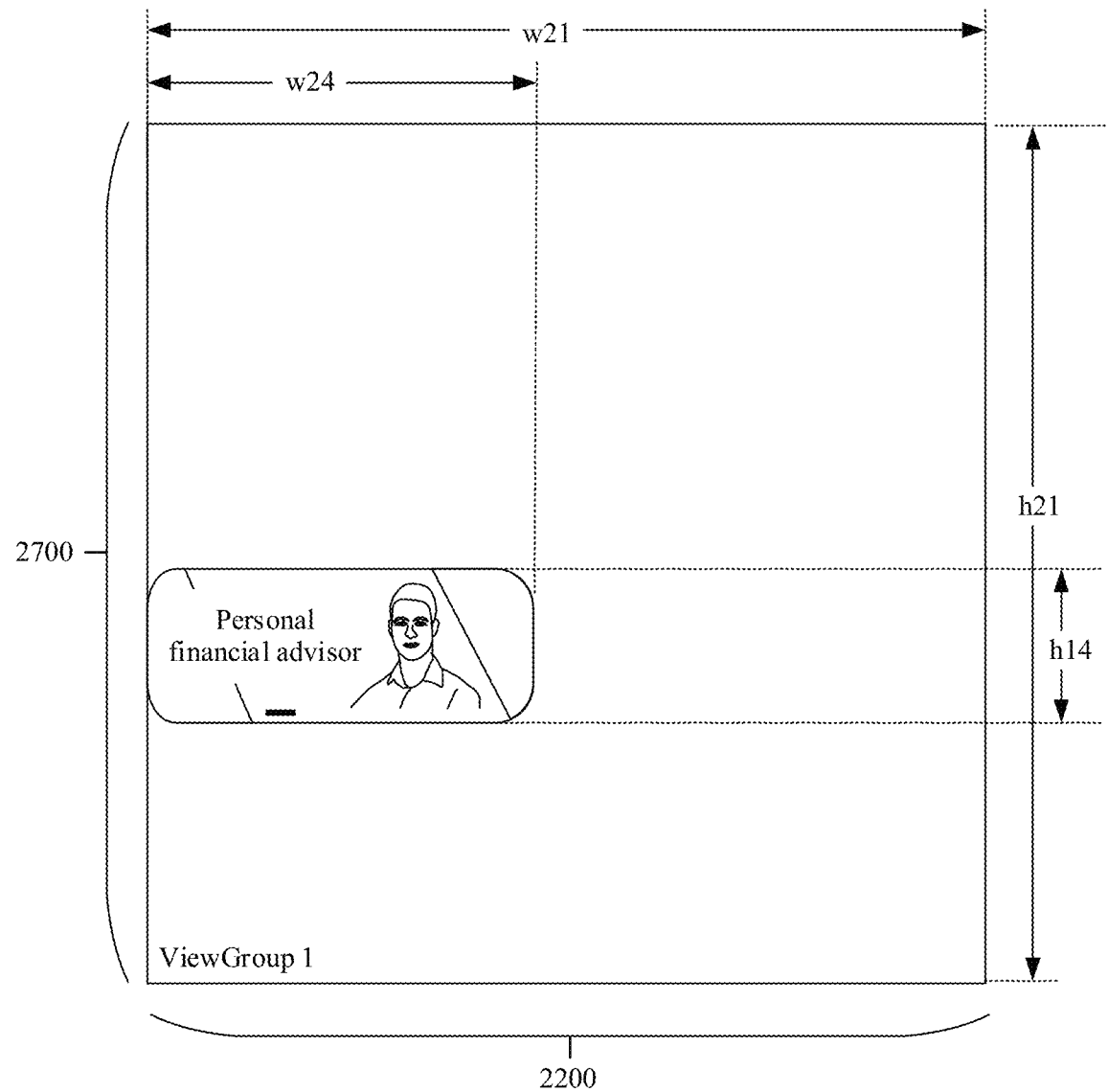
FIG. 14c is a diagram of an example of node effect.

FIG. 14*c* is a diagram of an example of node effect. Refer to FIG. 14*c*. After the layout system compresses the ViewGroup 3, pictures (namely, the View 11 to the View 13) in the ViewGroup 3 are compressed accordingly, to avoid a problem that a picture is abnormally stretched after a special type node including the picture is laid out in the second display window.

Figure 15A:
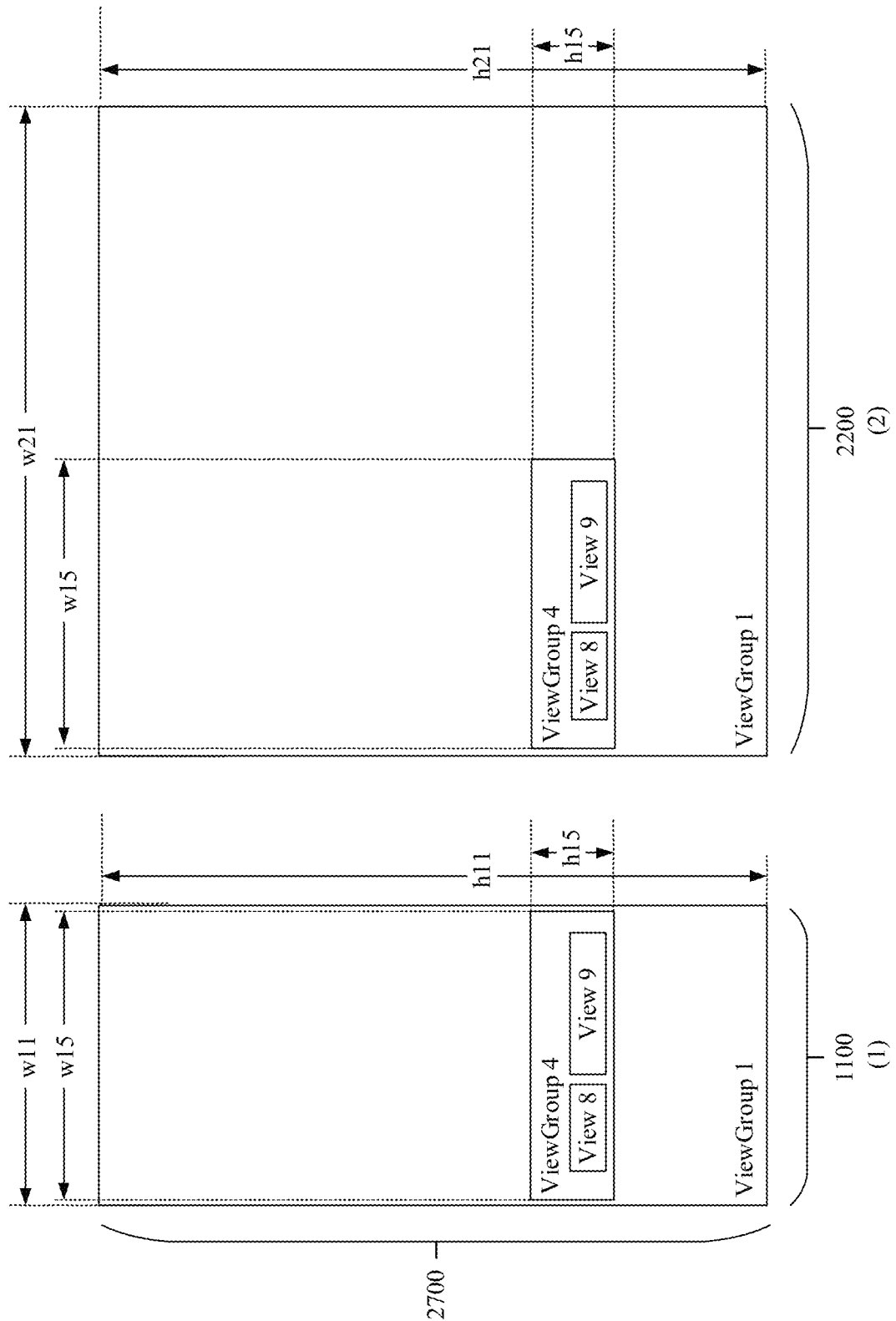
FIG. 15a is a diagram of an example of special type node processing.

For example, the layout system continues to traverse the ViewTree based on the order in FIG. 9*b*, and traverses to the ViewGroup 4. FIG. 15*a* is a diagram of an example of special type node processing. Refer to FIG. 15*a*. The layout system may obtain declaration information of the ViewGroup 4. The declaration information of the ViewGroup 4 includes but is not limited to: type information of the ViewGroup 4, layout information of the ViewGroup 4, content information of the ViewGroup 4, and the like. For example, the declaration information of the ViewGroup 4 indicates that a type of the ViewGroup 4 is "ViewGroup". In addition, the declaration information of the ViewGroup 4 further indicates that a width w15 of the ViewGroup 4 is 900 pixels, and a height h15 of the ViewGroup 4 is 100 pixels. That is, the width and height of the ViewGroup 4 are fixed values.

The layout system measures the ViewGroup 2 based on the second display window, to obtain a measurement result of the ViewGroup 4. As shown in (2) in FIG. 15*a*, the width of the ViewGroup 4 is still w15, namely, a fixed value, and the height is still h15, namely, a fixed value.

For example, the layout system performs abnormal node detection on the ViewGroup 3 based on the preset rule in FIG. 10*a*. The layout system detects that the ViewGroup 3 is a ViewGroup type node, a width of the ViewGroup 3 is a fixed value, and a width w15 (for example, 900 pixels) of the ViewGroup 3 is within a preset range. In this embodiment, the preset range is greater than or equal to 40% (for example, 880 pixels) of the width of the second display window, and less than or equal to 60% (for example, 1320 pixels) of the width of the second display window. Correspondingly, the layout system determines that a policy of the ViewGroup 3 is that the ViewGroup 3 and the child node thereof are stretched.

For example, the layout system marks the ViewGroup 4, to indicate alignment for stretching in the draw process. Then, the layout system continues to traverse to the View 8, and obtains a measurement result of the View 8. The layout system determines that the View 8 also needs to be stretched based on an abnormal node determining result of the ViewGroup 4. The layout system does not need to execute abnormal node determining on the View 8 again. The View 9 is the same as the View 8. Details are not described herein.

Figure 15B:
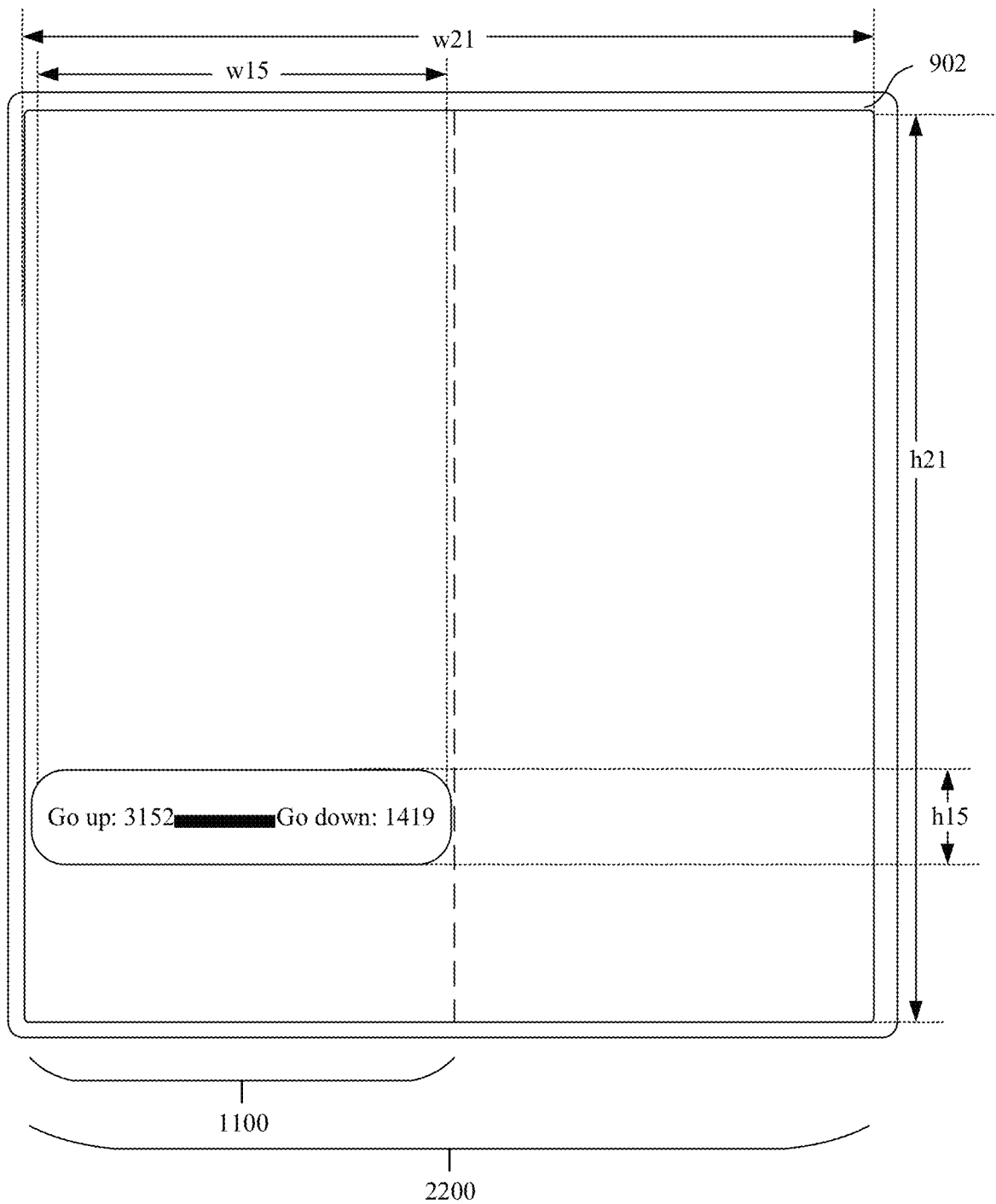
FIG. 15b is a diagram of an example of node effect.

FIG. 15*b* is a diagram of an example of node effect. Refer to FIG. 15*b*. If a width that is of the ViewGroup 4 and that is obtained by the layout system through measurement is within a preset range, when a control of the width is displayed on the inner screen 902, aesthetics of a user interface are affected. Therefore, the layout system stretches this type of control in the draw process, so that a width of a user interface of the control is adapted to the width of the second display window, to effectively improve aesthetics of the user interface.

Figure 16A:
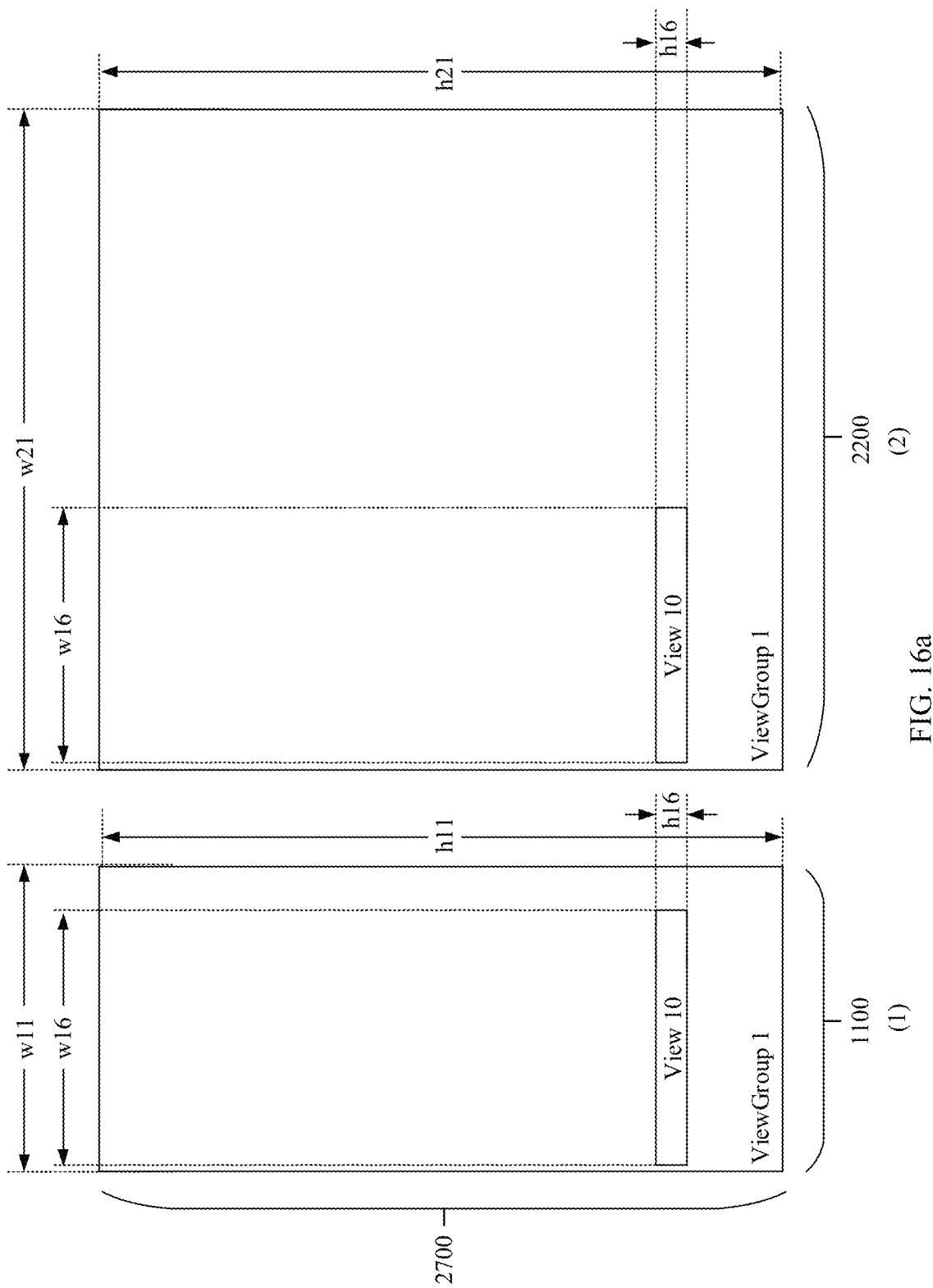
FIG. 16a is a diagram of an example of View node processing.

For example, the layout system continues to traverse the ViewTree based on the order in FIG. 9*b*, and traverses to the View 10. FIG. 16*a* is a diagram of an example of View node processing. Refer to FIG. 16*a*. The layout system may obtain declaration information of the View 10. The declaration information of the View 10 includes but is not limited to: type information of the View 10, layout information of the View 10, content information of the View 10, and the like. For example, the declaration information of the View 10 indicates that a type of the View 10 is "View". In addition, the declaration information of the View 10 further indicates that a length w16 and a height h16 of the View 10 vary with a length and a height of a text. For example, if the text occupies one line and a length is w16, a width of the View 10 is w16, and a height is a height of the one line of text. Optionally, the width and the height of the View 10 may be slightly greater than the height and the width of the text. This is not limited in this application. For another example, if the text occupies two lines, a length is w11, and a height is a height of the two lines of text, a width of the View 10 is w11, and a height is the height of the two lines of text.

The layout system measures the View 10 based on the second display window, to obtain a measurement result of the View 10. As shown in (2) in FIG. 16*a*, the View 10 is in the second display window, a height and a width of the View 10 are the same as those of the text, the width is still w16, and the height is h16.

In a possible implementation, if the text is two lines of text, a length is w11, and a height is a height of the two lines of text. When the layout system performs measurement based on the second display window, the text length is optionally adapted to a length of the second display window. For example, the two lines of text may be changed to one line of text, so that the length of the text is increased, and the height is reduced to a height of the one line of text.

For example, the layout system detects that a parent node (namely, a root node) of a node is not marked, and the node is a node whose width changes with a text width. Therefore, the layout system determines that a policy of the node is no processing. In other words, the View 10 may maintain, in the second display window, a width and a height that are obtained through measurement, and no modification is required. It may be understood that a width of such a node in the first display window also changes with a text length, display effect of the node in the second display window is not affected, and processing such as stretching does not need to be performed on the node.

Figure 16B:
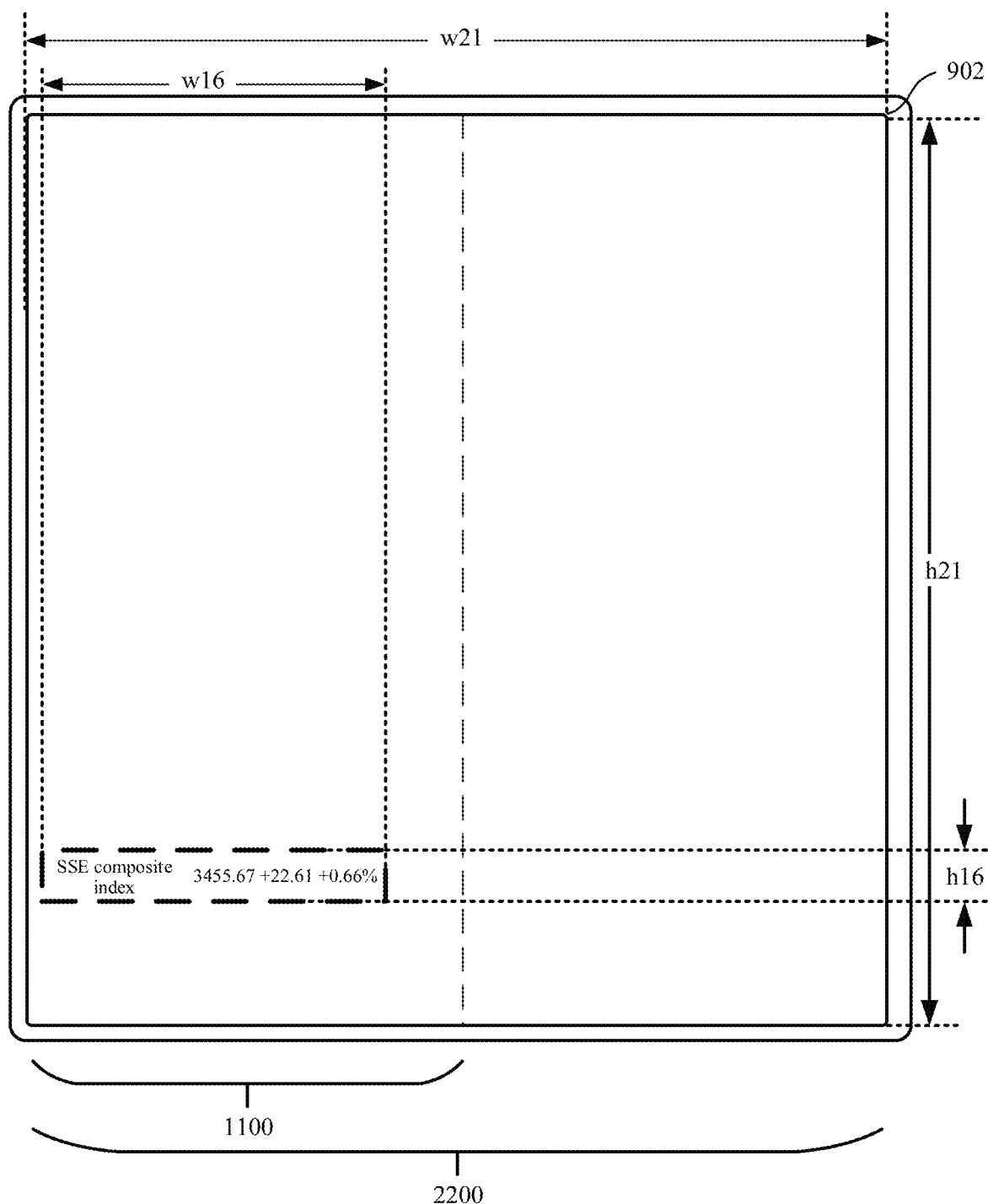
FIG. 16b is a diagram of an example of node effect.

FIG. 16b is a diagram of an example of node effect. Refer to FIG. 16b. The View 10 is a text type node, and when the View 10 is displayed on the inner screen 902, even if a width of the node is increased, a length of a displayed text remains unchanged (for example, w16). Therefore, the width of the node does not need to be processed.

For example, after the layout system traverses the nodes in the ViewTree, the layout system performs a layout process on the nodes in the ViewTree based on the second display window.

Figure 17A:
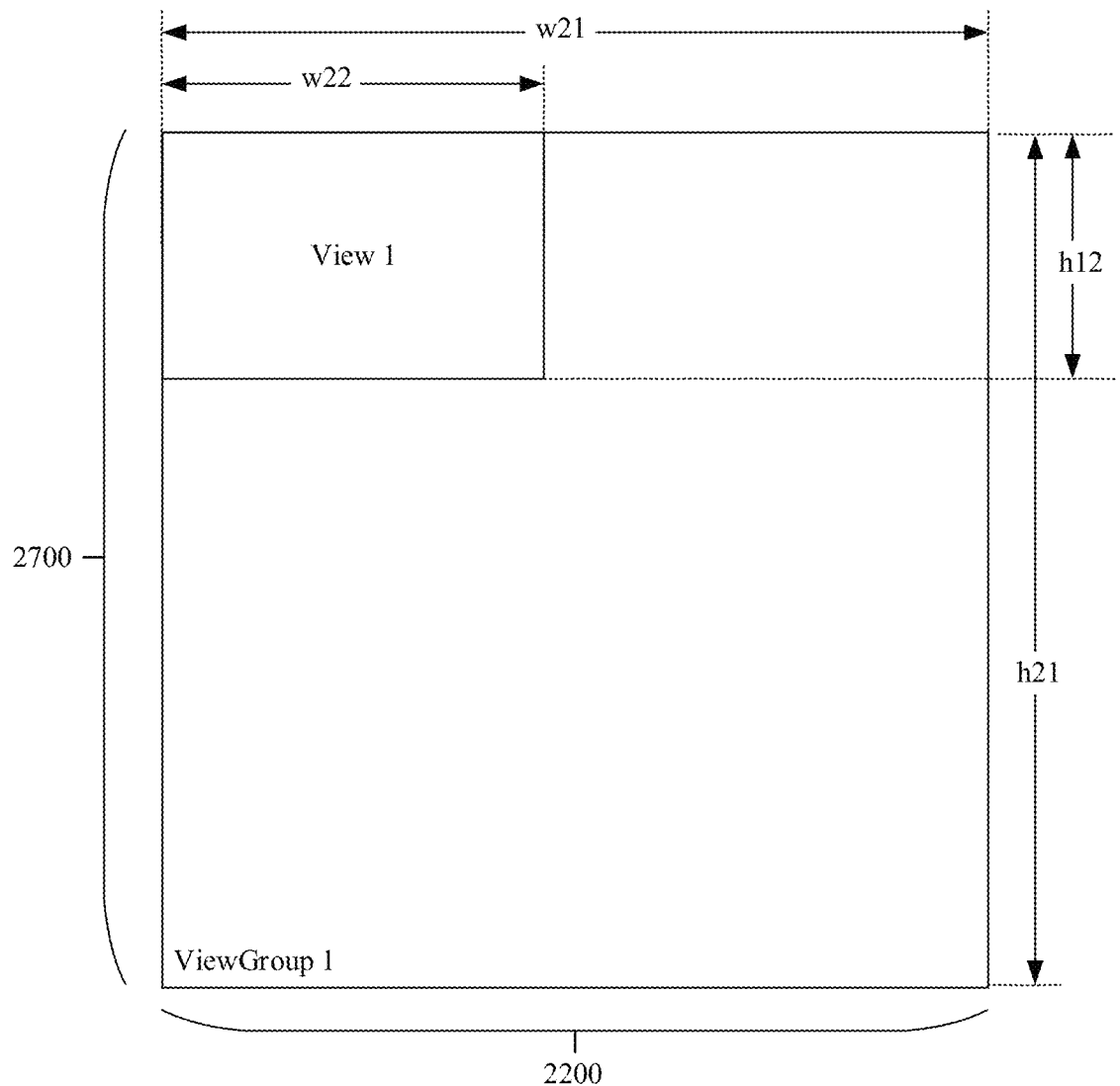
FIG. 17a is a diagram of an example of a layout phase.

FIG. 17a is a diagram of an example of a layout phase. Refer to FIG. 17a. In the layout phase, the layout system traverses to the root node ViewGroup 1. The layout system determines layout information of the ViewGroup 1 based on a measurement result of the ViewGroup 1. The layout information of the ViewGroup 1 indicates that the ViewGroup 1 is displayed in full screen on the second display window.

Still refer to FIG. 17a. For example, the layout system traverses to the View 1. The layout system lays out the View 1 based on the second display window, the measurement result of the View 1, an abnormal node policy of the View 1 in the measurement phase, and the declaration information (for the declaration information, refer to related content in FIG. 9b) of the View 1, to obtain layout information of the View 1. The layout information indicates a position of the View 1 in the parent node (namely, the ViewGroup 1, or it may be understood as being in the second display window) of the View 1. It should be noted that, for some nodes that are compressed in the measurement phase, in the layout phase, the layout system performs layout based on a measurement result obtained after remeasurement. This is not described again in the following.

As shown in FIG. 17a, position information that is of the View 1 in the ViewGroup 1 and that is obtained by the layout system includes but is not limited to the following: A top margin between an upper edge of the View 1 and an upper edge of the ViewGroup 1 is 0, a bottom margin between a lower edge of the View 1 and a lower edge of the ViewGroup 1 is (h21-h12), a left margin between a left edge of the View 1 and a left edge of the ViewGroup 1 is 0, and a right margin between a right edge of the View 1 and a right edge of the ViewGroup 1 is (w21-w22).

It should be noted that, in this embodiment, if a left or right alignment manner of a node is not specified in declaration information of the node, for example, the declaration information of the View 1 indicates that a top of the View 1 is aligned with a top of the ViewGroup 1, but does not indicate that the View 1 is left-aligned or right-aligned in the ViewGroup 1, when the layout system lays out the View 1, a left-alignment manner may be used by default, that is, the left edge of the View 1 is aligned with the left edge of the ViewGroup 1. Certainly, in another embodiment, the layout system may alternatively use a manner such as a center-alignment manner or a right-alignment manner. This is not limited in this application. Details are not described in the following again.

For example, after obtaining a layout result of the View 1, the layout system further determines whether abnormal node processing needs to be performed on the View 1 in the layout phase. For example, if the layout system detects that the View 1 is marked as a node that needs to be stretched in the measurement phase, the layout system does not need to perform abnormal node processing on the View 1 in the layout phase.

Figure 17B:
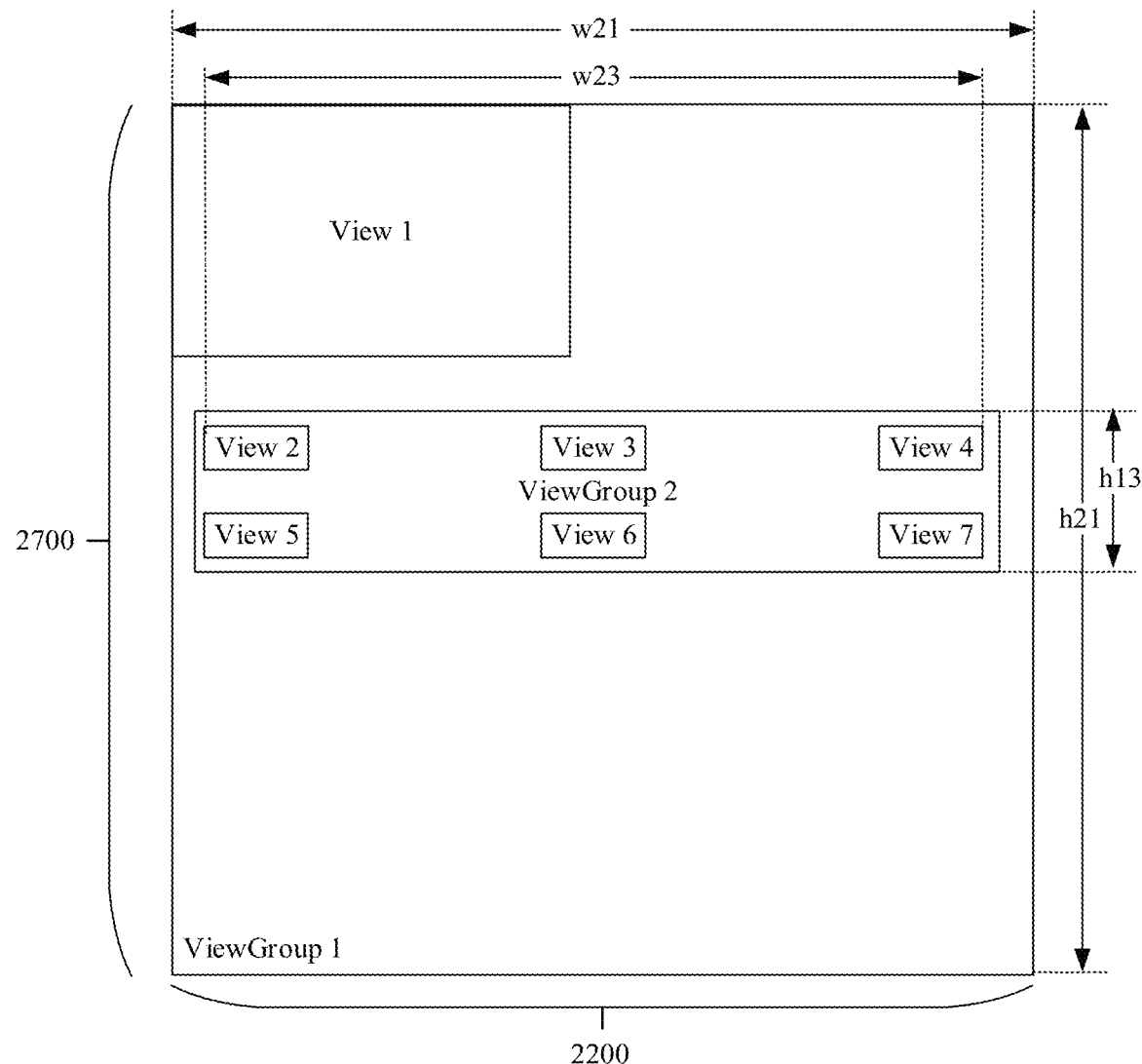
FIG. 17b is a diagram of an example of a layout phase.

FIG. 17b is a diagram of an example of a layout phase. Refer to FIG. 17b. In the layout phase, the layout system traverses to the ViewGroup 2. The layout system lays out the ViewGroup 2 based on the second display window, the measurement result of the ViewGroup 2, the abnormal node policy of the ViewGroup 2 in the measurement phase, and the declaration information of the ViewGroup 2 (for the declaration information, refer to related content in FIG. 9b), to obtain layout information of the ViewGroup 2. The layout information indicates a position of the ViewGroup 2 in the parent node (namely, the ViewGroup 1, or it may be understood as being in the second display window) of the ViewGroup 2.

As shown in FIG. 17b, position information that is of the ViewGroup 2 in the ViewGroup 1 and that is obtained by the layout system includes but is not limited to: a top margin between an upper edge of the ViewGroup 2 and an upper e edge of the ViewGroup 1, a bottom margin between a lower edge of the ViewGroup 2 and a lower edge of the ViewGroup 1, a left margin between a left edge of the ViewGroup 2 and a left edge of the ViewGroup 1, and a right margin between a right edge of the ViewGroup 2 and a right edge of the ViewGroup 1. Both the left margin and the right margin are 20 pixels (a specific value is obtained based on the declaration information of the ViewGroup 2 in FIG. 9b), and the top margin and the bottom margin may be set according to an actual requirement. This is not limited in this application.

For example, after obtaining a layout result of the ViewGroup 2, the layout system further determines whether abnormal node processing needs to be performed on the ViewGroup 2 in the layout phase. For example, the layout system detects that the ViewGroup 2 is not marked in the measurement phase, that is, no processing is performed in the measurement phase, and determines that abnormal node processing needs to be processed in the layout phase based on the process shown in FIG. 10b.

For example, refer to FIG. 10b. For example, the layout system detects that the width w23 of the ViewGroup 2 is greater than the maximum value (for example, 60% of the width of the second display window) of the preset range, and the width w23 of the ViewGroup 2 is greater than the threshold (for example, 80% of the width of the second display window), that is, the process in FIG. 10b proceeds to 1.1. The layout system further obtains a width occupied by a child node in the ViewGroup 2.

For example, the layout system traverses the View 2 to the View 7 one by one based on an order of the ViewTree, to obtain layout information of the View 2 to the View 7. For example, in this embodiment, the declaration information of the View 2 indicates that a distance between a left edge of the View 2 and a left edge of a parent node (the ViewGroup 2) is 20 pixels. Size information of each View in the View 2 to the View 7 includes but is not limited to the following: A width of the View is 50 pixels, and a height of the View is 50 pixels. In addition, as described above, the declaration information of the ViewGroup 2 indicates that the View 2 to the View 7 are evenly distributed horizontally in the ViewGroup 2. As shown in FIG. 17b, after the layout system lays out the View 2 to the View 7, it is obtained that the View 2 to the View 7 are evenly distributed horizontally in the ViewGroup 2.

For example, the layout system traverses and returns to the ViewGroup 2 node. The layout system obtains, based on a layout result of the child node in the ViewGroup 2, a width (namely, a width of the child node) occupied by the View 2 to the View 7 in the ViewGroup 2, that is, a width between a left edge of the View 2 and a right edge of the View 4 (or between a left edge of the View 5 and a right edge of the View 7) is w23.

The layout system detects whether the width (namely, w23) occupied by the View 2 to the View 7 in ViewGroup 2 is within the preset range. In this embodiment, the layout system detects that the width (namely, w23) occupied by the View 2 to the View 7 in the ViewGroup 2 is greater than the maximum value of the preset range, that is, the process in FIG. 10*b* proceeds to 1.1.2. The layout system determines that a policy corresponding to the ViewGroup 2 is that the ViewGroup and the child node thereof are not processed. In other words, when a width of the ViewGroup is close to the width of the second display window, and a width occupied by the child node in the ViewGroup also exceeds the preset range, the ViewGroup and the child node thereof do not affect aesthetics of a user interface, and therefore, abnormal node processing does not need to be performed on the ViewGroup and the child node thereof.

Figure 17C:
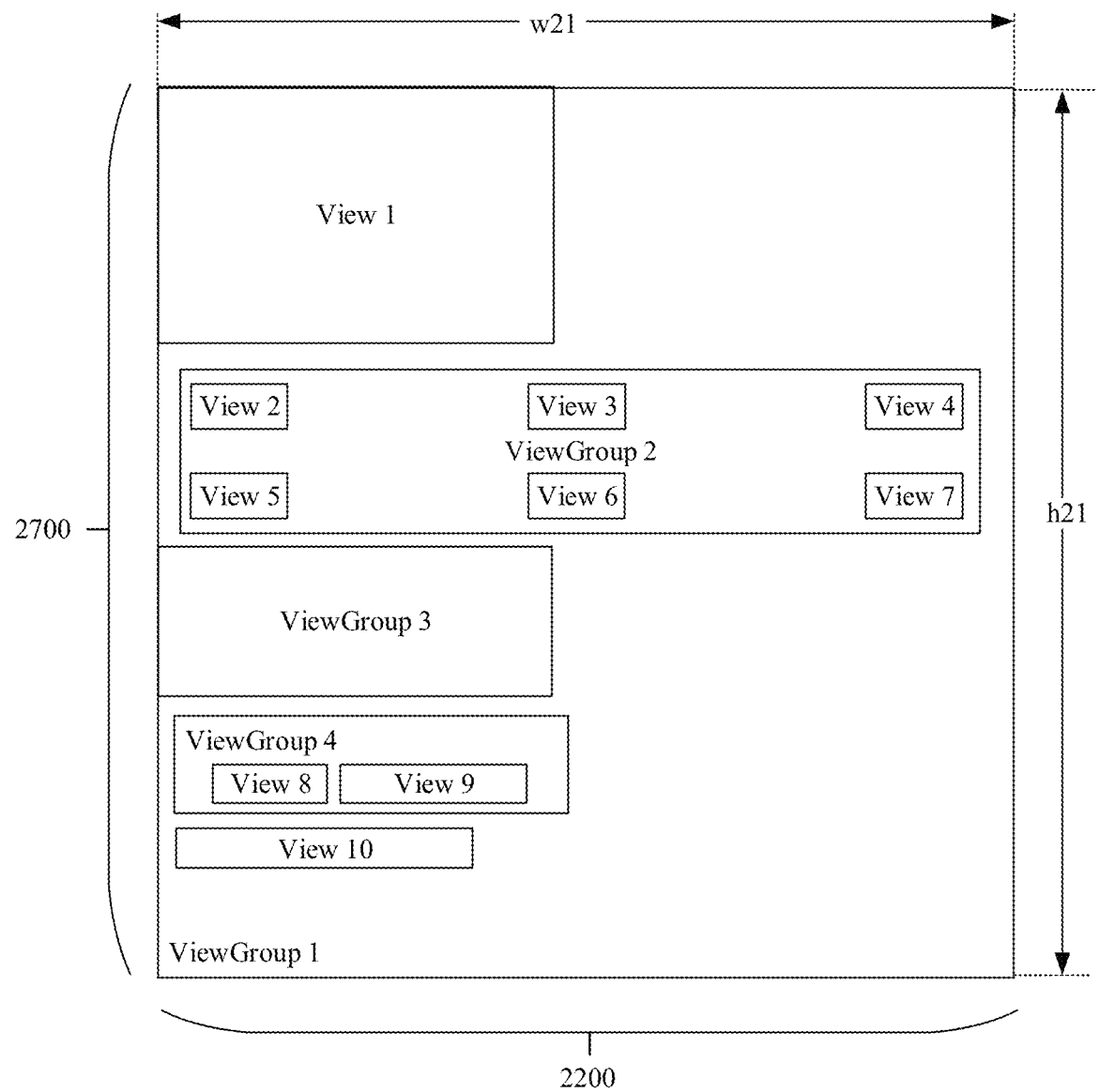
FIG. 17c is a diagram of an example of a layout phase.

FIG. 17*c* is a diagram of an example of a layout phase. Refer to FIG. 17*c*. In the layout phase, the layout system traverses to the ViewGroup 3. The layout system lays out the ViewGroup 3 based on the second display window, the measurement result of the ViewGroup 3, the abnormal node policy of the ViewGroup 3 in the measurement phase, and the declaration information of the ViewGroup 3 (for the declaration information, refer to related content in FIG. 9*b*), to obtain layout information of the ViewGroup 3. The layout information indicates a position of the ViewGroup 3 in the parent node (namely, the ViewGroup 1, or it may be understood as being in the second display window) of the View-Group 3.

As shown in FIG. 17*c*, position information that is of the ViewGroup 3 in the ViewGroup 1 and that is obtained by the layout system includes but is not limited to: a top margin, a bottom margin, and the like between the ViewGroup 3 and the ViewGroup 1. Details are not described herein again.

For example, after obtaining a layout result of the View-Group 3, the layout system further determines whether abnormal node processing needs to be performed on the ViewGroup 3 in the layout phase. For example, if the layout system detects that the ViewGroup 2 is marked as a node that needs to be stretched in the measurement phase, the layout system does not need to perform abnormal node processing on the ViewGroup 3 and the child node thereof in the layout phase.

Still refer to FIG. 17*c*. The layout system traverses to the ViewGroup 4. The layout system lays out the ViewGroup 4 based on the second display window, the measurement result of the ViewGroup 4, the abnormal node policy of the ViewGroup 4 in the measurement phase, and the declaration information of the ViewGroup 4 (for the declaration information, refer to related content in FIG. 9*b*), to obtain layout information of the ViewGroup 4. The layout information indicates a position of the ViewGroup 4 in the parent node (namely, ViewGroup 1, or it may be understood as being in the second display window) of the ViewGroup 4.

As shown in FIG. 17*c*, position information that is of the ViewGroup 4 in the ViewGroup 1 and that is obtained by the layout system includes but is not limited to: a top margin, a bottom margin, and the like between the ViewGroup 4 and the ViewGroup 1. Details are not described herein again.

For example, after obtaining a layout result of the View-Group 4, the layout system further determines whether abnormal node processing needs to be performed on the ViewGroup 4 in the layout phase. For example, if the layout system detects that the ViewGroup 4 is marked as a node that needs to be stretched in the measurement phase, the layout system does not need to perform abnormal node processing on the ViewGroup 4 in the layout phase.

For example, the layout system continues to lay out the View 8 and the View 9 in the ViewGroup 4, to obtain positions of the View 8 and the View 9 in the ViewGroup 4. If the layout system detects that the ViewGroup 4 has been marked for being stretched, the layout system does not need to perform abnormal node processing on the View 8 and the View 9 in the layout phase. After returning to the ViewGroup 4, the layout system continues to traverse another node.

For example, the layout system traverses to the View 10. Optionally, in the measurement phase, the layout system may mark the View 10 to indicate that the View 10 does not need to be processed. Optionally, the layout system may alternatively perform abnormal node determining on the View 10 in the layout phase, and determine that no other processing needs to be performed on the View 10 if a determining result is the same as a measurement result.

It should be noted that FIG. 17*c* shows only some nodes in the ViewTree, and processing manners of other nodes are not described by using examples one by one.

Figure 18A:
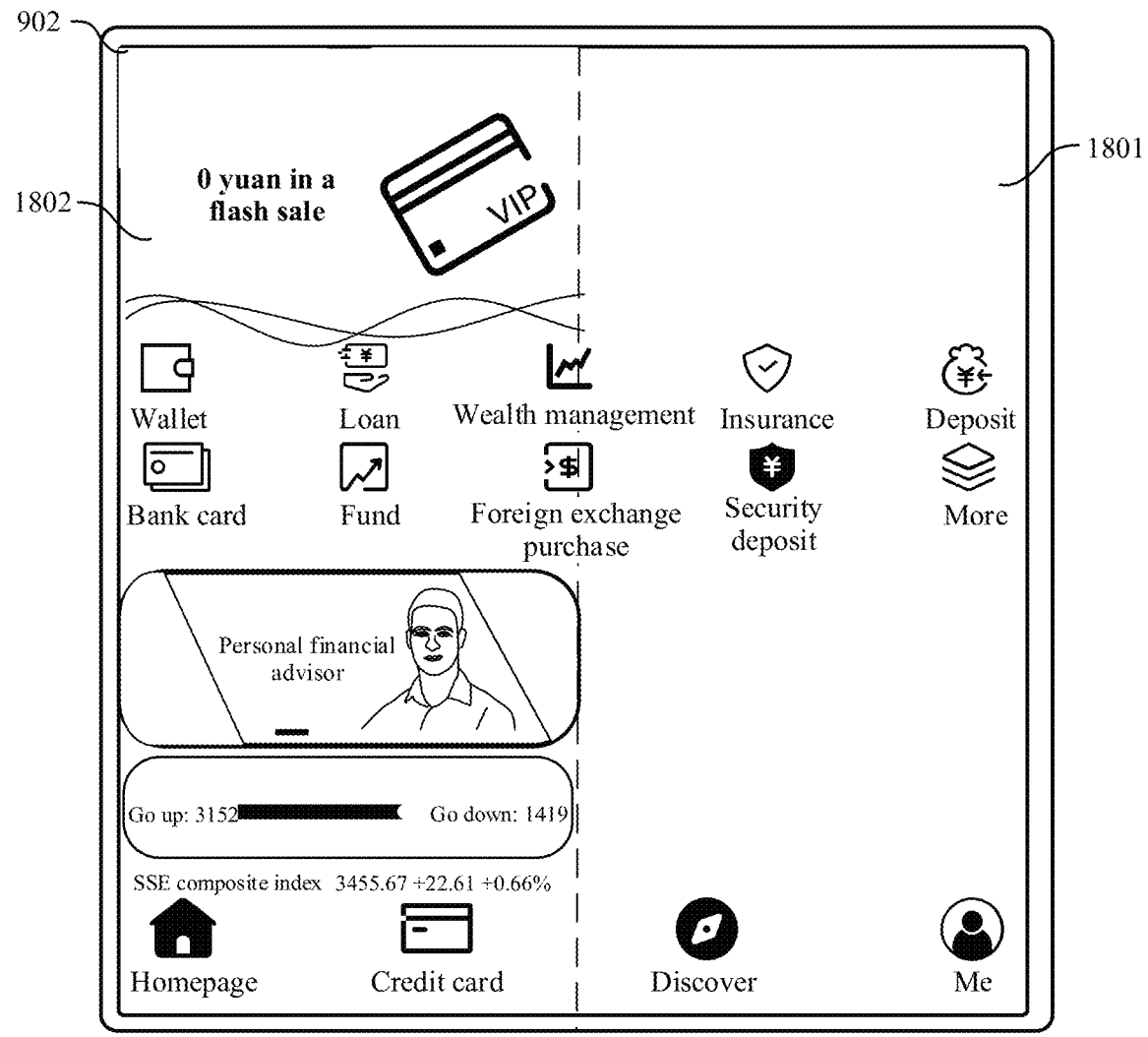
FIG. 18a is a diagram of an example of layout effect.
Figure 18B:
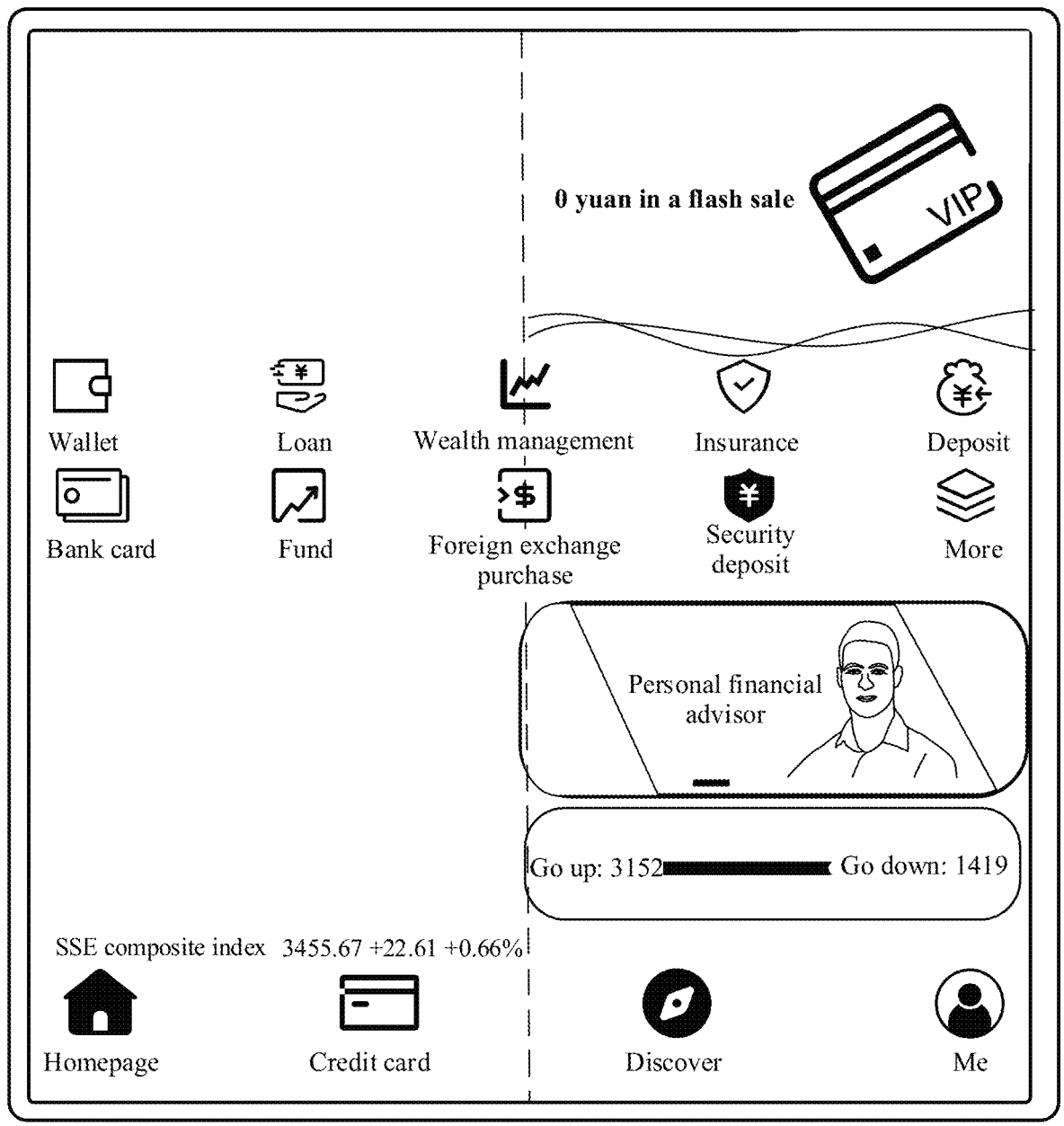
FIG. 18b is diagram of an example of an alignment manner.

FIG. 18*a* is a diagram of an example of layout effect. Refer to FIG. 18*a*. After the layout system completes layouts of nodes in the ViewTree, the layouts (including positions and sizes) of the nodes in the second display window 1801 may be obtained. A size, on the second display window 1801, of a control corresponding to each node is determined in the measurement phase and/or the layout phase, and a position, on the second display window 1801, of the control corresponding to each node is determined in the layout phase. For example, the layout system obtains, in the foregoing step, layout information of the View 1 in the View-Group 1(which may also be understood as the second display window 1801), and a position and a size, on the second display window 1801, of a control 1802 corresponding to the View 1 are the position and the size shown in FIG. 17*a*. Other controls are similar. Details are not described one by one herein. It should be noted that, as described above, when an alignment manner of the node is not declared, a left-alignment manner is used by default in this embodiment. That is, after the layout system reduces a width of a node (for example, the View 1), the node is laid out to the left in the ViewGroup 1. FIG. 18*b* shows another alignment manner as an example. As shown in FIG. 18*b*, if a default alignment manner of the layout system is a right-alignment manner, after the layout system compresses a node, a node whose alignment manner is not declared may be laid out to the right. Certainly, for a node whose alignment manner has been declared, processing is still performed based on an alignment manner in the declaration.

S805: Obtain a User Interface

For example, after traversing all nodes, the layout system returns to the ViewGroup 1. The layout system executes the draw process, that is, the layout system draws a user interface based on a layout result of each node.

As described in S604, in the draw process, the layout system traverses the nodes in the ViewTree one by one, creates a canvas for each node based on a layout result of the node, and draws content of the node on the canvas. In this embodiment, different from S604, in this embodiment, there may be a node that needs to be stretched, namely, a marked node in the foregoing description. Correspondingly, in the draw process, for a marked node, the layout system needs to stretch a canvas of the node horizontally, that is, the layout system keeps a height of the canvas of the node in a vertical direction unchanged, and stretches a horizontal width of the canvas, so that the width of the node is adapted to the width of the second display window. For example, a ratio of a width of the node after the stretching to a width of the node before the stretching is equal to the ratio of the width of the second display window to the width of the first display window. For example, if the width of the second display window is twice the width of the first display window, the layout system stretches the canvas of the node to twice the current width, and keeps the height unchanged.

To enable a person skilled in the art to better understand the canvas stretching solution in the embodiments of this application, the following provides detailed descriptions with reference to the accompanying drawings.

Figure 19:
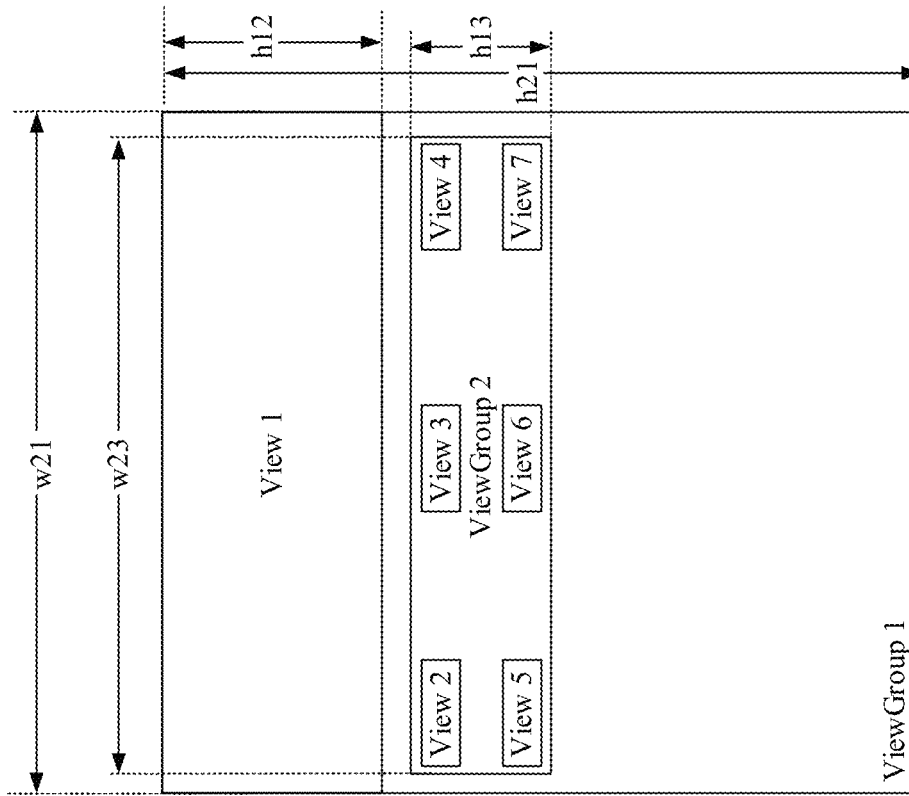
FIG. 19 is a diagram of an example of a node draw process.
Figure 19:
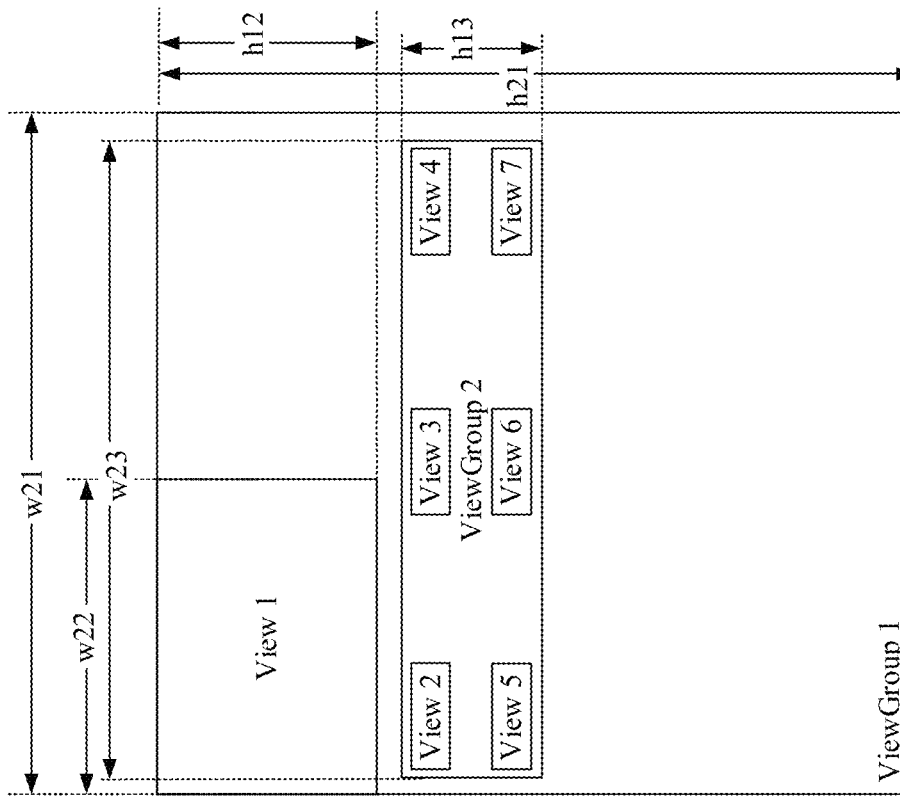

For example, the layout system executes the measurement and layout processes, and may obtain a layout (actually, a position and a size of each node in a parent node of the node) of each node in the second display window. FIG. 19 is a diagram of an example of a node draw process. Refer to (1) in FIG. 19. In a draw phase, the layout system traverses the ViewTree, and first traverses to the ViewGroup 1. As described above, after executing the measurement and layout processes, the layout system obtains that a width of the ViewGroup 1 is w21 and a height of the ViewGroup 1 is h21. The layout system creates a canvas of the ViewGroup 1. A height and a width of the canvas are h21 and w21 respectively, which are the height and width indicated by a layout result. The layout system can draw content of the ViewGroup 1 on the canvas of the ViewGroup 1.

The layout system continues to traverse the ViewTree and traverses to the View 1. Layout information that is of the View 1 and that is obtained by the layout system includes a position of the View 1 in the ViewGroup 1 and the width (w22) and the height (h12) of the View 1. In addition, the layout information is used to detect that the View 1 is marked, that is, the layout information indicates that the View 1 needs to be stretched. Correspondingly, as shown in (2) in FIG. 19, when creating a canvas of the View 1, the layout system sets a width of the canvas of the View 1 to twice the current width (w22), that is, the width of the canvas is w21. In addition, a height of the canvas of the View 1 is still h12. The layout system draws content of the View 1 on the canvas of the View 1.

Figure 20:
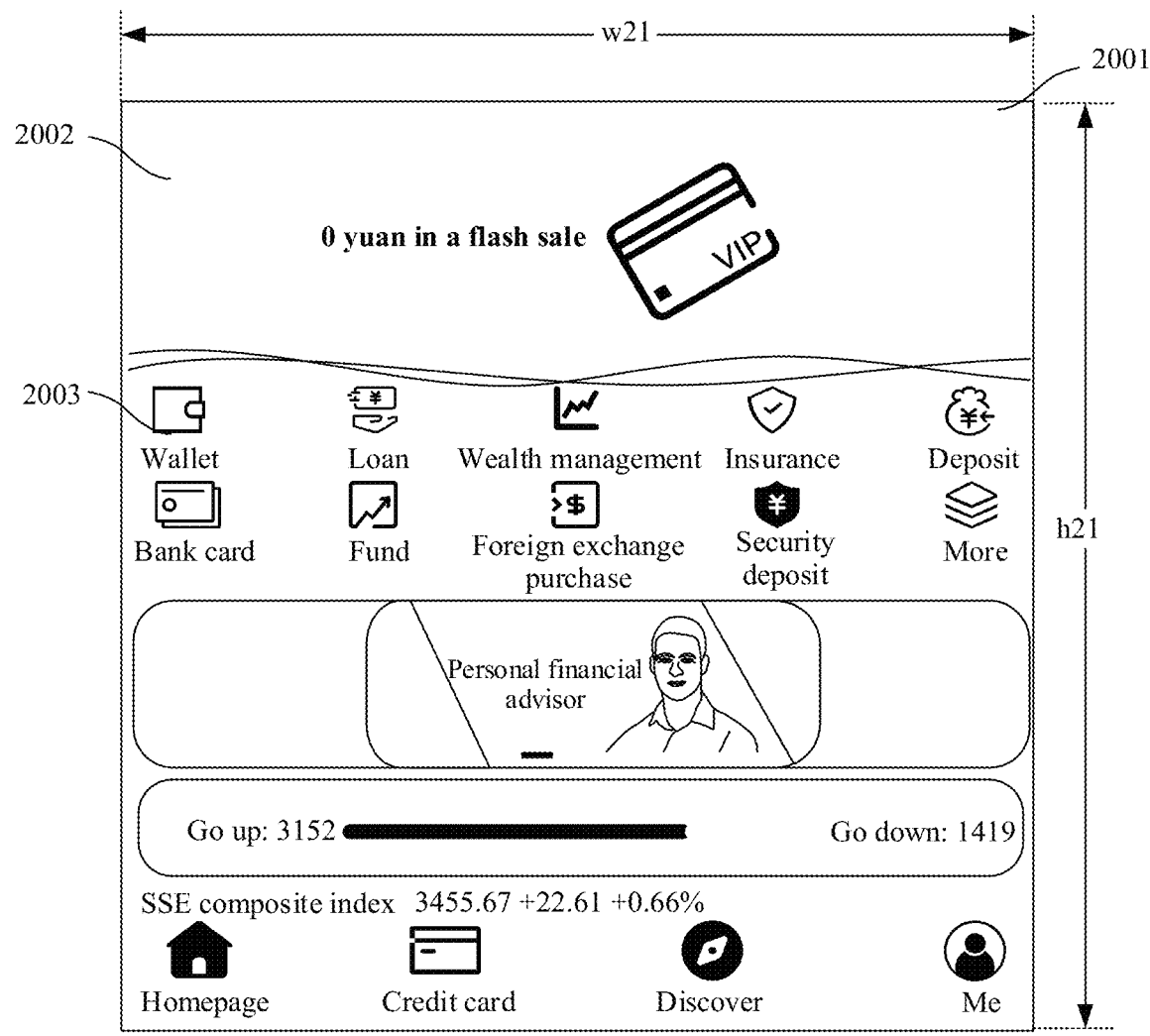
FIG. 20 is a diagram of an example of a user interface.

For example, FIG. 20 is a diagram of an example of a user interface 2001. Refer to FIG. 20. For example, after the layout system completes drawing of the View 1, a user interface of the View 1 may be obtained, which may also be referred to as a control 2002 of the View 1. It should be noted that a size of the control 2002 of the View 1 may be the same as a size of a currently displayed graph of the control 2002 of the View 1, or may be greater than a size of a current graph. In other words, after the layout system creates the canvas of the View 1, the canvas of the View 1 may be completely filled with drawing content in the View 1, and a size of the drawing content may alternatively be less than a size of the canvas of the View 1. This is not limited in this application. Details are not described in the following again.

For example, still refer to (1) in FIG. 19. The layout system traverses to the ViewGroup 2. The layout system determines, based on a layout result of the ViewGroup 2 in the layout phase, that the ViewGroup 2 does not need to be stretched, and the layout system draws a canvas of the ViewGroup 2 based on the layout result. A layout of the canvas of the ViewGroup 2 on the canvas of the ViewGroup 1 is a position and a size indicated by the layout result of the ViewGroup 2. That is, a width and a height of the canvas of the ViewGroup 2 are w23 and h13, respectively. Margins between four edges of the canvas of the ViewGroup 2 and four edges of the canvas of the ViewGroup 1 are margins indicated in the layout result.

For example, the layout system continues to traverse to the View 2. The layout system draws a canvas of the View 2 at a corresponding position of the canvas of the ViewGroup 2 based on the position and the size that are of the View 2 in the ViewGroup 2 and that are indicated in the layout result of the View 2, as shown in (2) in FIG. 19. The layout system traverses the View 3 to the View 7 in sequence, draws canvases of the View 3 to the View 7 at corresponding positions of the canvas of the ViewGroup 2, and draws content corresponding to the nodes on the canvases. For specific details, refer to the foregoing descriptions. Details are not described herein again.

Refer to FIG. 20. For example, a user interface corresponding to the ViewGroup 2 and the child node thereof is an option control 2003. It should be noted that canvas content of the ViewGroup 2 may not be displayed in the user interface. For example, the canvas content of the ViewGroup 2 may be not filled or may be filled with white. Still refer to FIG. 20. A position and a size of each control in the option control 2002 in the first user interface 2001 are obtained by the layout system from a layout result. That is, when the option control 2003 (namely, the ViewGroup 2 and the child node thereof) is measured and laid out based on the second display window, a width of the option control 2003 is adapted to the width of the second display window, and aesthetics of the user interface 2001 are not affected. Therefore, other processing such as alignment and stretching is not required.

In other words, in this embodiment, for a marked node (for example, the View 1) that needs to be stretched, the layout system stretches a canvas of the node horizontally in a draw process, so that a width of the canvas is adapted to the width of the second display window. For a node that is not marked, it may also be understood that a width of the layout result is already adaptive to the width of the second display window, or it may be understood that a layout result of a node that is laid out based on the second display window does not affect aesthetics of the user interface, and the layout system may directly draw a canvas based on the layout result.

Still refer to FIG. 20. After the layout system traverses the ViewTree, the user interface 2001 may be obtained. For example, a size (which may also be understood as a canvas size corresponding to the root node ViewGroup 1) of the user interface 2001 is the same as a size of the second display window (namely, the actual display window). For example, resolution of both the user interface 2001 and the second display window is 2700*2200. For processing of other nodes, refer to processing of the View 1 or the ViewGroup 2. Details are not described herein again.

It should be noted that, as described above, in this embodiment, processing is performed in a left-alignment manner by default. Therefore, in the layout result, as shown in FIG. 17c, some nodes are disposed on the left. Correspondingly, in the draw process, the layout system stretches a canvas to a right edge of the canvas for a node that needs to be stretched. In other embodiments, stretching directions of the nodes vary with alignment manners of the nodes. For example, as shown in FIG. 18b, a node is right-aligned by default. In this case, when the layout system stretches a canvas, a right edge of the node remains unchanged in position, and a left edge of the canvas of the node is stretched to the left.

It should be further noted that, in the description of this embodiment, for a node that needs to be stretched, after stretching a canvas of the node, the layout system draws control content on the stretched canvas. Correspondingly, the control content is actually stretched along with the canvas. In another embodiment, the layout system may alternatively first create a canvas based on the layout result, draw control content, and then synchronously stretch the canvas and the control content of the canvas. A specific implementation may be set according to an actual requirement. This is not limited in this application.

Optionally, in this embodiment, the layout system may stretch a canvas by using a Canvas.scale method. For example, in the examples of this application, an example in which each display window, a canvas, and an upper left corner of a screen are used as an origin of coordinates, a horizontal direction is a horizontal axis, and a vertical direction is a vertical axis is used. The layout system uses the Canvas.scale method to enlarge a canvas of each View twice in the horizontal-axis direction and keep the canvas of each View unchanged in the vertical-axis direction (that is, the top margin, bottom margin, and height described above remain unchanged), to obtain a stretched user interface.

In a possible implementation, for a control (for example, a control 2002 corresponding to the View 1) corresponding to a large media node (for example, a large image node), as described above, the layout system stretches the control in a draw process. In one example, for a pure-color large picture type control, the control may be kept in the current stretching state. That is, for a pure-color picture (which may alternatively be a picture of a gradient color of course), after the picture is stretched, a blur degree of the picture is small, which is within an acceptable range. Therefore, a state after the picture is stretched may be maintained.

In another example, for a non-pure-color large picture type control, for example, the control 2002 corresponding to the View 1 and/or a control corresponding to the ViewGroup 3, the layout system may keep a width (namely, still a width after the stretching) of a node (namely, a canvas) unchanged, restore control content, namely, a picture, and fill other parts of the canvas other than the picture content. The filling manner in this embodiment may include a Gaussian blur filling manner, a background color filling manner, and the like.

Figure 21A:
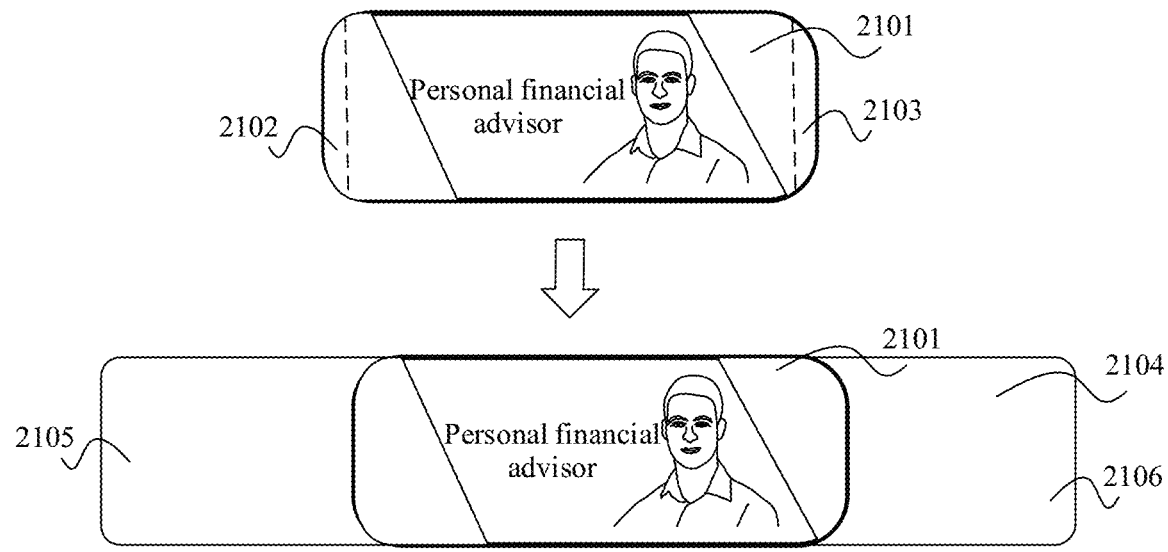
FIG. 21a to FIG. 21c are diagrams of examples of picture filling.

For example, refer to FIG. 21a. The layout system performs picture recognition on a large picture control 2101, and may recognize that a left edge area 2102 of the large picture control 2101 is filled with a pure color (or may be a gradient color), and a right edge area 2103 is also filled with a pure color. Filling colors of left and right edges may be the same, or may be different. This is not limited in this application. For example, the layout system restores the large picture control 2101 to a size (for example, the width is w12) before the stretching. It should be noted that, this step may be understood as restoring and centering picture content in a View, and keeping a width of a canvas of the View after the stretching. As shown in FIG. 21a, after restoring and centering the large picture control 2101 (specifically, the picture content), the layout system may fill an area 2105 between a left edge of the restored large picture control 2101 and a left ledge of a canvas 2104 corresponding to a View to which the control belongs. The filled content is the same as content (which may be a pattern, a color, a gradient color, or the like) of the left edge area 2102 of the large picture control 2101. This is not limited in this application. Correspondingly, the layout system fills an area 2106 between a right edge of the restored large picture control 2101 and a right edge of the canvas 2104 corresponding to a node to which the control belongs. The filled content is the same as content (which may be a pattern, a color, a gradient color, or the like) of the right edge area 2103 of the large picture control 2101. This is not limited in this application.

Figure 21B:
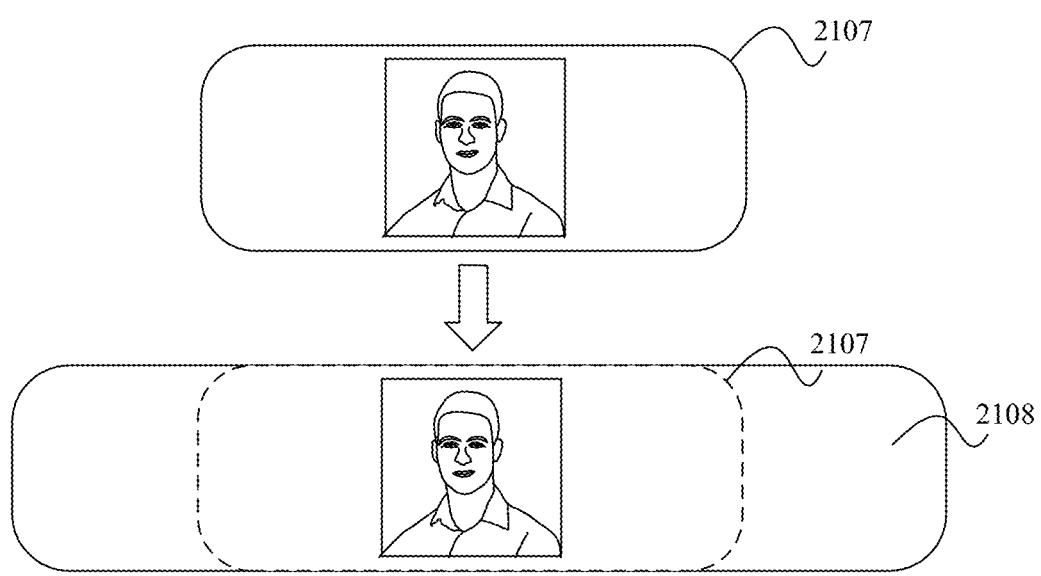

For another example, refer to FIG. 21b. The layout system performs picture recognition on the large picture control 2107, and may recognize that a background color of the large picture control 2107 is a pure color (or may be a gradient color or the like). The layout system may restore and center image content of the large image control 2107, and the layout system fills an area, on the canvas 2108 corresponding to a node to which the large image control 2107 belongs, other than the restored large image control 2107. The filled content is a background color of the large image control 2107.

Figure 21C:
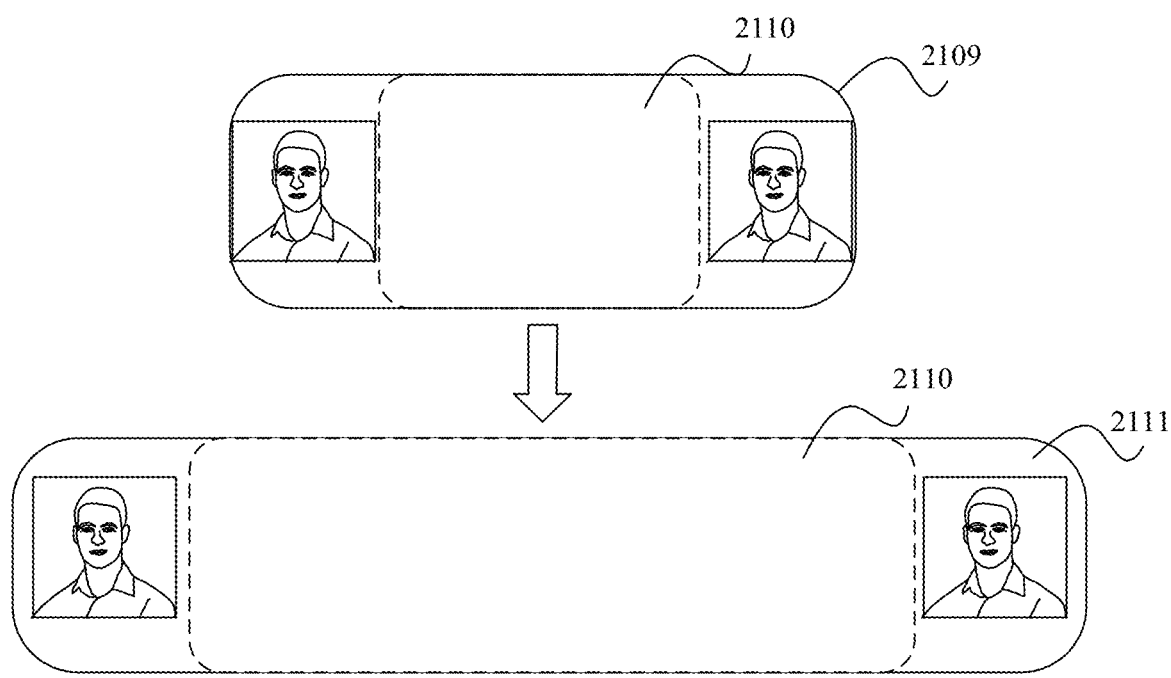

For another example, refer to FIG. 21c. The layout system identifies a large picture control 2109, and may identify that a middle area 2110 of the large picture control 2109 is a similar pattern, filling color, or the like, and two sides of the large picture control 2109 are character images (or may be other images, which is not limited in this application). In a process of stretching the large picture control 2109, the layout system may stretch the middle area 2110 of the large picture control 2109, and keep a character image area 2111 unchanged.

Optionally, for a picture that does not meet any of the foregoing processing conditions, for example, a middle area of the picture is not similar, an edge area is filled with a non-pure color (or a gradient color), and a background color is a complex background color (that is, a non-pure color or a gradient color is filled), the layout system may restore and center picture content in the picture control, and perform Gaussian blur filling on a part other than picture content on the canvas. A Gaussian-blurred graph may be an edge area based on picture content, or may be the entire picture content, or may be a graph based on any area in the picture. This is not limited in this application.

In this embodiment, because the canvas of the node is stretched horizontally, some controls may be deformed. The layout system may classify the stretched nodes, and restore a canvas corresponding to a node of a type to be restored (a restoration type for short). Optionally, the layout system may use a Canvas.scale method to zoom out the canvas of the node of the restoration type in the horizontal-axis direction, and keep the canvas unchanged in the vertical-axis direction (that is, the top margin, the bottom margin, and the height remain unchanged). For example, a size of the canvas after the zoom-out is the size before the stretching. It may also be understood that the layout system reduces the width of the canvas of the node to a half of the current width. Certainly, the width of the canvas of the node may alternatively be another proportion, which depends on the ratio of the width of the second display window to the width of the first display window.

For example, in this embodiment, a node that needs to be restored includes but is not limited to: a text type node and a small media type node.

Optionally, as described above, the text type node is a node whose type information is "TextView" in declaration information, and may also be referred to as a text type control. For a stretched text type control, the layout system restores a width of a canvas of the control to a width before the stretching, and keeps a top margin, a bottom margin (for a concept, refer to the foregoing descriptions. Details are not described herein again), and height unchanged.

Optionally, a small media type (which may also be referred to as a small media control type), for example, may include a control of a small picture type and a control of a small video type. A small picture type is used as an example (a small video type is similar. Details are not described herein). A node of the small picture type is optionally a picture whose width is less than or equal to the threshold (for example, 80% of the width of the second display window). In other words, in this embodiment, for a node of the large picture type, the layout system may compress and stretch the node, and in a stretching process, the layout system processes the node of the large picture type in a filling manner. To be specific, a size of the node of the large picture type remains unchanged, and picture content on the node is restored and filled. For a node of the small picture type, if the layout system stretches the node of the small picture type, then the layout system may restore the node of the small picture type in a stretched area (for a concept, refer to the description in the following embodiments), to avoid abnormal stretching of a picture in the node of the small picture type while changing a position of the node of the small picture type on the second display window.

The following uses a restoration process of a node of the small image type as an example for description. FIG. 22a(1) to FIG. 22a(3) are a diagram of an example of a node restoration process. Refer to FIG. 22a(1). For example, an example in which a width w27 that is of the ViewGroup 2 and that is obtained by the layout system is within a preset range (a height is h27) is used for description. In other words, the layout system determines, based on the preset rule in FIG. 10a, that a policy of the ViewGroup 2 is that the ViewGroup and the child node thereof are stretched. The layout system marks the ViewGroup and the child node thereof to indicate stretching in a draw process.

It should be noted that a node of a restoration type in this embodiment is used as an example. In another embodiment, a node of a to-be-restored type and a determining condition may be set according to an actual requirement. This is not limited in this application.

For example, after the layout system lays out the ViewGroup 2 and the child node thereof, for an obtained layout result, refer to FIG. 22a(1). For example, the ViewGroup 2 is left-aligned with the ViewGroup 1, a height of the ViewGroup 2 is h27, a width of the ViewGroup 2 is w27, and a top margin, a bottom margin, a left margin, and a right margin between the ViewGroup 2 and the ViewGroup 1 may be obtained.

For example, as shown in FIG. 22a(2), in the draw process, the layout system traverses to the ViewGroup 2, and the layout system stretches a canvas of the ViewGroup 2 based on a mark of the ViewGroup 2. A width of the ViewGroup 2 after the stretching is twice the width of ViewGroup 2 before the stretching. For example, the width of the ViewGroup 2 after the stretching is equal to the width w21 of the canvas of the ViewGroup 1.

For example, the layout system identifies the ViewGroup 2, to identify whether the ViewGroup 2 is a node of a restoration type. Based on the type of the ViewGroup 2, the layout system determines that the ViewGroup 2 is not a node of a to-be-restored type. In this case, the ViewGroup 2 does not need to be restored.

For example, the layout system traverses to the View 2. The layout system stretches a canvas of the View 2. A width of the canvas after the stretching is twice the width of the canvas before the stretching, for example, the width is w28.

It should be noted that, as described above, a height of a canvas of each node remains unchanged. Details are not described in the following again.

For example, the layout system identifies the View 2, to identify whether the View 2 is a node of a restoration type. The layout system determines the View 2 as a picture type node based on the type of the View 2. The layout system further detects a width of the View 2 after the stretching, and detects that the width of the View 2 is less than a threshold. In this case, it can be determined that the View 2 is a node of a small picture type, namely, a node of a restoration type. The layout system restores the View 2.

As shown in FIG. 22a(3), the layout system restores the width of the View 2 to the width before the stretching, and the width w29 obtained after the restoration is a half of the width w28 before the restoration.

It should be noted that, in this embodiment, in a restoration process, an alignment manner of each node after the restoration is a left-alignment manner by default. For example, refer to (1) in FIG. 22b. A state of the View 2, namely, a "Wallet" icon control 2201 after the stretching is shown as an example. A width of the "Wallet" icon control 2201 is w28 (for a height, refer to the foregoing description. Details are not described in this example). Refer to (2) in FIG. 22b. An area 2202 is a stretched area, and a position and a size of the stretched area are the same as a position and a size of the View 2 after the stretching. It should be noted that in (2) in FIG. 11b, a canvas of the View 2 blocks a part of the area 2202, that is, the View 2 is included in the area 2202. It may be understood that the stretched area is an area occupied by the View 2 after the stretching. In this embodiment, after the layout system restores the canvas of the View 2, an alignment manner of the View 2 is a left-alignment manner by default. That is, as shown in (2) in FIG. 22b, after the canvas of the View 2, namely, the "Wallet" icon control 2001, is restored to a size before the stretching, a position of the canvas is shifted to the left side of the area 2202, that is, a left edge of the View 2 is aligned with a left edge of the area 2202, an upper edge of the View 2 is aligned with an upper edge of the area 2202, and a lower edge of the View 2 is aligned with a lower edge of the area 2202.

In a possible implementation, for a node whose policy is a type of restoration (which is referred to as a restoration type for short in this embodiment), in a restoration process, the layout system may align the node based on an alignment manner, before the node is stretched, of the node in a parent node. The alignment manner includes the left-alignment manner described above, and further includes a center-alignment manner, a right-alignment manner, and the like. It should be noted that the layout system may obtain, in a layout process, an alignment manner of each node in the parent node.

Figure 22B:
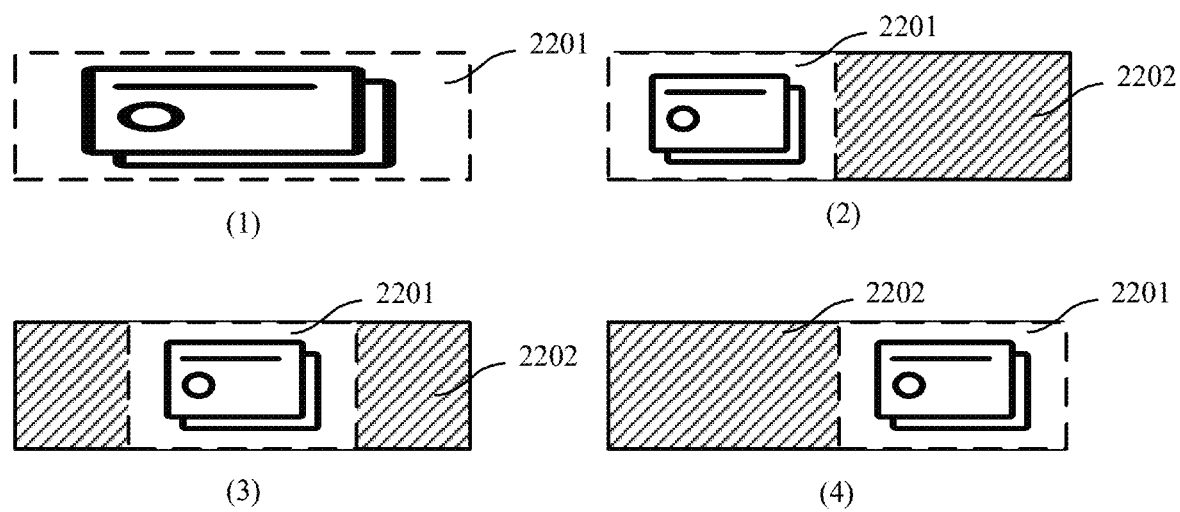
FIG. 22b is a diagram of an example of a node restoration process.

For the center-alignment manner, refer to (3) in FIG. 22b. For example, after the layout system restores the View 2, a position of the View 2 is shifted to the middle of the area 2202. To be specific, a central point of the View 2 overlaps a central point of the area 2202, the upper edge is aligned with the upper edge of the area 2202, and the lower edge is aligned with the lower edge of the area 1101.

For the right-alignment manner, refer to (4) in FIG. 22b. For example, after the layout system restores the View 2, a position of the View 2 is shifted to a right side of the area 2202. To be specific, the right edge of the View 2 is aligned with the right edge of the area 2202, the upper edge is aligned with the upper edge of the area 2202, and the lower edge is aligned with the lower edge of the area 2202.

An alignment manner of nodes of each restoration type may be a default alignment manner, for example, a left-alignment manner by default. In this embodiment, as described above, for an alignment manner of the nodes, refer to the alignment manner in the layout process.

It should be noted that, for some controls whose alignment manners are not defined in the declaration, any alignment manner such as the left-alignment manner, the center-alignment manner, and the right-alignment manner may be used. This is not limited in this application.

Optionally, the layout system may align the canvas corresponding to the node by using a Canvas.translate method.

Figure 23A:
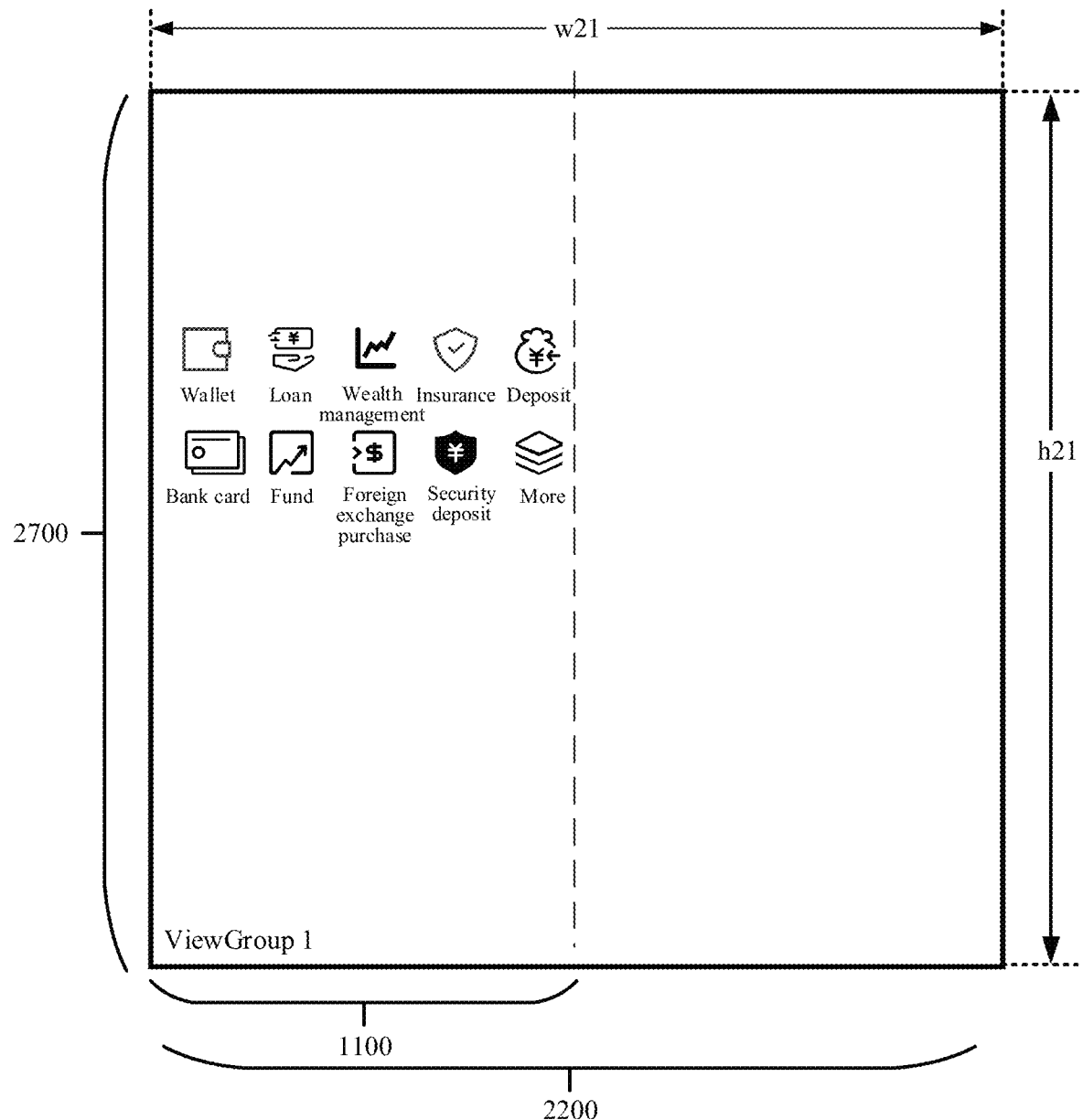
FIG. 23a to FIG. 23c are diagrams of examples of node processing effect.
Figure 23B:
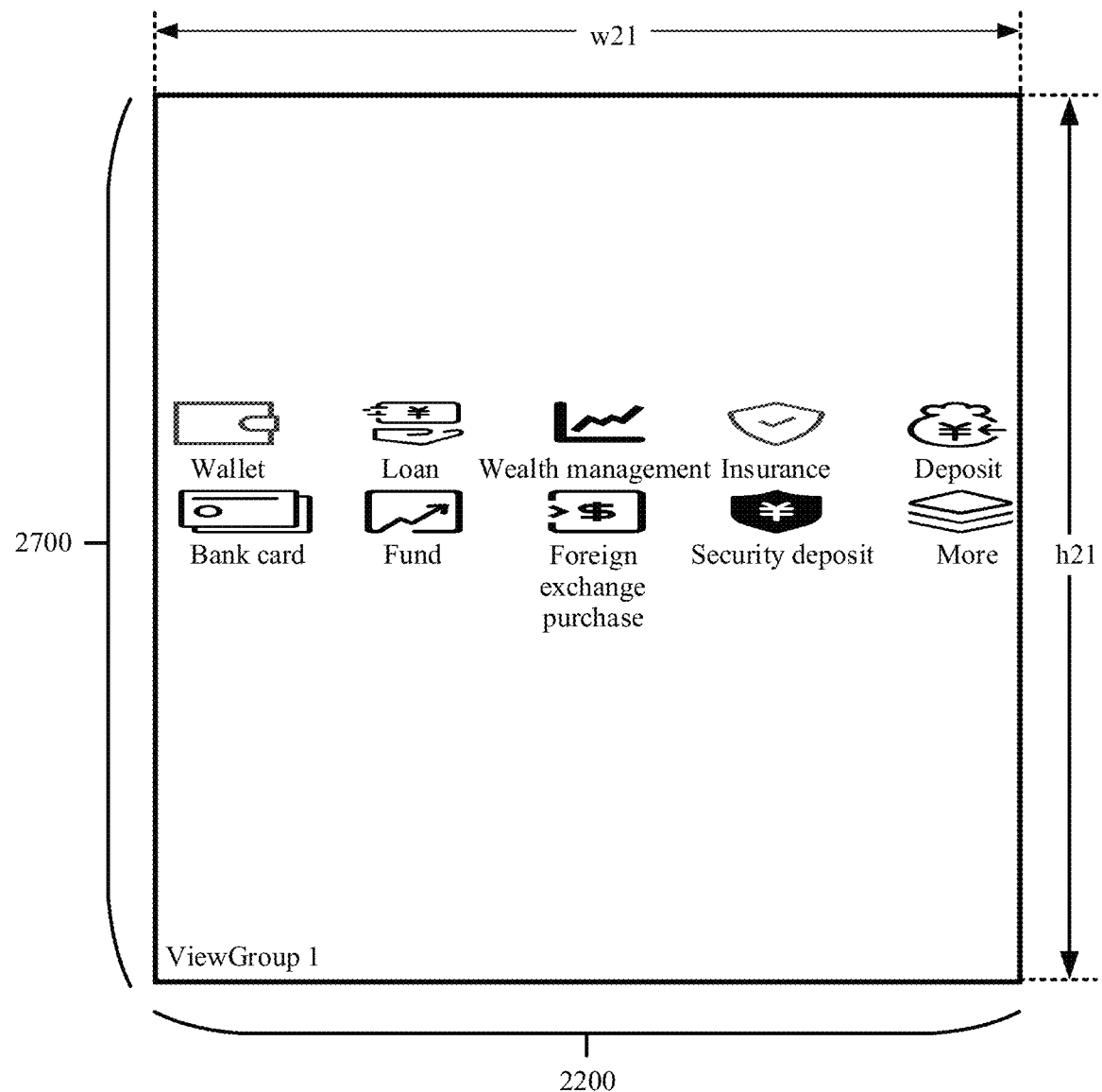
Figure 23C:
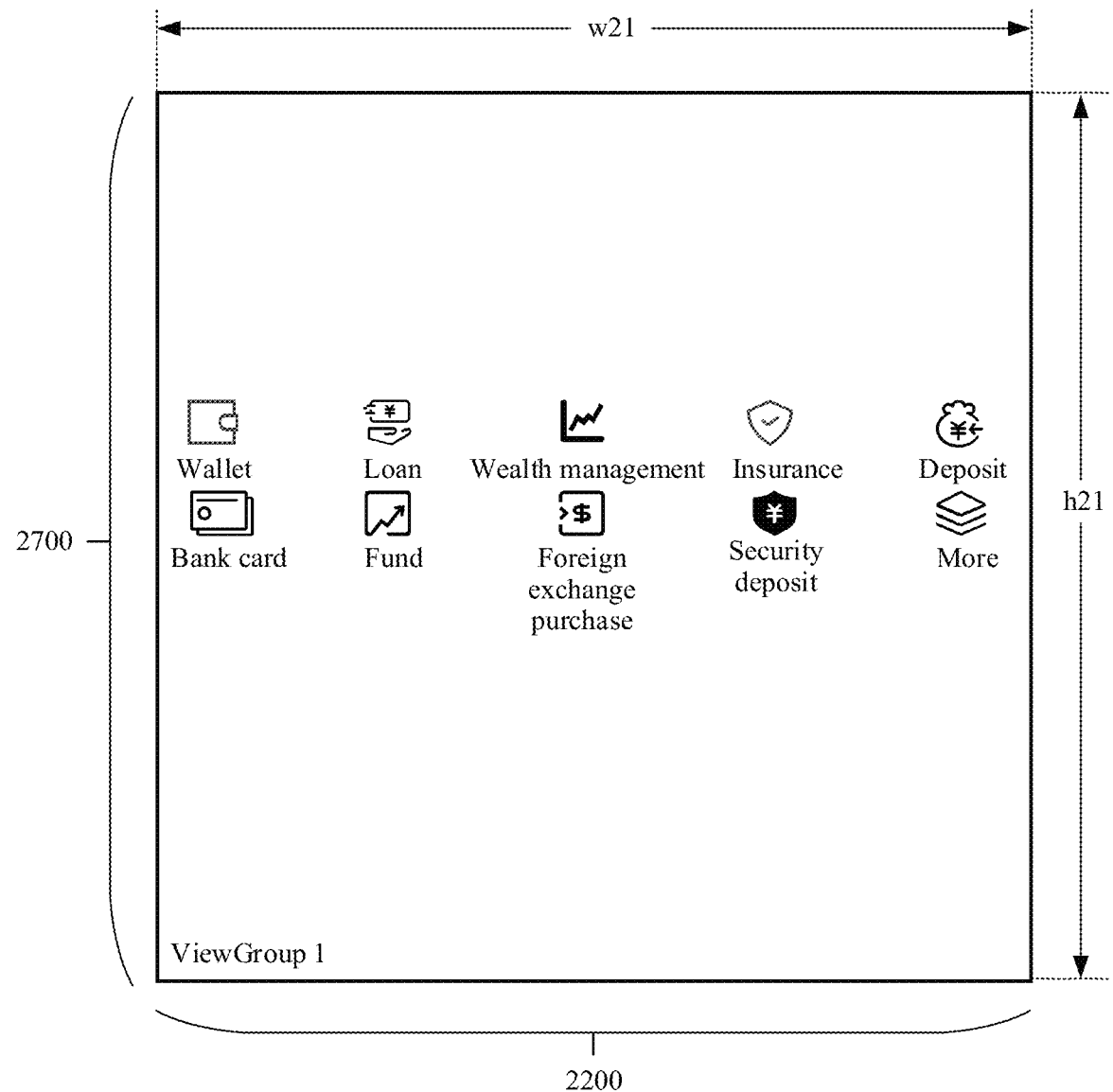

For example, the layout system continues to traverse child nodes (including the View 3 to the View 7) of the View-Group 2. A specific processing process is the same as that of the View 2. Details are not described herein again. For example, FIG. 23a to FIG. 23c are diagrams of examples of node processing effect. Refer to FIG. 23a. For example, as described above, after the layout system obtains the layout result of the ViewGroup 2 and the child node thereof, a width occupied by corresponding controls is within a preset range, for example, at a left position in the second display window (namely, the ViewGroup 1). If the layout system generates a user interface based on the layout result, aesthetics of the user interface are affected. Correspondingly, the layout system performs canvas stretching on the ViewGroup 2 and child node thereof, and control effect after the stretching is shown in FIG. 23b. Refer to FIG. 23b. For example, after each node is stretched, control content is correspondingly stretched. This may cause distortion of picture content of a control of a small picture type. As shown in FIG. 23c, the layout system restores the View 2 to the View 7, namely controls of the small picture type, so that when a width occupied by the controls is adapted to the width of the second display window, control content distortion is avoided, and aesthetics of the user interface is further improved.

It should be noted that, in this embodiment, in the draw process, after drawing the canvas of the node, the layout system may first determine whether the canvas needs to be restored, and draw control content on the canvas after restoring the canvas. Optionally, the layout system may alternatively draw control content on the canvas after drawing the canvas of the node. Then, the layout system restores the canvas and the control content of the canvas. A specific manner may be set according to an actual requirement. This is not limited in this application.

It should be further noted that, in this embodiment, only an example of drawing and restoring a canvas of the ViewGroup 2 and the child node thereof is used for description. In a draw phase, the layout system executes a process of determining whether each node in the ViewTree needs to be restored. For example, for the View 10, because the View 10 is not stretched, the layout system may not need to perform a restoration determining process on the View 10. For another example, for the View 8, if the layout system detects that the View 8 is of a text type and a width of the View 8 is less than the preset range, it is determined that the View 8 does not need to be restored.

Figure 24:
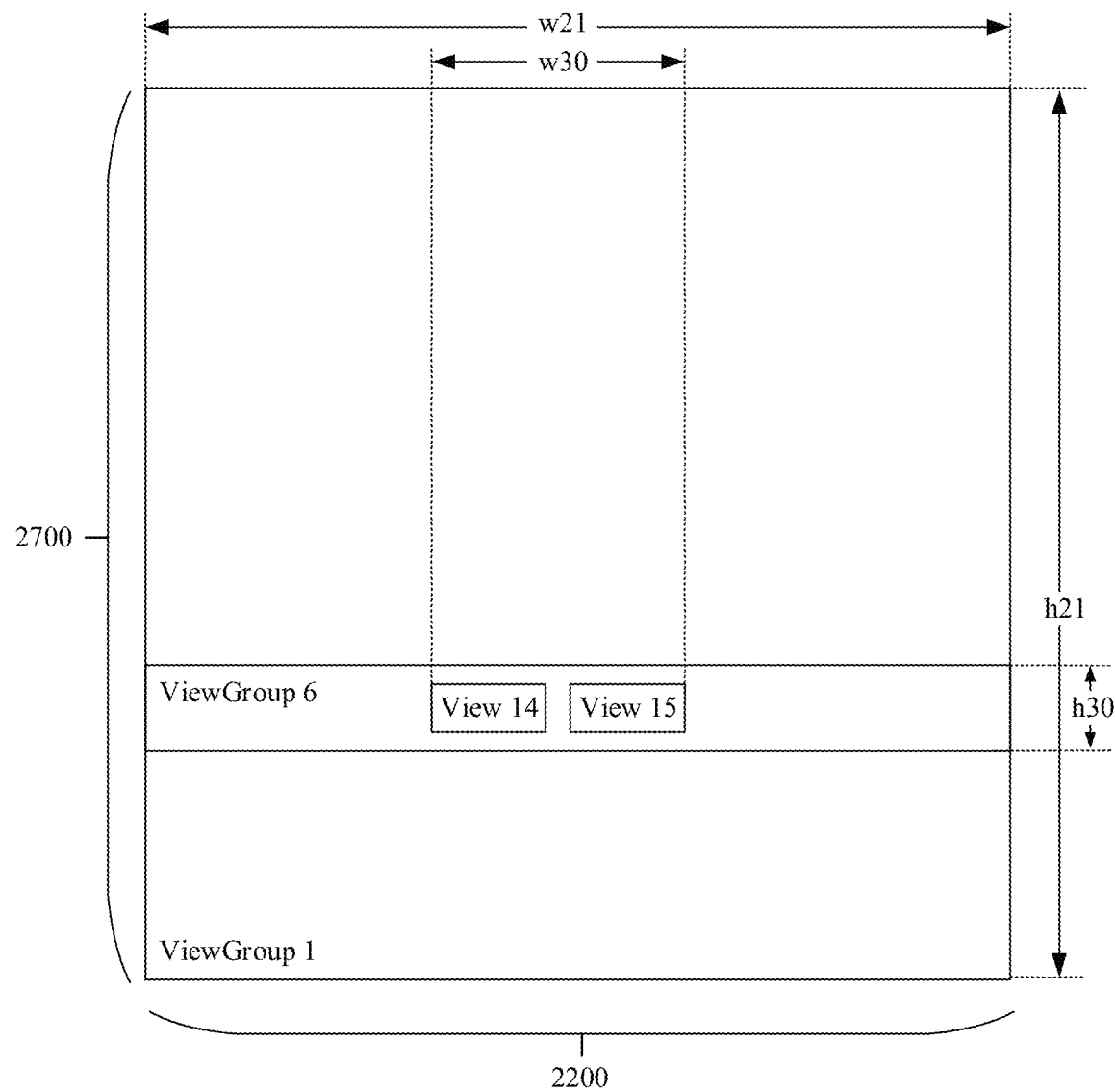
FIG. 24 is a diagram of an example of node processing.

The following describes, by using an example, a preset rule that is not described above in FIG. 10a and FIG. 10b. FIG. 24 is a diagram of an example of node processing. Refer to FIG. 24. For example, after measuring a View-Group 6 based on the second display window, the layout system obtains that a width of the ViewGroup 6 on the second display window is w21 and a height of the View-Group 6 on the second display window is h30. For example, if the layout system detects that the width and the height of the ViewGroup 6 are non-fixed values, the step in FIG. 10a proceeds to 1.2, and the layout system determines that a policy is no processing.

In a layout phase, the layout system traverses to the ViewGroup 6. For example, the layout system detects that the width w21 of the ViewGroup 6 is greater than the maximum value of the preset range and is greater than the threshold (for example, 80% of the width of the second display window). The step in FIG. 10b proceeds to 1.1. The layout system continues to traverse a View 14 and a View 15 to obtain corresponding layout information. The layout system returns to the ViewGroup 6 node, and determines a width of a child node based on a layout result of the View 14 and the View 15, that is, a width between a left edge of the View 14 and a right edge of the View 15 is w30. The layout system detects that the width w30 of the child node is less than the minimum value of the preset range, that is, the width is not within the preset range. According to 1.1.2 in FIG. 10b, the layout system determines that a policy corresponding to the ViewGroup 6 and the child node thereof is no processing. In other words, in a draw process, the layout system may directly draw based on the layout result, to obtain a user interface of the ViewGroup 6 and the child node thereof.

Figure 25:
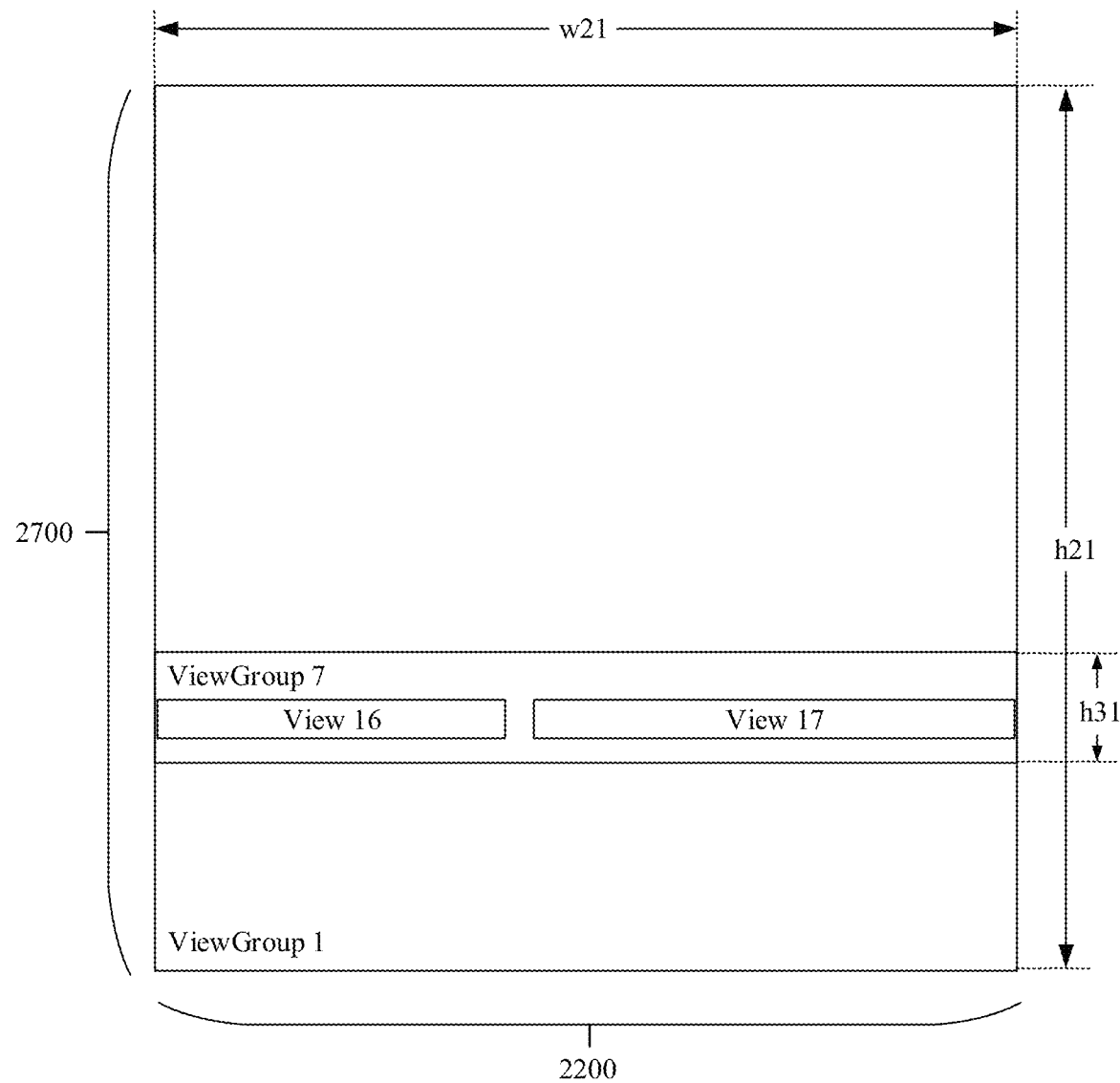
FIG. 25 is a diagram of an example of node processing.

In another example, FIG. 25 is a diagram of an example of node processing. Refer to FIG. 25. For example, after measuring a ViewGroup 7 based on the second display window, the layout system obtains that a width of the ViewGroup 7 on the second display window is w21 and a height of the ViewGroup 7 on the second display window is h31. For example, the layout system detects that the width and the height of the ViewGroup 7 are non-fixed values, the step in FIG. 10a proceeds to 1.2, and the layout system determines that a policy is no processing.

In a layout phase, the layout system traverses to the ViewGroup 7. For example, the layout system detects that the width w21 of the ViewGroup 7 is greater than the maximum value of the preset range and is greater than the threshold (for example, 80% of the width of the second display window). The step in FIG. 10b proceeds to 1.1. The layout system continues to traverse the View 16 and the View 17, to obtain corresponding layout information. The layout system returns to the ViewGroup 7 node, and determines a width of a child node based on a layout result of a View 16 and a View 17, that is, a width between a left edge of the View 16 and a right edge of the View 17 is w21. The layout system detects that the width w21 of the child node is greater than the maximum value of the preset range, that is, the width w21 is not within the preset range. According to 1.1.2 in FIG. 10b, the layout system determines that a policy corresponding to the ViewGroup 7 and the child node thereof is no processing. In other words, in a draw process, the layout system may directly draw based on the layout result, to obtain a user interface of the ViewGroup 7 and the child node thereof. Optionally, in another embodiment, if widths of the View 16 and the View 17 are less than the minimum value of the preset range, the policy is also no processing. It should be noted that, in this example, the ViewGroup includes two or more nodes. In another embodiment, the ViewGroup may alternatively include one child node, and a processing step of the child node is the same as that of a plurality of child nodes, that is, if a width of the child node is within the preset range, stretching is performed. If the width of the child node is not within the preset range, no processing is performed.

Figure 26:
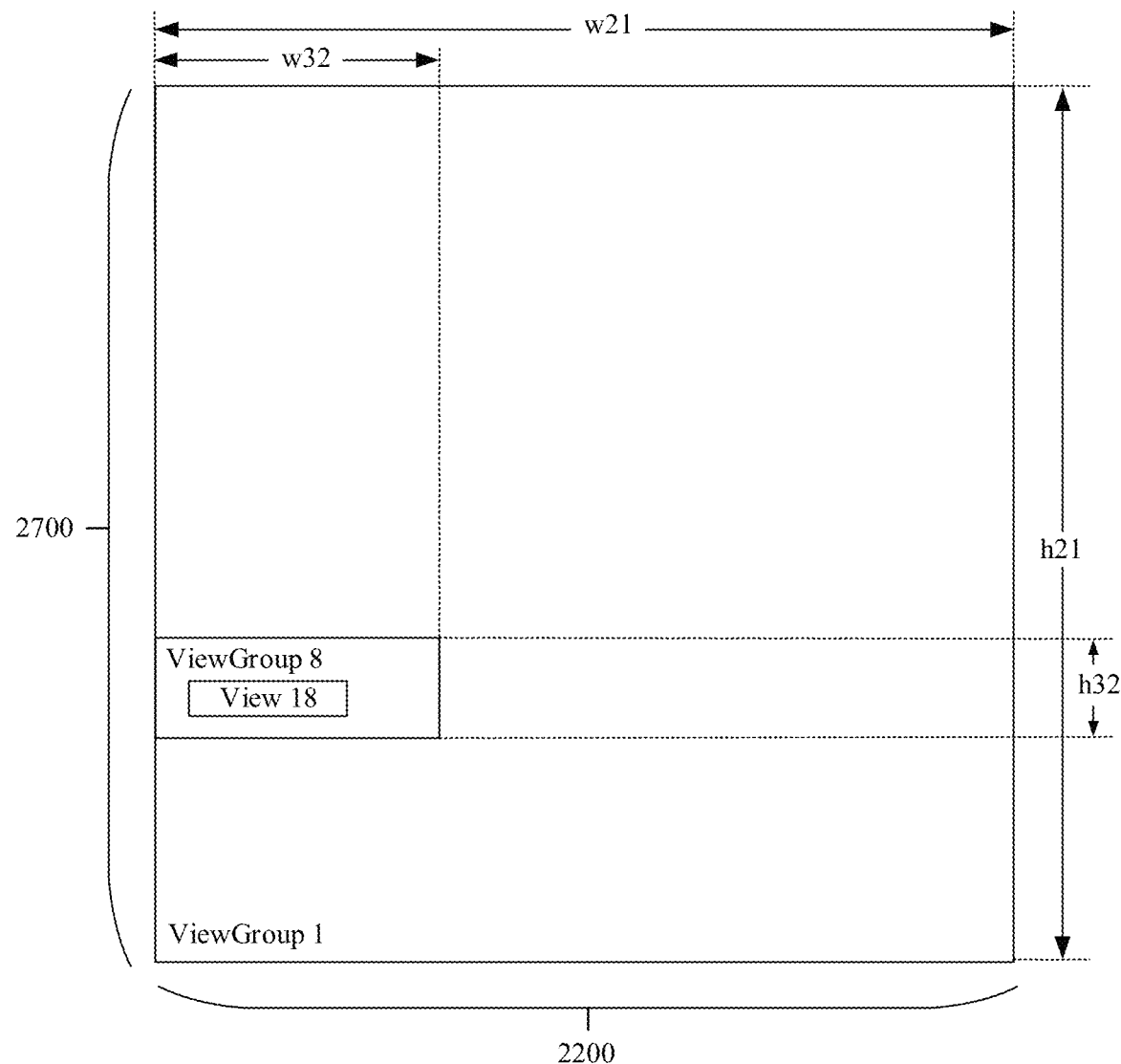
FIG. 26 is a diagram of an example of node processing.

In another example, FIG. 26 is a diagram of an example of node processing. Refer to FIG. 26. For example, after measuring a ViewGroup 8 based on the second display window, the layout system obtains that a width of the ViewGroup 8 on the second display window is w32 and a height of the ViewGroup 8 on the second display window is h32. For example, the layout system detects that the width and the height of the ViewGroup 8 are fixed values, and the width of the ViewGroup 8 is not within the preset range (that is, the width is less than the minimum value of the preset range), and determines that a corresponding policy is no processing.

In a layout phase, the layout system traverses to the ViewGroup 8. For example, the layout system detects that the width w32 of the ViewGroup 7 is less than the minimum value of the preset range, and the step in FIG. 10b proceeds to 2. The layout system determines that a corresponding policy is that the ViewGroup 7 and a child node thereof are not processed. Correspondingly, when traversing to a View 18, the layout system may not need to execute the preset rule determining process in FIG. 10b on the View 18.

Figure 27:
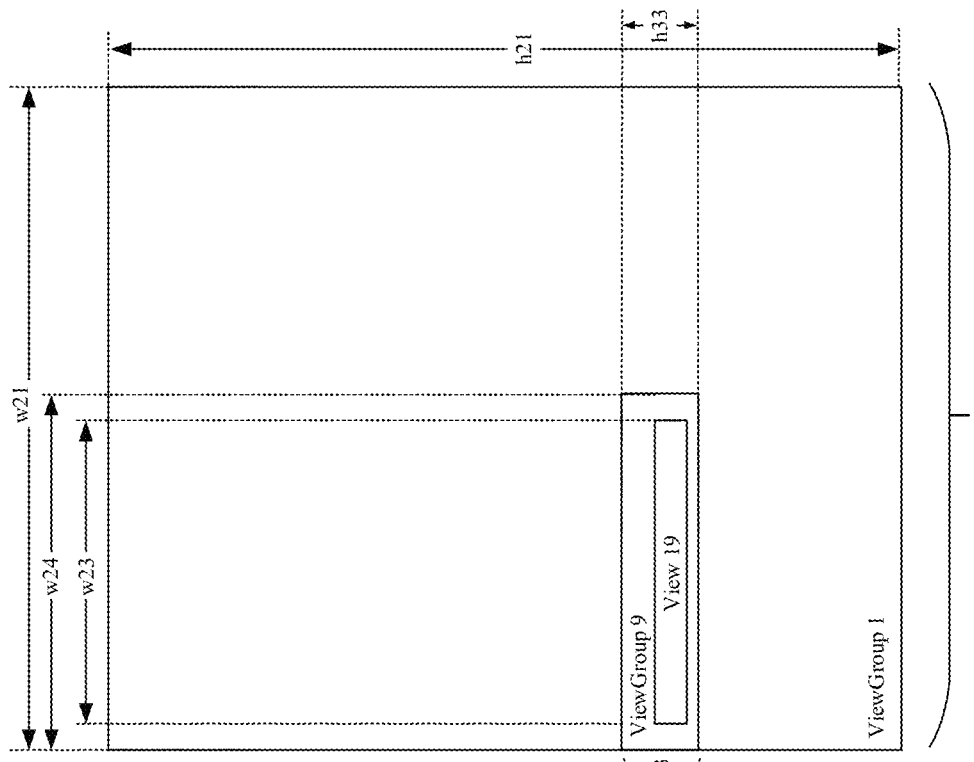
FIG. 27(1) to FIG. 27(3) are a diagram of an example of node processing.
Figure 27:
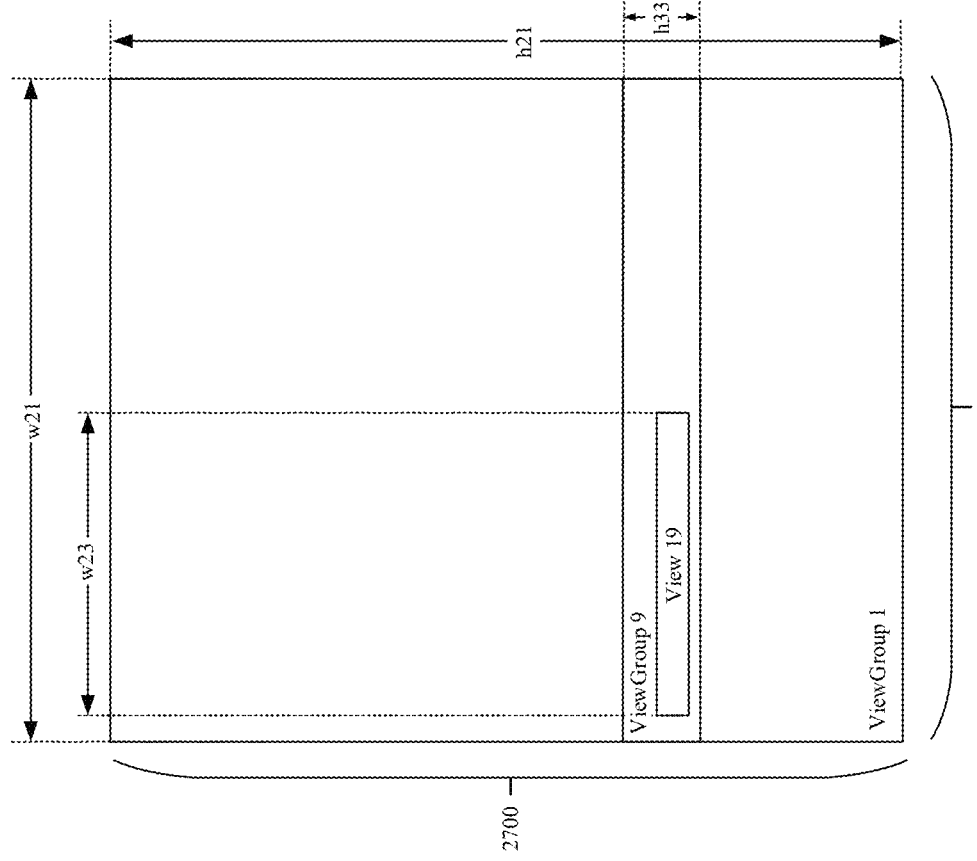
Figure 27:
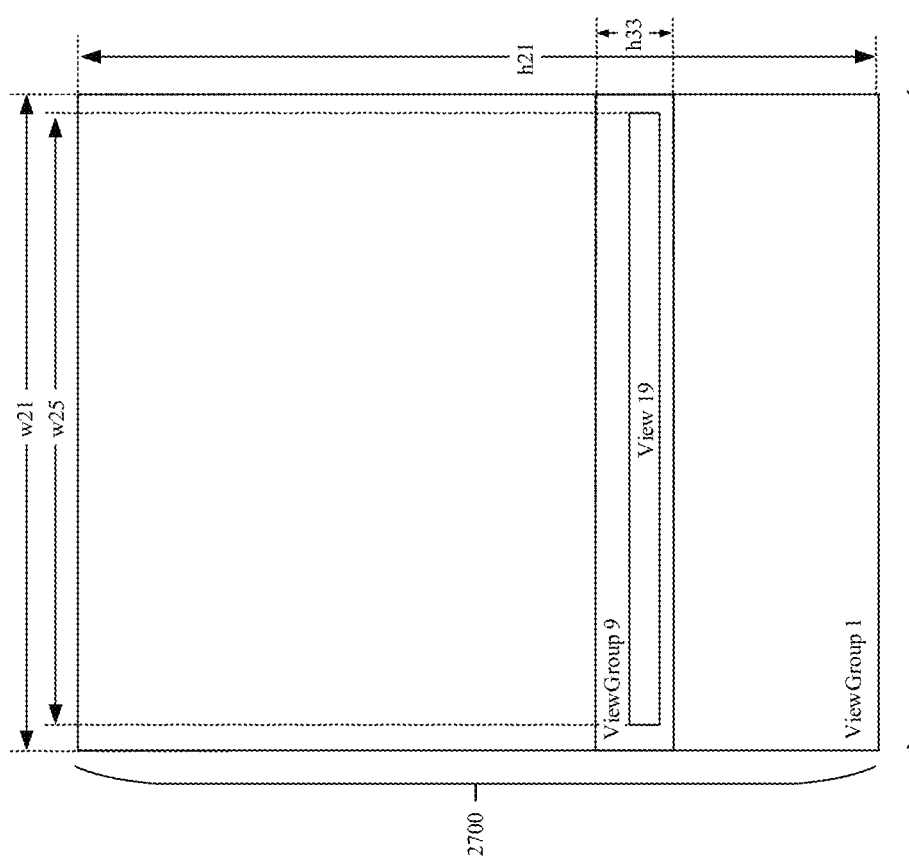

In another example, FIG. 27(1) to FIG. 27(3) are a diagram of an example of node processing. Refer to FIG. 27(1). For example, after measuring a ViewGroup 9 based on the second display window, the layout system obtains that a width of the ViewGroup 9 on the second display window is w21 and a height of the ViewGroup 9 on the second display window is h33. For example, the layout system detects that the width and the height of the ViewGroup 9 are non-fixed values, and the width of the ViewGroup 9 is not within the preset range (that is, the width is greater than the maximum value of the preset range), and determines that a corresponding policy is no processing.

In a layout phase, the layout system traverses to the ViewGroup 9. For example, the layout system detects that the width w21 of the ViewGroup 9 is greater than the maximum value of the preset range and is greater than the threshold (for example, 80% of the width of the second display window). The step in FIG. 10b proceeds to 1.1. The layout system continues to traverse a View 19 to obtain corresponding layout information. The layout system returns to the ViewGroup 9 node, and determines, based on a layout result of the View 19, a width, namely, the width w23 of the View 19, of a child node. The layout system detects that the width w23 of the child node is within the preset range. According to 1.1.1 in FIG. 10b, the layout system determines that a policy corresponding to the ViewGroup 9 and the child node thereof is that the child node is stretched. For example, the layout system marks the ViewGroup 9, to indicate stretching in a draw process.

In an example, as shown in FIG. 27(2), the layout system remeasures the ViewGroup 9, and compresses a width of the ViewGroup 9 to a half of the current width w21. After the remeasurement, a width of the ViewGroup 9 is w24, and a height h33 remains unchanged. The layout system re-lays out the ViewGroup 9 based on the width and height obtained by remeasuring the ViewGroup 9, to obtain new layout information. Correspondingly, the layout system re-lays out the child node in the ViewGroup 9 to obtain layout information of the View 19 in the ViewGroup 9. It may be understood that, as the width of the ViewGroup 9 changes, the layout information of the View 19 also changes. For example, a left margin between a right edge of the View 19 and a right edge of the ViewGroup 9 decreases, and a top margin, a bottom margin, and a left margin remain unchanged.

For example, in the draw process, as shown in FIG. 27(3), the layout system performs canvas stretching on the ViewGroup 9 and the child node (the View 19) thereof. For a specific stretching process, refer to the foregoing description. Details are not described herein again.

In another example, the layout system may not remeasure the ViewGroup 9, but mark the View 19. Correspondingly, in the draw process, the layout system does not need to stretch the ViewGroup 9, but only needs to perform canvas stretching on the View 19.

Figure 28A:
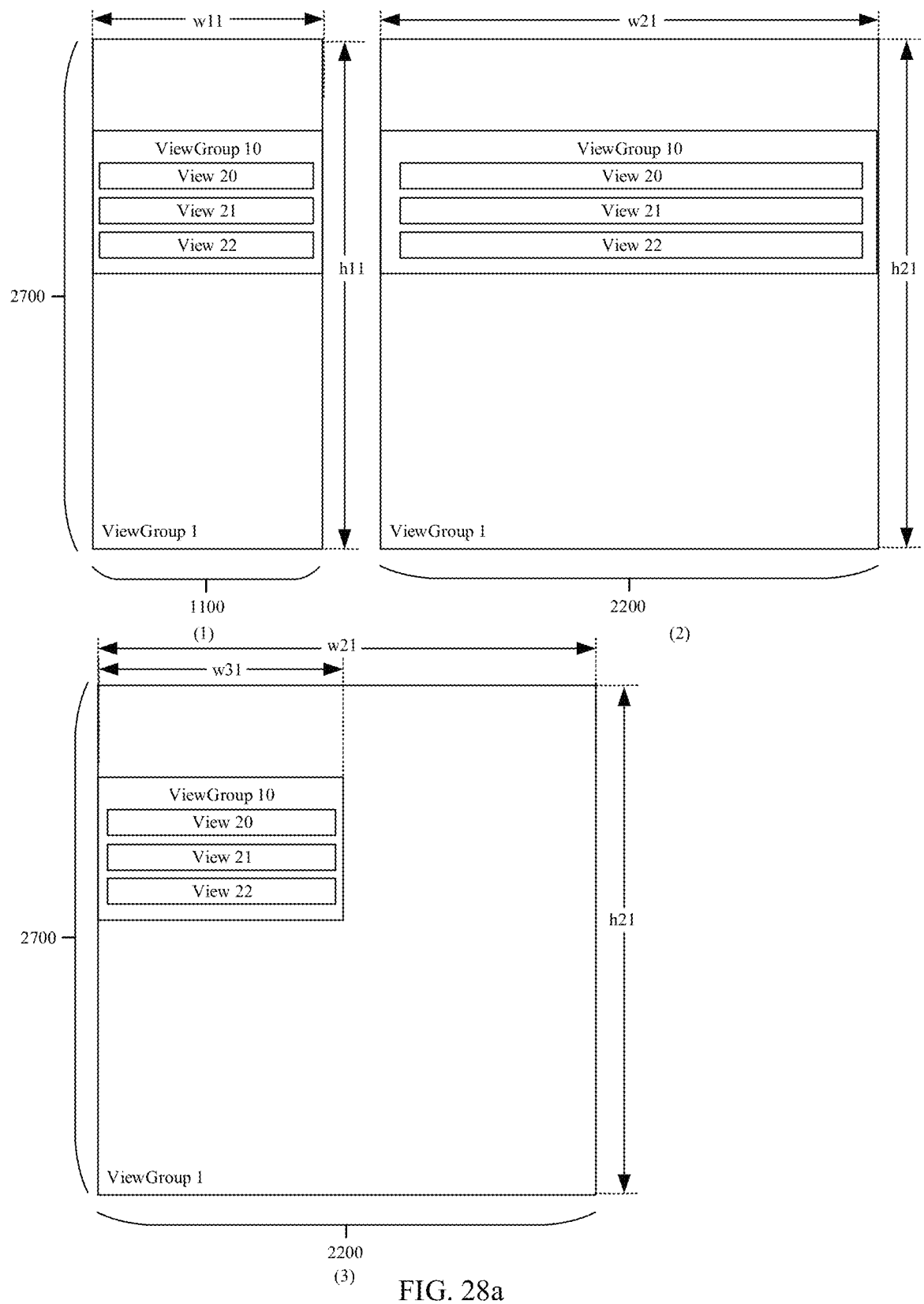
FIG. 28a and FIG. 28b are diagrams of examples of special node processing.
Figure 28B:
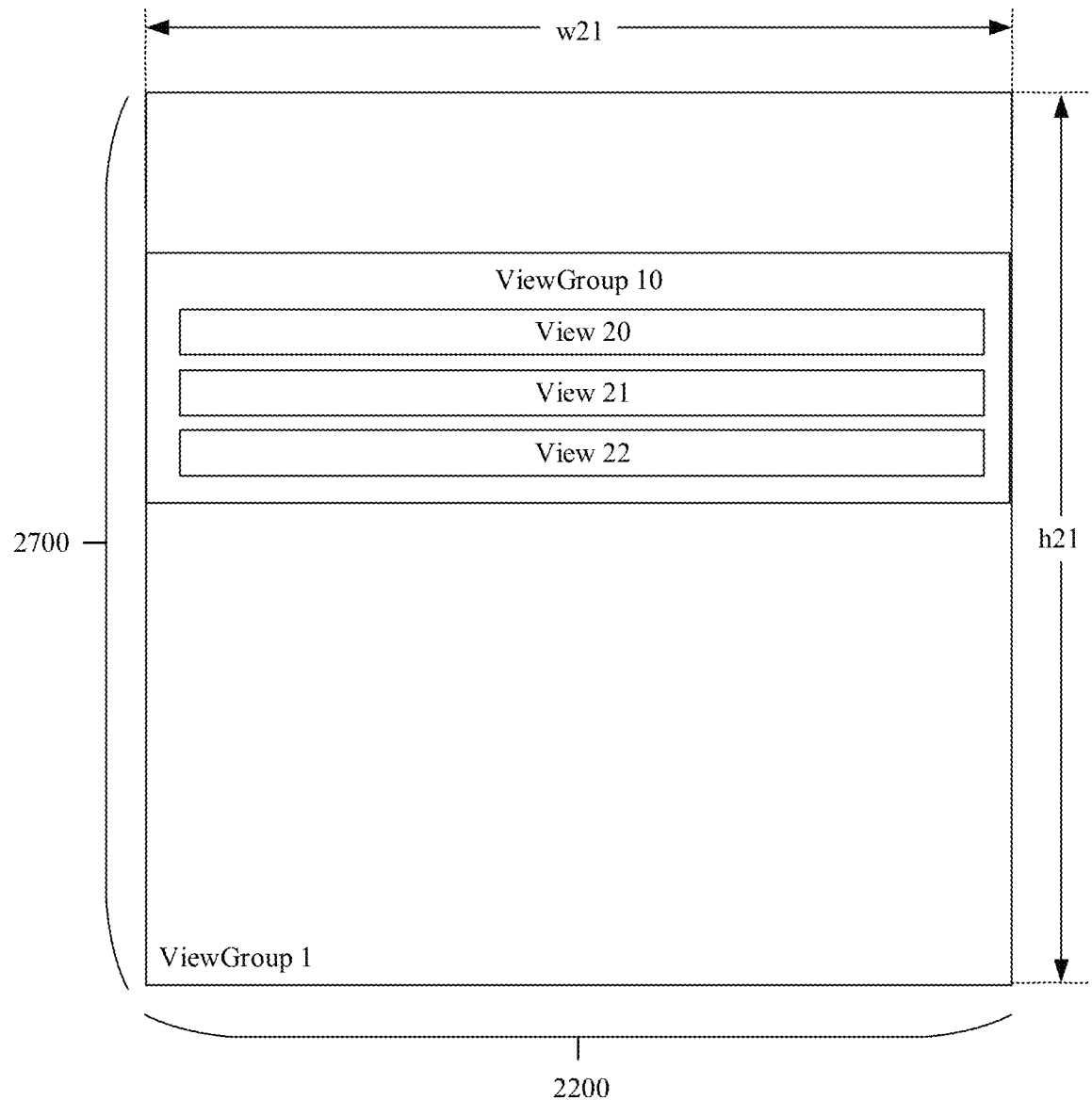

In a possible implementation, the node may further include a node of a special type, for example, a node of a "ViewPager" type, and the node includes a picture whose width exceeds the threshold (for example, 80% of the width of the second display window). For example, FIG. 28a and FIG. 28b are diagrams of examples of special node processing. Refer to (1) in FIG. 28a. For example, a width of a ViewGroup 10 on the first display window is w11, and a height of the ViewGroup 10 on the first display window is h11. A type of the ViewGroup 10 is a ViewPager type. The ViewGroup 10 includes child nodes: a View 20, a View 21, and a View 22. The View 20 to the View 22 are image type nodes. In addition, a width of each node is 90% of that of the ViewGroup 10. For example, a node of the "ViewPager" type may be understood as a list node, that is, a text and/or a picture in a control are/is displayed in a list manner, for example, an address book in a mobile phone.

For example, as shown in (2) in FIG. 28a, the layout system measures the ViewGroup 10 and a child node thereof based on the second display window, and obtains a measurement result of the ViewGroup 10 and the child node thereof. The layout system may determine, based on the measurement result, that the ViewGroup 10 is a node of the "ViewPager" type, and a width of a picture type child node in ViewGroup 10 is greater than the threshold. Correspondingly, the layout system determines that the ViewGroup 10 is a special type node, and a corresponding policy is compression and stretching.

As shown in (3) of FIG. 28a, the layout system remeasures the ViewGroup 10 and the child node thereof, and compresses a width of the ViewGroup 10 and the child node thereof to a half of the current width. For specific details, refer to the foregoing processing manner of the node. Details are not described herein again. The layout system marks the ViewGroup 10 to indicate stretching in a draw process.

For example, in the draw process, as shown in FIG. 28b, the layout system performs canvas stretching on the ViewGroup 10 and child node thereof. For specific details, refer to the foregoing description. Details are not described herein again. For example, because the child node in the ViewGroup 10 is of a picture type, after canvas stretching is performed through alignment, picture restoration and filling processing may be further performed on the picture as described above. Details are not described herein again.

In this embodiment, after obtaining a user interface, the layout system perform processing such rendering on the user interface by using another module, and display the user interface on the second display window.

For example, as described above, the layout system performs layout based on the second display window in a layout process, and in the draw process, some nodes may be stretched (and restored). In other words, in this embodiment, some nodes may change only display positions of controls, but do not change actual positions (namely, positions indicated by a layout result) of the controls. Therefore, positions that are of controls corresponding to some nodes and that are displayed in the user interface (namely, the second display window) are different from positions (namely, positions obtained in the layout process) of nodes actually obtained by the layout system. Correspondingly, in an event dispatching process (the event includes a touch event, a click event, and the like), the layout system obtains, based on a mapping relationship between a position indicated by layout information and a position of a node on the second display window, a position at which the user performs an actual operation.

Figure 29A:
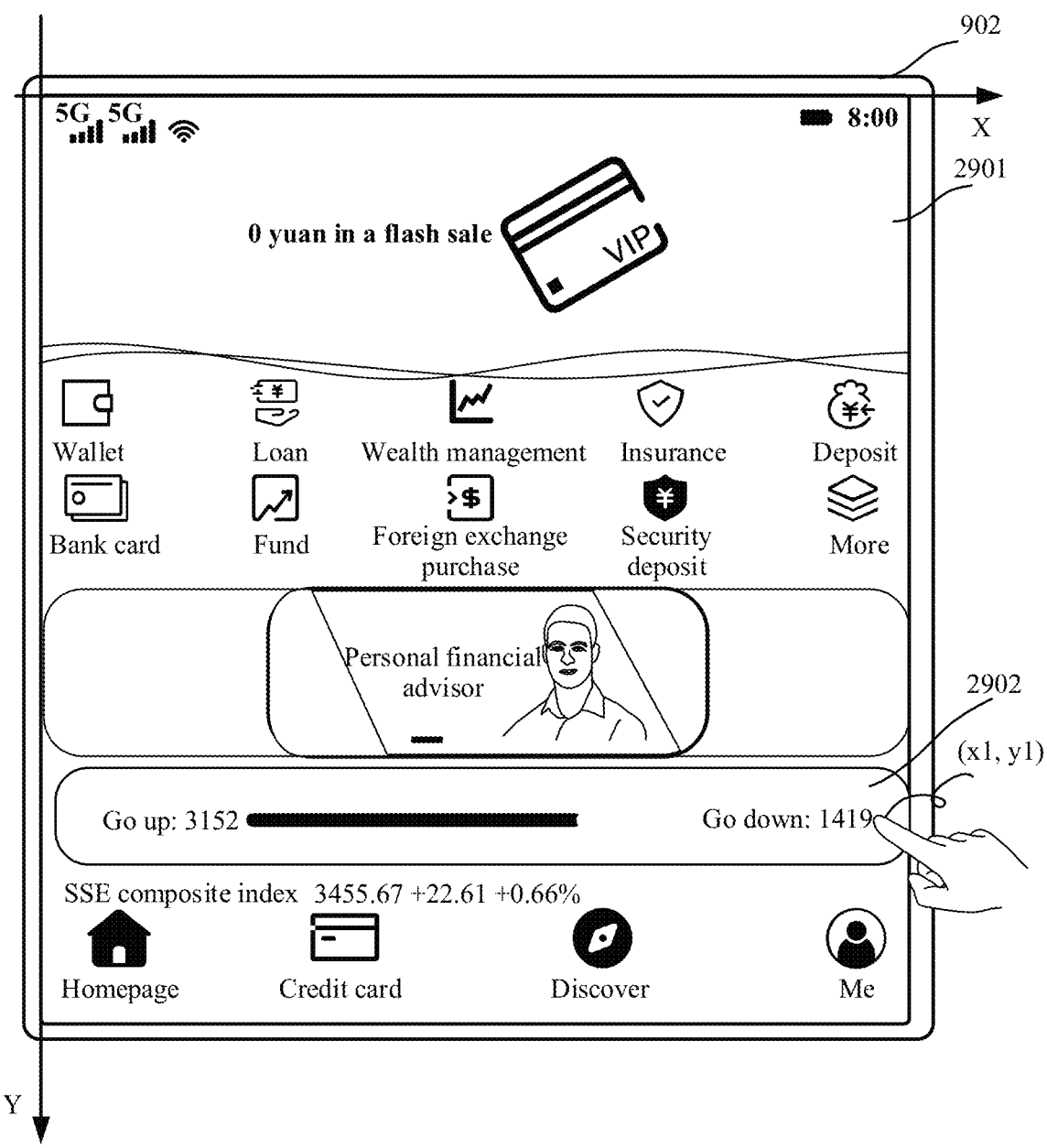
FIG. 29a to FIG. 29c are diagrams of examples of touch event dispatching.
Figure 29B:
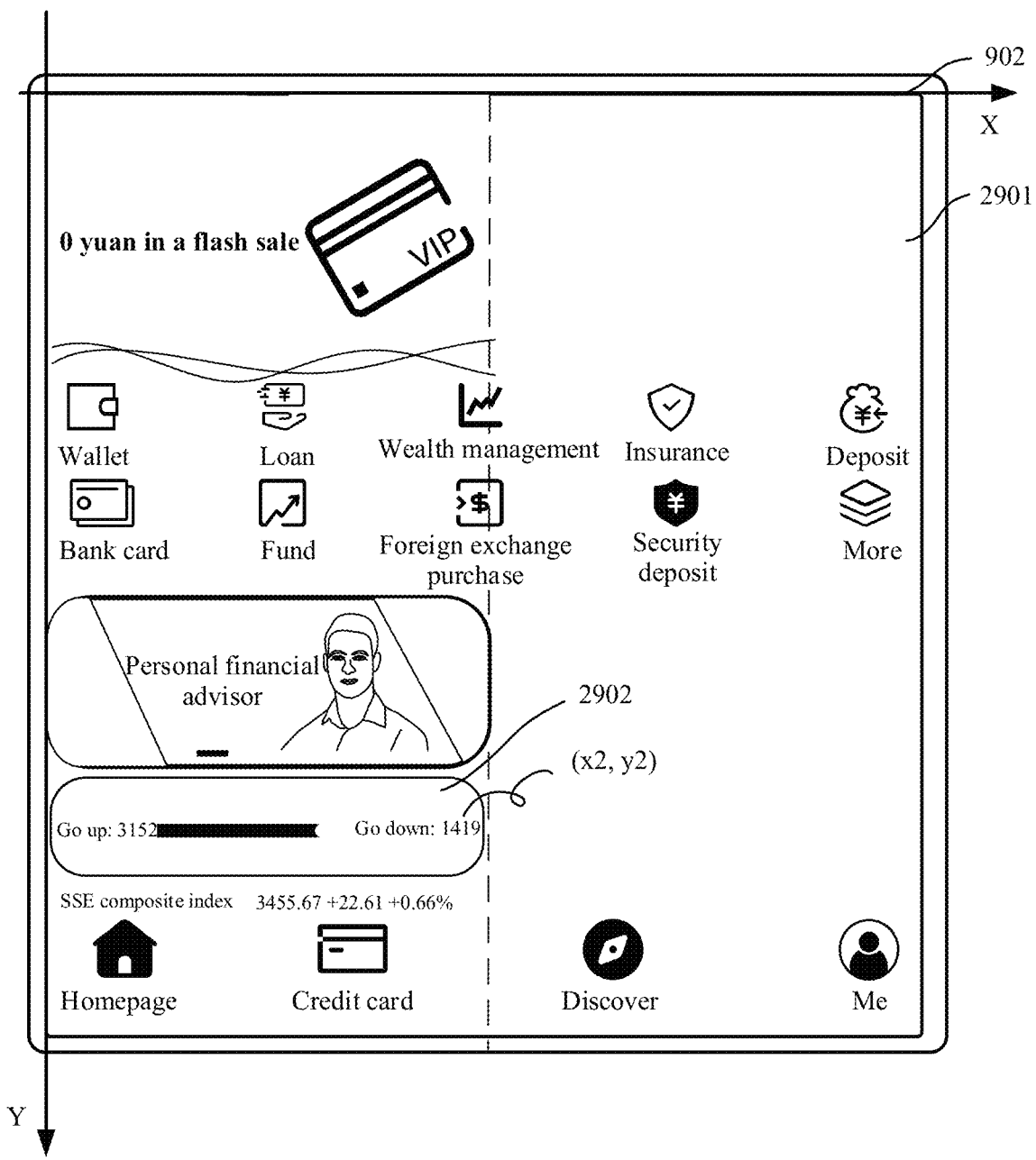
Figure 29C:
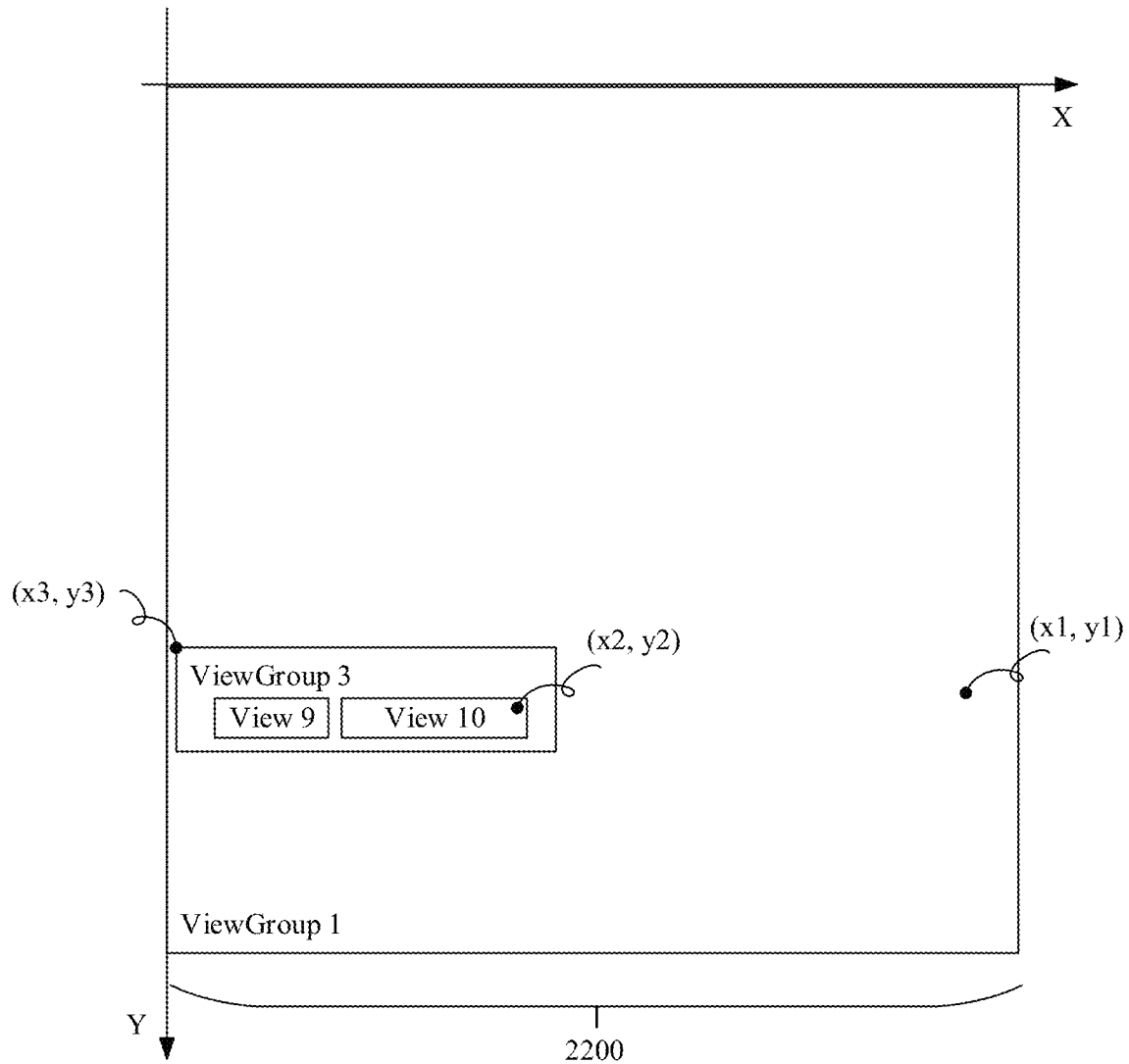

For example, FIG. 29a to FIG. 29c are diagrams of examples of touch event dispatching. Refer to FIG. 29a. A user taps a control 2902 in the user interface 2901 displayed on the inner screen 902 (which may also be understood as the second display window). The layout system receives a user operation, and determines, based on the user operation, that coordinates of a touch point corresponding to the user operation are (x1, y1). A coordinate system in which the coordinate point is located is as follows: an upper left corner of the second display window is an origin of coordinates, a horizontal direction is an x-axis, and a vertical direction is a y-axis. It should be noted that the coordinate system in this embodiment is merely an example, and is not limited in this application.

As shown in FIG. 29b, for example, as described above, in the layout phase, a layout result corresponding to the control 2902 indicates a layout of the control 2902 on the second display window, a width of the control 2902 is less than or equal to a half of that of the second display window, and the control 2902 is laid out on the left on the second display window. For a specific layout result, refer to the foregoing description. Details are not described herein again. Correspondingly, the layout system may determine, based on a correspondence between a layout result of the control 2902 and an actual display position of the control 2902 on the second display window, that actual coordinates corresponding to the user operation are (x2, y2). The layout system may determine, based on the coordinates (x2, y2), that the user operation corresponds to the View 10 in the ViewGroup 4.

The following describes a process of obtaining actual coordinates with reference to FIG. 29c. Refer to FIG. 29c. For example, the layout system determines, based on the user operation, that coordinates corresponding to the touch point in the ViewGroup 1 are (x1, y1). The layout system determines the ViewGroup 3 as a stretched node based on the layout result of the ViewGroup 3. In other words, in the layout phase, a mapping relationship between an actual coordinate coverage area of the ViewGroup 3 and a coordinate coverage area displayed in the user interface is a half. Correspondingly, the layout system may obtain that actual coordinates that are of the coordinates (x1, y1) corresponding to the user operation and that are in the ViewGroup 3 are (x2, y2), where x2 is a half of x1, and y1 is equal to y2. In this embodiment, the layout system may establish a coordinate system based on each node, to obtain a mapping relationship between coordinates, so as to obtain a node corresponding to actual coordinates of a user operation. For example, still refer to FIG. 29c. After the layout system obtains (x2, y2), it may be understood that (x2, y2) are coordinates in a coordinate system of the ViewGroup 1. The layout system may establish a coordinate system by using an upper left corner (namely, x3, y3) of the ViewGroup 3 as an origin, to obtain coordinates (x4, y4) that are of (x2, y2) and that are in the coordinate system of the ViewGroup 3, where x4 is (x2-x3), and y4 is (y2-y3). For example, the layout system continues to traverse the child node in the ViewGroup 3, to determine a child node corresponding to (x4, y4). The layout system determines, based on a coordinate coverage area of the View 10, that (x4, y4) are located in the View 10. The layout system establishes a coordinate system based on the View 10, to obtain mapped coordinates that are of (x2, y2) and that are in the coordinate system of the View 10. A manner in which the layout system uses the left upper corner of the View 10 as a coordinate system is similar to a processing manner of the ViewGroup 3. It is assumed that coordinates that are of the upper left corner of the View 10 and that are in the coordinate system of the ViewGroup 3 are (x5, y5), the layout system obtains that mapped coordinates that are of (x2, y2) and that are in the coordinate system of the View 10 are (x6, y6), where x6 is (x4-x5), and y6 is (y4-y5). Correspondingly, the layout system may determine that a control corresponding to the View 10 is actually triggered by the user operation, and execute a corresponding operation. For example, for a node that is not stretched, the layout system performs processing based on a regular event dispatching manner. That is, in a coordinate system corresponding to a user operation, the layout system may calculate, layer by layer, mapped coordinates, in a coordinate system of each node, of coordinates. Details are not described herein again.

It should be noted that, in this embodiment, window information output by the layout system to an application indicates a size of the first display window. In a running process of the application, the application may further update a width of the node based on the size of an actual display window (namely, the second display window), so that the width of the node may be greater than the size of the first display window. For example, it is assumed that the ViewGroup 2 includes the View 2 to the View 4, and a width corresponding to the ViewGroup 2 is 1100 pixels. In a running process of the application, the application may add a new node to the ViewGroup 2, for example, add the View 5 to the View 7. Correspondingly, the application may increase a width of the ViewGroup 2 to 1800 pixels based on the size of the actual display window, so that the View 2 to the View 7 can be arranged and displayed in the ViewGroup 2. In other words, in this embodiment, a width (namely, a fixed value) indicated in declaration information of a node may be greater than the width of the first display window.

In a possible implementation, the method provided in this embodiment may be further applied to a cross-device interface projection scenario (for example, a scenario in which the first device performs projection onto the second device). Screen sizes of the first device and the second device are different. For example, after an interface of an application A is projected from a mobile phone to a notebook computer, a size of a screen used to display the interface of the application A changes (a length is increased and a width is increased), and an aspect ratio of the screen changes (the aspect ratio is increased).

In a possible implementation, a smart display option may be further set for the mobile phone in this embodiment. Optionally, the smart display option may include a switch option, used to enable or disable an interface display process in this embodiment. For example, the user may tap the switch option to start or close the interface display process in this embodiment. If the user disables the smart display option, the mobile phone may display a user interface on an inner screen in any manner shown in FIG. 4(1) to FIG. 4(3). Optionally, in addition to the switch option (used to enable or disable), the smart display option may further include but is not limited to an application list that allows smart display. The user may set, in the smart display application list, an application to which the interface display process in this embodiment can be applied. Optionally, a third-party application may set a configuration file of an interface, to indicate an interface to which an interface display solution in embodiments of this application needs to be applied, and/or an interface to which the interface display solution in embodiments of this application does not need to be applied. Optionally, the smart display option may be set on an application, a desktop, a leftmost screen, a pull-down menu, a control center, and a sidebar. This is not limited in this application.

In another possible implementation, as described above, the interface display solution in this embodiment is described by using only a foldable screen as an example. In another embodiment, the interface display solution in this application may be further applied to another device, for example, a tablet, an in-vehicle device, a wearable device, or a smart home device. Optionally, the interface solution in this embodiment may be further applied to a landscape/portrait orientation switching scenario of a mobile phone. For example, when the mobile phone is in a portrait mode, the mobile phone may display a user interface of an application based on the solution shown in FIG. 6. When the mobile phone is switched to a landscape mode, the mobile phone may display a user interface of an application based on the solution shown in FIG. 8. For specific details, refer to the description in FIG. 8. Details are not described herein again. Certainly, in some other embodiments, the interface solution in this embodiment may be further applied to scenarios such as a floating window and screen splitting. This is not limited in this application.

It may be understood that, to implement the foregoing functions, the electronic device includes corresponding hardware and/or software modules for performing the functions. With reference to algorithm steps of examples described in embodiments disclosed in this specification, this application can be implemented in a form of hardware or a combination of hardware and computer software. Whether a function is performed by hardware or hardware driven by computer software depends on particular applications and design constraints of the technical solutions.

Figure 30:
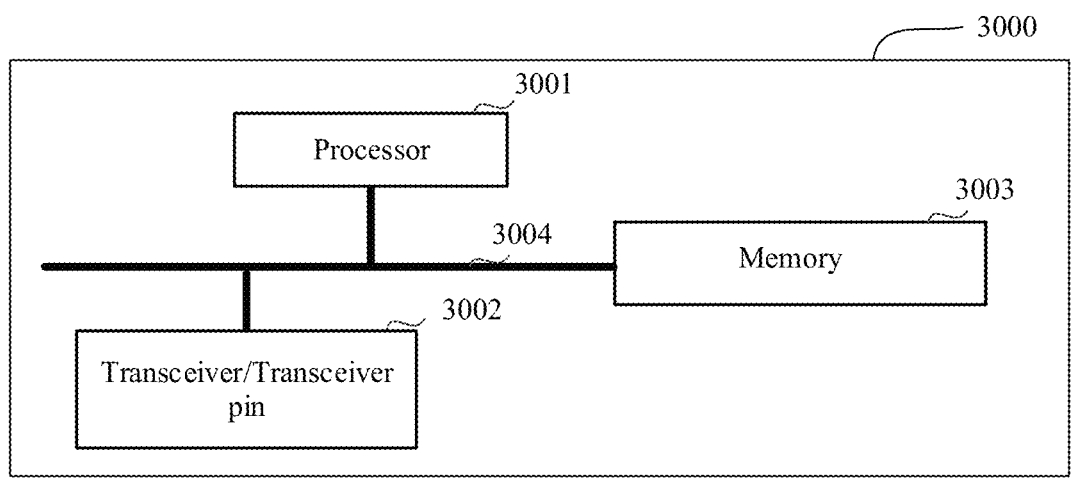
FIG. 30 is a diagram of an example of a structure of an apparatus.

For example, FIG. 30 is a schematic block diagram of an apparatus 3000 according to an embodiment. The apparatus 3000 may include a processor 3001 and a transceiver/transceiver pin 3002, and optionally, further include a memory 3003.

Components of the apparatus 3000 are coupled together by using a bus 3004. In addition to a data bus, the bus 3004 further includes a power bus, a control bus, and a status signal bus. However, for clear description, various buses are referred to as the bus 3004 in the figure.

Optionally, the memory 3003 may be configured to store instructions in the foregoing method embodiments. The processor 3001 may be configured to: execute the instructions in the memory 3003, control a receiving pin to receive a signal, and control a sending pin to send a signal.

The apparatus 3000 may be an electronic device or a chip in the foregoing method embodiments.

All related content of the steps in the foregoing method embodiments may be cited in function descriptions of the corresponding functional modules. Details are not described herein again.

An embodiment further provides a computer storage medium. The computer storage medium stores computer instructions, and when the computer instructions are run on an electronic device, the electronic device is enabled to perform the foregoing related method steps to implement the method in the foregoing embodiment.

This embodiment further provides a computer program product. When the computer program product runs on a computer, the computer is enabled to perform the related steps, to implement the method in the foregoing embodiments.

In addition, an embodiment further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, to enable the chip to perform the methods in the foregoing method embodiments.

The electronic device, the computer storage medium, the computer program product, or the chip provided in embodiments may be configured to perform the corresponding method provided above. Therefore, for beneficial effects that can be achieved, refer to the beneficial effects of the corresponding method provided above. Details are not described herein again.

Based on the descriptions about the foregoing implementations, a person skilled in the art may understand that, for a purpose of convenient and brief description, division into the foregoing functional modules is used as an example for illustration. In actual application, the foregoing functions may be allocated to different functional modules and implemented based on requirements. In other words, an inner structure of an apparatus is divided into different functional modules to implement all or some of the functions described above.

The term "and/or" in this specification describes only an association relationship for describing associated objects and represents that three relationships may exist. For example, A and/or B may represent the following three cases: Only A exists, both A and B exist, and only B exists.

In addition, in embodiments of this application, the word "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example" or the like is intended to present a related concept in a specific manner.

In the description of the embodiment, unless otherwise stated, "a plurality of" means two or more than two. For example, a plurality of processing units are two or more processing units, and a plurality of systems are two or more systems.

The foregoing describes embodiments of this application with reference to the accompanying drawings. However, this application is not limited to the foregoing specific implementations. The foregoing specific implementations are merely examples, but are not limitative. Inspired by this application, a person of ordinary skill in the art may further make modifications without departing from the purposes of this application and the protection scope of the claims, and all the modifications shall fall within the protection of this application.

The invention claimed is:

1. An interface display method, performed by an electronic device, wherein the method comprises:
obtaining, by the electronic device, a view tree of a target application, wherein the view tree is generated by the target application based on window information, the window information indicates a first window width, and the view tree comprises a first view node and a second view node;

generating, by the electronic device, a first user interface, wherein a size of the first user interface is the same as a size of a first display of the electronic device, a width of the first user interface is greater than the first window width, and the first user interface comprises a first control corresponding to the first view node and a second control corresponding to the second view node;

stretching, by the electronic device, a width of the second control in the first user interface based on a correspondence between the width of the first user interface and the first window width, to obtain a second user interface, wherein a size of the second user interface is the same as the size of the first user interface, a height of the second control in the second user interface is the same as a height of the second control in the first user interface, and a size and a layout of the first control in the second user interface are the same as a size and a layout of the first control in the first user interface; and displaying, by the electronic device, the second user interface on the first display.

2. The method according to claim 1, wherein the generating, by the electronic device, a first user interface comprises:

obtaining, by the electronic device, first layout information of the first view node and second layout information of the second view node, wherein the first layout information indicates a position of the first view node in the first user interface, and the second layout information indicates a position of the second view node in the first user interface;

creating, by the electronic device, a canvas of the first view node based on the first layout information, and drawing control content of the first view node on the canvas of the first view node; and creating, by the electronic device, a canvas of the second view node based on the second layout information, and drawing control content of the second view node on the canvas of the second view node.

3. The method according to claim 2, wherein the stretching, by the electronic device, a width of the second control in the first user interface based on a correspondence between the width of the first user interface and the first window width comprises:

stretching, by the electronic device, a width of the canvas of the second view node based on the correspondence between the width of the first user interface and the first window width, wherein the control content on the canvas of the second view node is stretched as the canvas is stretched.

4. The method according to claim 3, wherein the obtaining, by the electronic device, first layout information of the first view node and second layout information of the second view node comprises:

measuring, by the electronic device, the second view node based on a second display window, to obtain first size information of the second view node, wherein a size of the second display window is the same as the size of the first user interface, the second display window is used to display the second user interface, and the first size information indicates a height and a width of the second view node in the second display window;

detecting, by the electronic device, that a type of the second view node and the first size information meet a first preset condition, and remeasuring the second view node to obtain second size information, wherein the second size information indicates a height and a width of the second view node in the second display window, and a ratio of the width indicated by the second size information to the width indicated by the first size information is equal to a ratio of the first window width to a width of the second display window; and the height indicated by the second size information is the same as the height indicated by the first size information, or a ratio of the height indicated by the second size information to the height indicated by the first size information is equal to the ratio of the first window width to the width of the second display window; and laying out, by the electronic device, the second view node based on the second display window and the second size information, to obtain the second layout information of the second view node.

5. The method according to claim 4, wherein the first preset condition comprises:

a type of a view node is a media type, and a width of the view node in the second display window is greater than a preset threshold, wherein the media type indicates that the control content corresponding to the second view node is a picture or a video.

6. The method according to claim 4, wherein after the stretching, by the electronic device, a width of the second control in the first user interface based on a correspondence between the width of the first user interface and the first window width, the method further comprises:

restoring, by the electronic device, the control content of the second view node to a state before the stretching, wherein the width of the canvas of the second view node is still a width after the stretching, and the control content of the second view node is displayed in the middle of the canvas of the second view node after being restored; and filling, by the electronic device, a part other than the control content on the canvas of the second view node with a target image.

7. The method according to claim 4, wherein the obtaining, by the electronic device, first layout information of the first view node and second layout information of the second view node comprises:

measuring, by the electronic device, the second view node based on a second display window, to obtain third size information of the second view node, wherein a size of the second display window is the same as the size of the first user interface, the second display window is used to display the second user interface, and the third size information indicates a height and a width of the second view node in the second display window;

detecting, by the electronic device, that a type of the second view node and the third size information meet a second preset condition, and determining that the second view node is a node that needs to be stretched; and laying out, by the electronic device, the second view node based on the second display window and the third size information, to obtain the second layout information of the second view node.

8. The method according to claim 1, wherein the method further comprises:

receiving a touch operation on the second control in the second user interface, wherein the touch operation is at a first position in the second user interface, a distance between the first position and a left edge of the second user interface is a first distance value, and a distance between the first position and an upper edge of the second user interface is a second distance value;

determining, based on the second layout information, a second position to which the first position is mapped in the second view node, wherein a distance between the second position and the left edge of the second user interface is a third distance value, a distance between the second position and the upper edge of the second user interface is a fourth distance value, a ratio of the first distance value to the third distance value is equal to a ratio of the width of the first user interface to the first window width, and the second distance value is equal to the fourth distance value; and determining, based on the second position, that the touch operation corresponds to the second view node.

9. The method according to claim 1, wherein the first window width is the same as a width of a second display of the electronic device.

10. The method according to claim 9, wherein the electronic device is an inward foldable screen device, the first display is an inner screen of the inward foldable screen device, and the second display is an outer screen of the inward foldable screen device; or wherein the electronic device is an outward foldable screen device, the first display is a display when the outward foldable screen device is in an unfolded state, and the first window width is a display width when the outward foldable screen device is in a folded state.

11. An electronic device, comprising:
one or more memories configured to store computer program code, the program code comprises computer instructions,
a foldable display,
one or more processors coupled to the one or more memories to retrieve and execute the computer instructions to cause the electronic device to:
obtain a view tree of a target application, wherein the view tree is generated by the target application based on window information, the window information indicates a first window width, and the view tree comprises a first view node and a second view node;
generate a first user interface, wherein a size of the first user interface is the same as a size of a first display of the electronic device, a width of the first user interface is greater than the first window width, and the first user interface comprises a first control corresponding to the first view node and a second control corresponding to the second view node;
stretch a width of the second control in the first user interface based on a correspondence between the width of the first user interface and the first window width, to obtain a second user interface, wherein a size of the second user interface is the same as the size of the first user interface, a height of the second control in the second user interface is the same as a height of the second control in the first user interface, and a size and a layout of the first control in the second user interface are the same as a size and a layout of the first control in the first user interface; and
display the second user interface on the first display.

12. The electronic device according to claim 11, wherein the step of generating a first user interface comprises:
obtain first layout information of the first view node and second layout information of the second view node, wherein the first layout information indicates a position of the first view node in the first user interface, and the second layout information indicates a position of the second view node in the first user interface;
create a canvas of the first view node based on the first layout information, and drawing control content of the first view node on the canvas of the first view node; and
create a canvas of the second view node based on the second layout information, and drawing control content of the second view node on the canvas of the second view node.

13. The electronic device according to claim 12, wherein the step of stretching the width comprises:
stretch a width of the canvas of the second view node based on the correspondence between the width of the first user interface and the first window width, wherein the control content on the canvas of the second view node is stretched as the canvas is stretched.

14. The electronic device according to claim 13, wherein the step of obtaining first layout information comprises:
measure the second view node based on a second display window, to obtain first size information of the second view node, wherein a size of the second display window is the same as the size of the first user interface, the second display window is used to display the second user interface, and the first size information indicates a height and a width of the second view node in the second display window;
detect that a type of the second view node and the first size information meet a first preset condition, and remeasure the second view node to obtain second size information, wherein the second size information indicates a height and a width of the second view node in the second display window, and a ratio of the width indicated by the second size information to the width indicated by the first size information is equal to a ratio of the first window width to a width of the second display window; and the height indicated by the second size information is the same as the height indicated by the first size information, or a ratio of the height indicated by the second size information to the height indicated by the first size information is equal to the ratio of the first window width to the width of the second display window; and
lay out the second view node based on the second display window and the second size information, to obtain the second layout information of the second view node.

15. The electronic device according to claim 14, wherein the first preset condition comprises:
a type of a view node is a media type, and a width of the view node in the second display window is greater than a preset threshold, wherein the media type indicates that the control content corresponding to the second view node is a picture or a video.

16. The electronic device according to claim 14, wherein when the one or more processors execute the computer instructions, the electronic device is further enabled to:
after the stretch a width of the canvas of the second view node based on the correspondence between the width of the first user interface and the first window width, restore the control content of the second view node to a state before the stretching, wherein the width of the canvas of the second view node is still a width after the stretching, and the control content of the second view node is displayed in the middle of the canvas of the second view node after being restored; and fill a part other than the control content on the canvas of the second view node with a target image.

17. The electronic device according to claim 13, wherein the obtain first layout information of the first view node and second layout information of the second view node comprises:
- measure the second view node based on a second display window, to obtain third size information of the second view node, wherein a size of the second display window is the same as the size of the first user interface, the second display window is used to display the second user interface, and the third size information indicates a height and a width of the second view node in the second display window;
- detect that a type of the second view node and the third size information meet a second preset condition, and determining that the second view node is a node that needs to be stretched; and
- lay the second view node based on the second display window and the third size information, to obtain the second layout information of the second view node.

18. The electronic device according to claim 12, wherein when the one or more processors execute the computer instructions, the electronic device is operable to:
- receive a touch operation on the second control in the second user interface, wherein the touch operation is at a first position in the second user interface, a distance between the first position and a left edge of the second user interface is a first distance value, and a distance between the first position and an upper edge of the second user interface is a second distance value;
- determine based on the second layout information, a second position to which the first position is mapped in the second view node, wherein a distance between the second position and the left edge of the second user interface is a third distance value, a distance between the second position and the upper edge of the second user interface is a fourth distance value, a ratio of the first distance value to the third distance value is equal to a ratio of the width of the first user interface to the first window width, and the second distance value is equal to the fourth distance value; and
- determine based on the second position, that the touch operation corresponds to the second view node.

19. The electronic device according to claim 11, wherein the first window width is the same as a width of a second display of the electronic device.

20. The electronic device according to claim 19, wherein the electronic device is an inward foldable screen device, the first display is an inner screen of the inward foldable screen device, and the second display is an outer screen of the inward foldable screen device; or
- wherein the electronic device is an outward foldable screen device, the first display is a display when the outward foldable screen device is in an unfolded state, and the first window width is a display width when the outward foldable screen device is in a folded state.

* * * * *